United States Patent
Fulghum et al.

(10) Patent No.: US 10,395,276 B1
(45) Date of Patent: Aug. 27, 2019

(54) PULL-TYPE SEARCHING SYSTEM

(71) Applicant: Groupon, Inc., Chicago, IL (US)

(72) Inventors: Jordan Fulghum, Chicago, IL (US);
Ruslan Gilfanov, Mountain View, CA (US); Jeffrey Alan Holden, Chicago, IL (US); Andrew Mason, Chicago, IL (US); Ian Silber, San Jose, CA (US); Eric Vadon, Chicago, IL (US)

(73) Assignee: Groupon, Inc., Chicago, IL (US)

(*) Notice: Subject to any disclaimer, the term of this patent is extended or adjusted under 35 U.S.C. 154(b) by 0 days.

(21) Appl. No.: 13/842,379

(22) Filed: Mar. 15, 2013

Related U.S. Application Data

(60) Provisional application No. 61/698,434, filed on Sep. 7, 2012.

(51) Int. Cl.
*G06Q 30/02* (2012.01)

(52) U.S. Cl.
CPC ..... *G06Q 30/0257* (2013.01); *G06Q 30/0217* (2013.01); *G06Q 30/0207* (2013.01); *G06Q 30/0241* (2013.01); *G06Q 30/0251* (2013.01)

(58) Field of Classification Search
CPC .................................................. G06Q 30/02
See application file for complete search history.

(56) References Cited

U.S. PATENT DOCUMENTS

| | | | |
|---|---|---|---|
| 6,178,465 B1 * | 1/2001 | Shirai et al. | 710/1 |
| 6,463,428 B1 * | 10/2002 | Lee | G06F 17/30817 707/750 |
| 6,745,161 B1 * | 6/2004 | Arnold et al. | 704/7 |
| 7,801,845 B1 * | 9/2010 | King | G06Q 30/018 707/608 |
| 8,145,536 B1 | 3/2012 | Goel | |
| 8,719,251 B1 | 5/2014 | English et al. | |
| 2002/0078025 A1 * | 6/2002 | Tanaka | 707/1 |
| 2002/0087532 A1 * | 7/2002 | Barritz et al. | 707/3 |
| 2002/0099694 A1 * | 7/2002 | Diamond et al. | 707/3 |
| 2004/0006509 A1 * | 1/2004 | Mannik | G06F 17/30017 705/14.55 |

(Continued)

OTHER PUBLICATIONS

Office Action for U.S. Appl. No. 13/842,467 dated Feb. 26, 2015.
(Continued)

*Primary Examiner* — Vincent M Cao
(74) *Attorney, Agent, or Firm* — Alston & Bird, LLP

(57) ABSTRACT

The pull-type searching system provides an effective and efficient way to navigate deals and assist the user in identifying a deal for selection. The pull-type searching system further enables identification of one or more alternative deals to present to the user when no deals are identified for the selected search criteria. The pull-type searching system includes a method and apparatus. The method includes communicating ordered selectable search criteria, the search criteria including one or more categories, subcategories and deal types based on a user profile or available deals, or redemption goals. The method further includes receiving a selection from the search criteria and searching a deals database for results associated with the selection. Further, the method includes communicating the results associated with the selection, one or more alternative categories, or one or more alternative deals. A similar apparatus is provided.

18 Claims, 45 Drawing Sheets

(56) References Cited

U.S. PATENT DOCUMENTS

| | | | |
|---|---|---|---|
| 2005/0234771 A1* | 10/2005 | Register et al. | 705/14 |
| 2005/0283420 A1 | 12/2005 | Bailey et al. | |
| 2006/0190330 A1* | 8/2006 | Tollinger et al. | 705/14 |
| 2006/0250278 A1 | 11/2006 | Tillotson et al. | |
| 2007/0043730 A1 | 2/2007 | Wisely | |
| 2007/0143155 A1* | 6/2007 | Whitsett | G06Q 10/02 705/5 |
| 2008/0071640 A1* | 3/2008 | Nguyen | 705/26 |
| 2008/0082396 A1* | 4/2008 | O'Connor et al. | 705/14 |
| 2008/0091526 A1* | 4/2008 | Shoemaker | 705/14 |
| 2008/0249987 A1* | 10/2008 | Ogasawara | G06F 17/30867 |
| 2009/0012799 A1 | 1/2009 | Hornthal et al. | |
| 2009/0182590 A1 | 7/2009 | Ashby et al. | |
| 2009/0210264 A1 | 8/2009 | Anderson et al. | |
| 2009/0281970 A1* | 11/2009 | Mika et al. | 706/12 |
| 2010/0121696 A1 | 5/2010 | Green et al. | |
| 2011/0046987 A1 | 2/2011 | Petrisor | |
| 2011/0184831 A1* | 7/2011 | Dalgleish | G06Q 30/02 705/26.7 |
| 2011/0218884 A1 | 9/2011 | Kothari et al. | |
| 2011/0251882 A1* | 10/2011 | Richard | 705/14.25 |
| 2012/0016678 A1 | 1/2012 | Gruber et al. | |
| 2012/0278316 A1 | 11/2012 | Reznik | |
| 2013/0041696 A1 | 2/2013 | Richard | |
| 2013/0166329 A1 | 6/2013 | Amadeus | |
| 2013/0311332 A1 | 11/2013 | Favish | |

OTHER PUBLICATIONS

U.S. Appl. No. 13/411,502, filed Mar. 2, 2012; In re: O'Brien et al., entitled *Relevance System for Consumer Deals*.

U.S. Appl. No. 13/460,745, filed Apr. 30, 2012; In re: Thacker et al., entitled *Sales Enhancement System*.

Office Action for corresponding U.S. Appl. No. 13/842,467 dated Sep. 25, 2015.

Office Action for corresponding U.S. Appl. No. 13/842,467 dated Sep. 9, 2016.

\* cited by examiner

Dine out this weekend
Make a reservation at one of these great restaurants

Zengo — 1502
Up to 30% off
Chelsea | American          View ▸

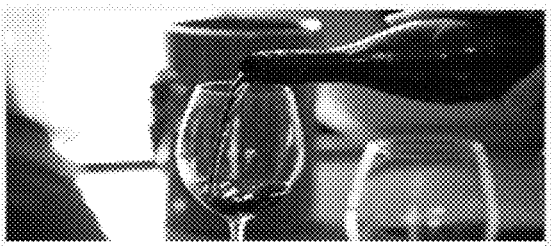

The Lounge at S26
Up to 40% off
Chelsea | American          View ▸

Reserve now and save up to 40%    [Book a Free Reservation]

Aquavit
Up to 30% off
Chelsea | American          View ▸

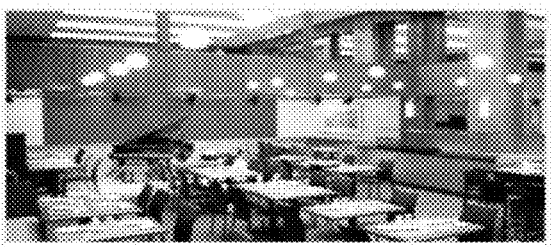

The Kitano
Up to 40% off
Chelsea | American          View ▸

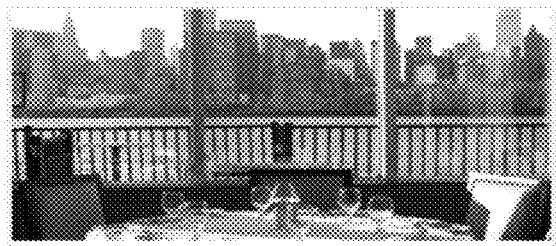

Zengo
Up to 30% off
Chelsea | American          View ▸

The Lounge at S26
Up to 40% off
Chelsea | American          View ▸

Looking for something different? [Browse all reservations] — 1504

Fig. 15

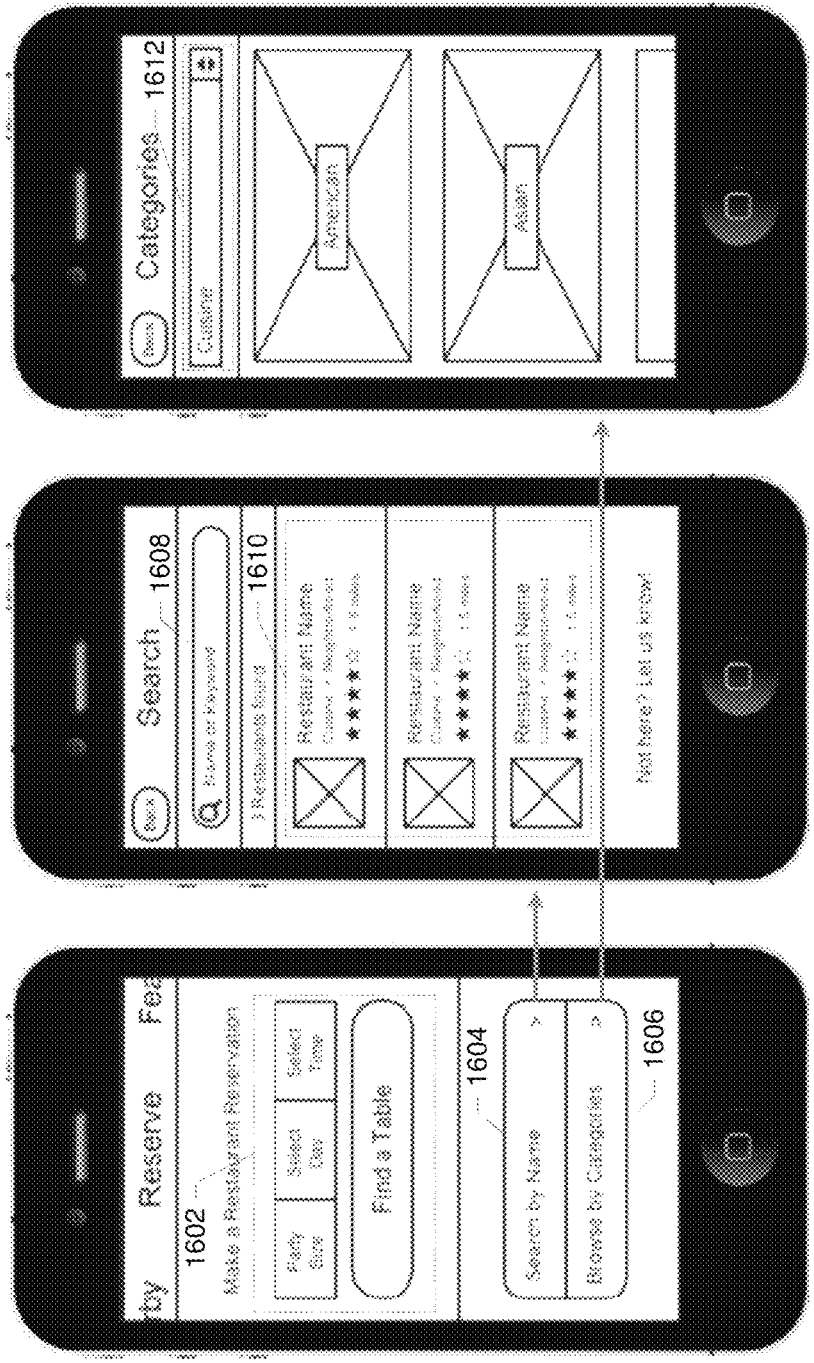
Fig. 16a — Start
Fig. 16b — Name or Keyword
Fig. 16c — Categories

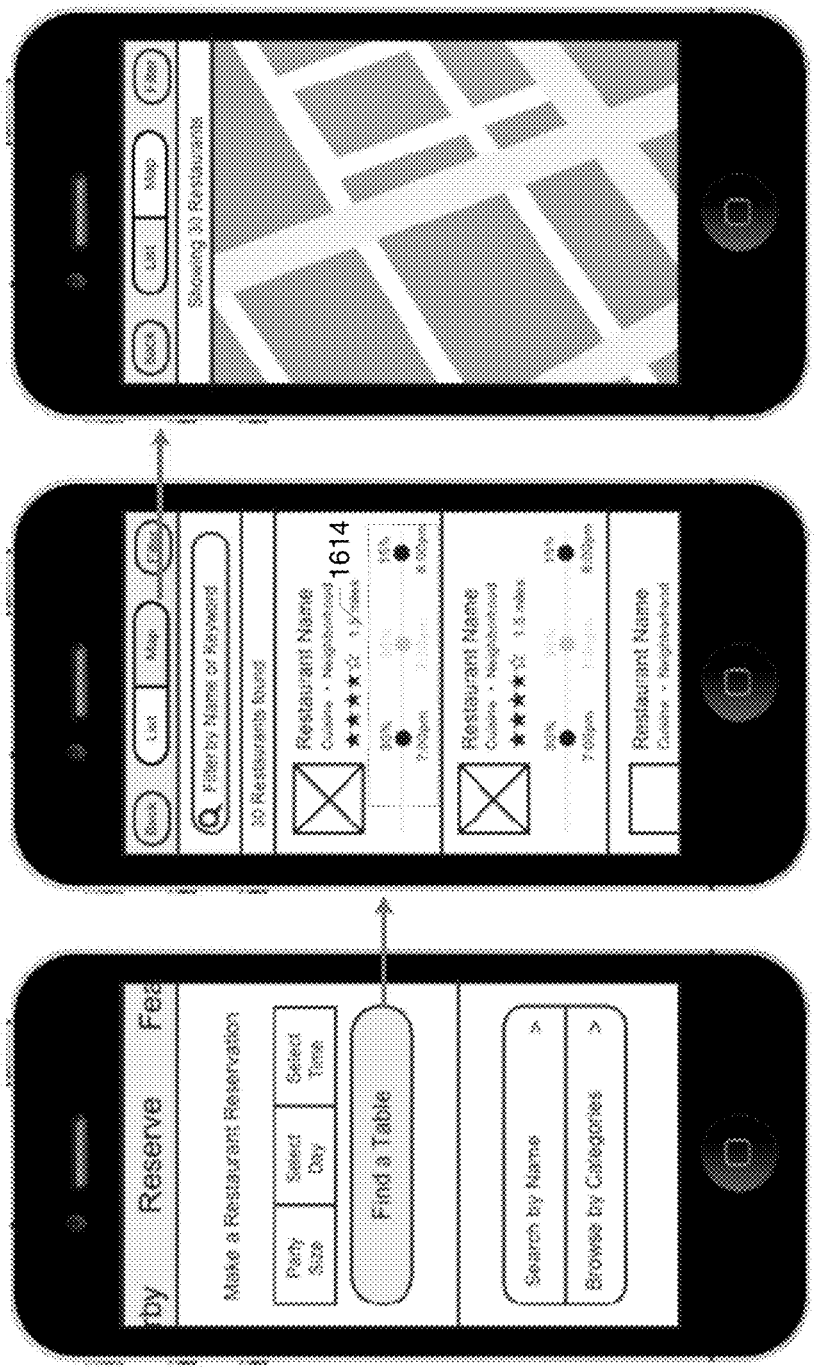

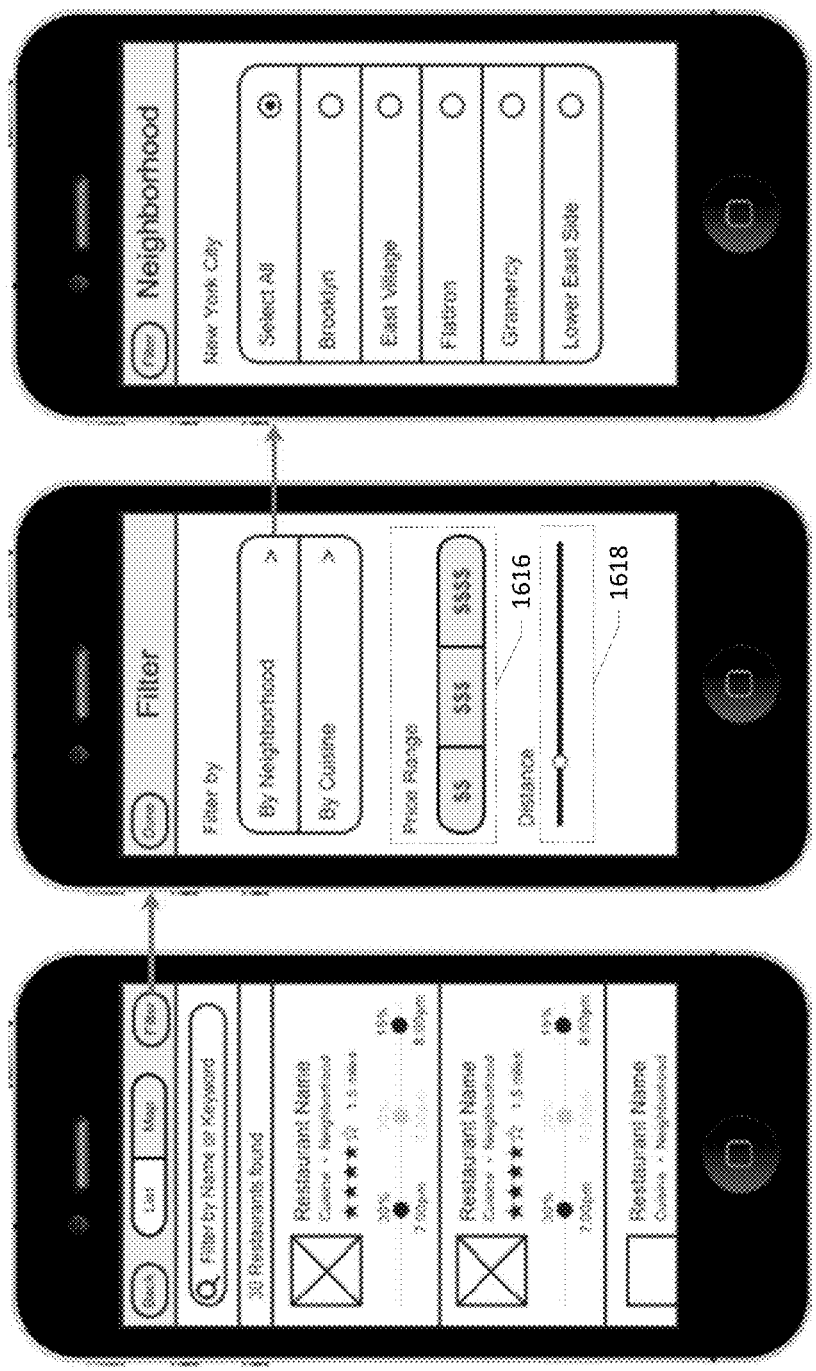

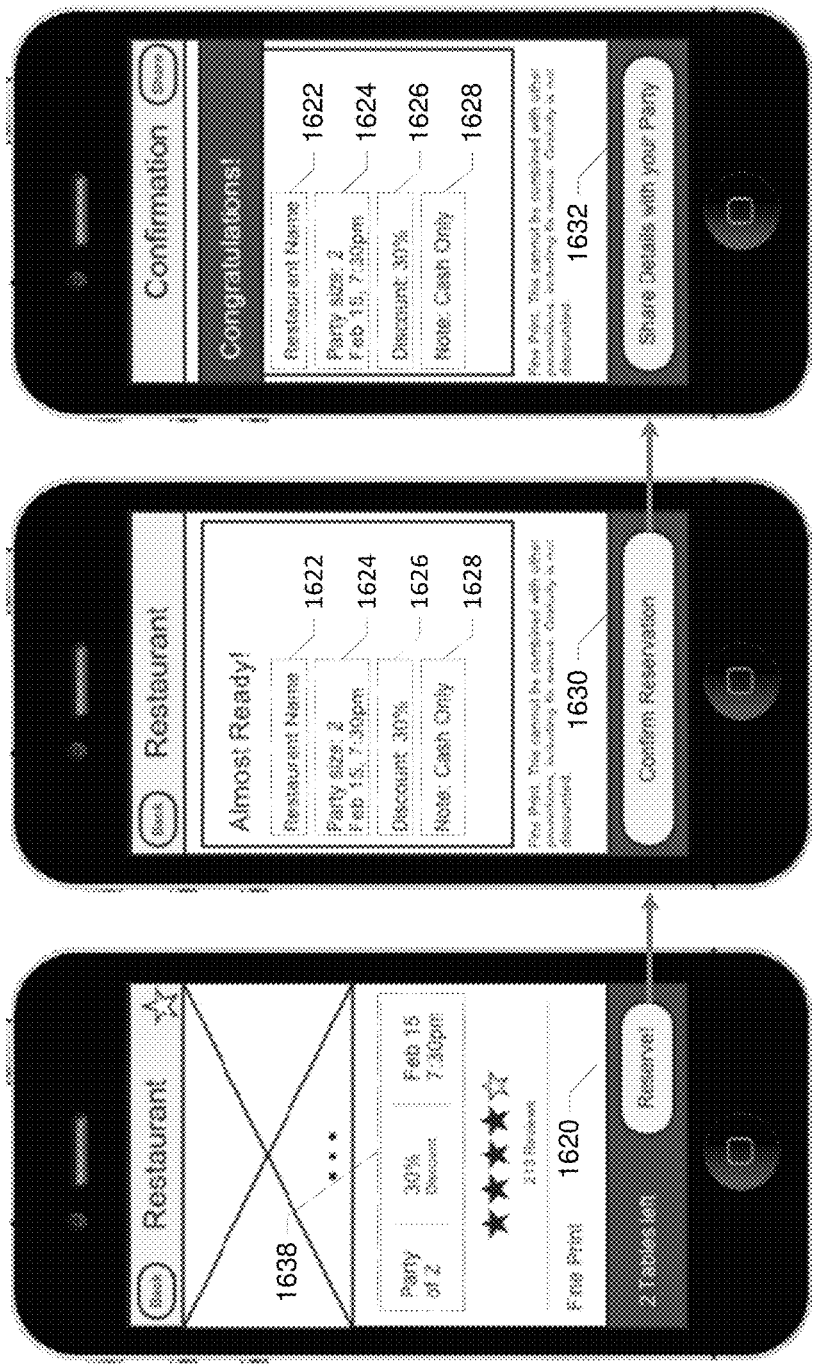
Fig. 16j — Venue Page
Fig. 16k — Review
Fig. 16l — Confirmation

CONFIRMATION

RESERVATION

RESERVATION 2

PULL-TYPE SEARCHING SYSTEM

CROSS-REFERENCE TO RELATED APPLICATIONS

This non-provisional application claims the benefit of U.S. Provisional Patent Application No. 61/698,434, filed Sep. 7, 2012, the entire contents of which are incorporated herein by reference.

TECHNICAL FIELD

The present description relates to an effective and efficient way to navigate deals and assist the user to identify a deal for selection. This description more specifically relates to how to identify one or more alternative deals to present for user selection when no deals are identified for selected search criteria.

BACKGROUND

Increasingly, content sites (e.g., Yelp) offer consumers the ability to not only search for the best restaurants and merchants in the user's area, the content sites provide consumers the ability to buy deals in the user's area. In this regard, the content sites provide one solution to be a "one stop shop" that can offer consumers content, comprehensive listings, and deals thereby giving the content sites the ability to steal market share from deal sites.

BRIEF SUMMARY

The promotion searching system, method and product provide a memory coupled to a processor. The memory includes logic executable by the processor causes the processor to communicate ordered selectable search criteria comprising: categories, subcategories and deal types for selection according to user profile and/or deals available, redemption goals, or any combination thereof. The promotion searching system receives selection criteria for one or more selectable categories, one or more selectable deals.

The promotion searching system may receive selection criteria for one of category of deals or deal type, search a deals database for one or more results that match the selection criteria, arrange another of categories of deals or deal types based on the selection criteria, and communicate the one or more results and the arranged another of categories of deals or deal types for selection. The promotion searching system may receive keyword selection criteria, search the deals database for deals that match the keyword selection criteria, arrange the categories of deals based on the deals that match the keyword selection criteria, arrange the deal types based on the deals that match the keyword selection criteria, and output at least a part of the deals that match the keyword selection criteria, at least a part of the arranged categories of deals, and at least a part of the arranged deal types. The promotion searching system may communicate ordered selectable search criteria including categories of deals, deal types and keywords, and output at least a part of the deals that match the keyword selection criteria, at least a part of the arranged categories of deals, and at least a part of the arranged deal types. The selection criteria may include a category of deals, and the logic executable by the processor is configured to arrange the deal types based on the selection criteria. The promotion searching system may arrange the deal types based on a direct correlation with the selection criteria, or arrange the deal types based on an indirect correlation with the selection criteria. The promotion searching system may perform dynamic binning to determine the ordered selectable search criteria to communicate to the user.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The pull-type searching system may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 15 shows an example email message for advertising the use of the pull-type searching system for placing reservations;

FIGS. 16a-16l show example user interfaces for mobile devices corresponding to the use of the pull-type searching system for placing reservations;

FIG. 18 shows another configuration of the pull-type searching system.

DETAILED DESCRIPTION

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different or fewer components may be provided.

Pull-Type Searching System Embodiment

Figure 1:
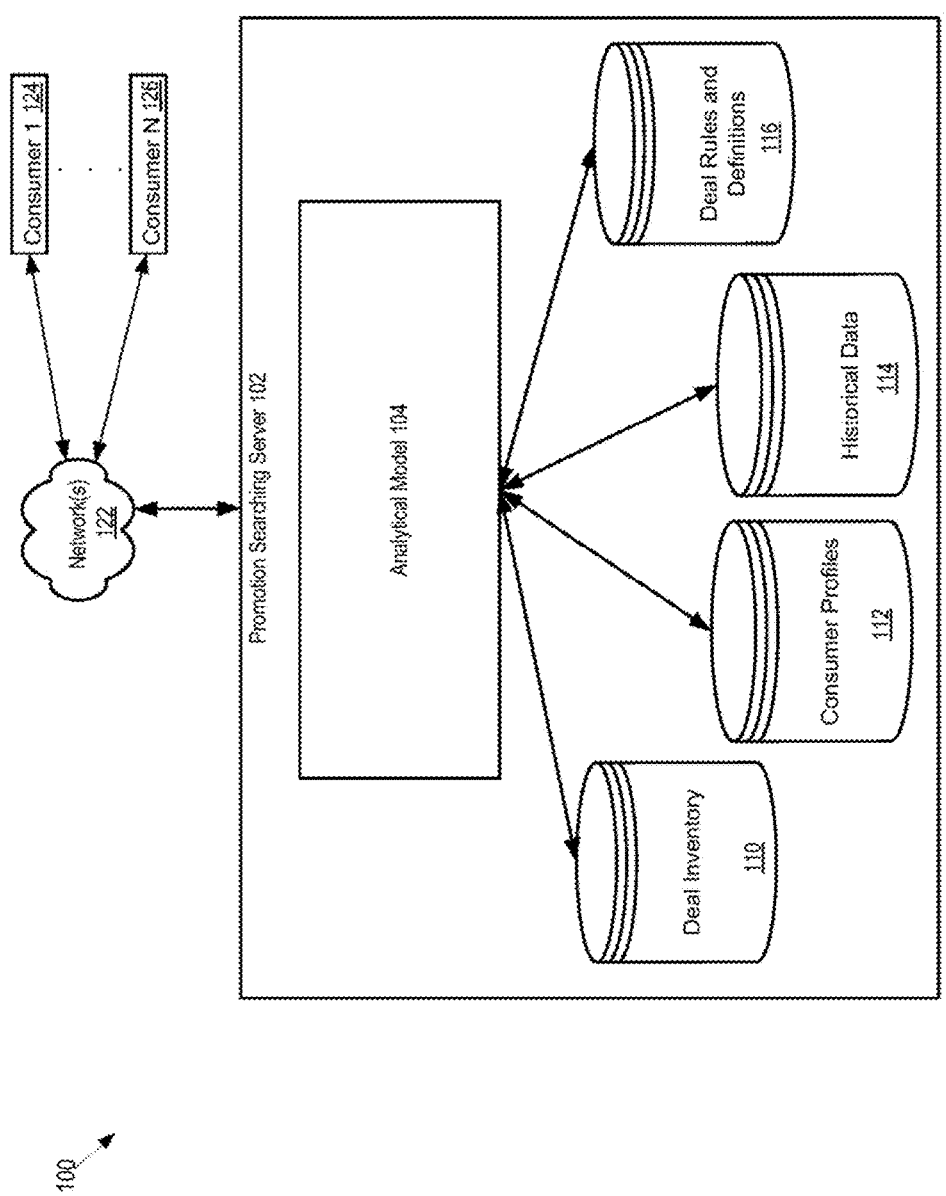
FIG. 1 illustrates a representation of a pull-type searching system for pull-type searching of deals for presentation to consumers in the pull-type searching system.

A pull-type searching system 100 is illustrated in FIG. 1, wherein consumers input one or more search terms to a pull-type searching server 102. The pull-type searching server 102 is configured to analyze the one or more search terms, and responsive thereto, output one or more deals for presentation to the consumer.

A deal in the pull-type searching system 100 may include any type of reward, discount, coupon, credit, promotion, voucher or the like used toward part (or all) of the purchase of a product or a service. The deal may also include merchandise goods that are being offered for sale. For instance, goods deals may include offers for sale of clothing, electronic devices, school supplies, jewelry, sporting goods, kitchen goods, cosmetic goods and the like. The list of possible deals is not exhaustive, and has been provided for illustrative purposes only. A deal may essentially be anything that can be offered for sale by a merchant (whether sourced by the pull-type searching server 102 or sourced by a third-party merchant). Deals may be offered as part of a larger deal program, or the deal may be offered as a stand-alone one-time deal. In this way, the pull-type searching system 100 is configured to provide a way to navigate deals and to identify a deal for selection.

The pull-type searching system 100 includes the pull-type searching server 102 that communicates with one or more consumers (consumer 1 (124) to consumer N (126)) via network 122. The network 122 may include one or more wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The communication to and/or from the consumer may take the form of webpage message, an email, SMS text message, VOIP voice message, real-time webpage content presentation, mobile push notifications or other similar types of electronic correspondences. More specifically, the pull-type searching server 102 may provide an electronic communication to the consumer electronic device (operated by the consumer) of the same type as received by the consumer electronic device. For example, the consumer electronic device may send input via a webpage, so that the pull-type searching server 102 sends the response via a webpage for display on the consumer electronic device.

As discussed below with respect to FIG. 1, consumer 1 (124) to consumer N (126) may comprise any type of electronic device configured to communicate via a network. Further, FIG. 1 illustrates pull-type searching server 102; however, any type of electronic device responsive to consumer input, in addition to a server, is contemplated.

The pull-type searching server 102 includes an analytical model 104 that is in communication with databases 110, 112, 114, 116. The analytical model 104 may include one or more components for implementing the functionality described in the flow charts discussed herein. As merely some examples, the analytical model 104 is configured to generate, for sending to the consumer, ordered selectable search criteria including categories, subcategories, deal types, redemption goals, location(s), or any combination thereof. The analytical model 104 is further configured to receive selection criteria for one or more selectable categories, one or more selectable deals, or the combination thereof.

To perform the various analyses, the analytical model 104 communicates with multiple databases that are part of (or work in conjunction with) the pull-type searching server 102, such as a deal inventory database 110, consumer profiles database 112, historical data database 114 and deal rules and definitions database 116. With respect to the particular consumer, the analytical model 104 may access the databases 110, 112, 114 and 116 in order to obtain specific information on the particular consumer and the various deals in the pull-type searching system 100.

The deal inventory database 110 is configured to store data detailing various deals and deal programs that are available for offer in the pull-type searching server 102. In order to input deal program information into the deal program database 110, merchants may optionally communicate via the networks 122 with the pull-type searching server 102 to input the information detailing the various deal program offerings. The deal inventory database 110 may also include a repository of deals, such as disclosed in U.S. application Ser. No. 13/460,745, incorporated by reference in its entirety. The repository of deals includes one or more deals that may be available for selection to present to a consumer. When compared to the other deals in the deal inventory database 110, the deals in the repository of deals may be available for a prolonged period of time. In some embodiments, the repository of deals may be stored in any one of the other databases 112, 114, 116, or alternatively stored as part of a separate database not illustrated.

In some embodiments, the repository of deals may be comprised of multiple deal repositories. For instance, a first repository of deals may include deals that are offered to consumers for a shorter period of time (such as up to 1 week) and a second repository of deals may include deals that are offered to consumers for a longer period of time (such as up to 6 months). One example of the first repository of deals comprises a "daily deals" repository. Another example of the first repository of deals comprises a "NOW deals" repository, in which deals are offered for redemption in near real-time (such as in a few hours or less than 1 day). Still another example of the first repository of deals comprises a "goods deals" repository, in which hard consumer goods are offered. Yet another example of the first repository of deals comprises a "getaways" repository, in which travel deals are offered.

In some embodiments, a deal in the deal inventory database 110 may be part of the first repository of deals and featured during an initial feature period. As part of the first repository of deals, the deal may be publicly available for selection and presentation to a consumer in the pull-type searching system 100 during the initial feature period. After the initial feature period passes, the deal may be included as part of the second repository of deals. However, not all deals that pass their initial feature period need be selected for inclusion in the second repository of deals. In one embodiment, the deals that are included in the second repository of deals are not publicly available by some (or all) of the consumers.

The consumer profiles database 112 includes profiles for the consumers, such as consumer 1 (124) to consumer N (126), that are included in the pull-type searching system 100. The consumer profiles may include any combination of the possible information described above. In turn, the information found in a consumer's profile may be referenced as part of an analysis performed by analytical model 104.

The historical data database 114 includes information detailing the past performance of deal offerings that have been presented from the pull-type searching server 102 in previous times. The past performance data may include, but is not limited to, rates of acceptances of specific deal programs, revenue generated from the sale of each deal, attributes of consumers that accepted or rejected specific deal programs, and the like. The historical data database 114 may also include information detailing the past behavior of a specific consumer. For instance, the historical data database 114 may include information detailing a past deal purchasing history for the consumer. The past deal purchasing history may identify amounts spent by the consumer, times at which the consumer bought deal, merchants from whom the consumer bought from, locations from which the consumer bought, locations of the deals the consumer bought, distance of the deal from the consumer when the consumer bought, and the like.

The deal rules and definitions database 116 includes information detailing, for example, rules to be applied during the analysis for selecting one or more deals for presentation to the consumer. For instance, one or more rules are applied as shown at block 210 of FIG. 2.

Figure 2:
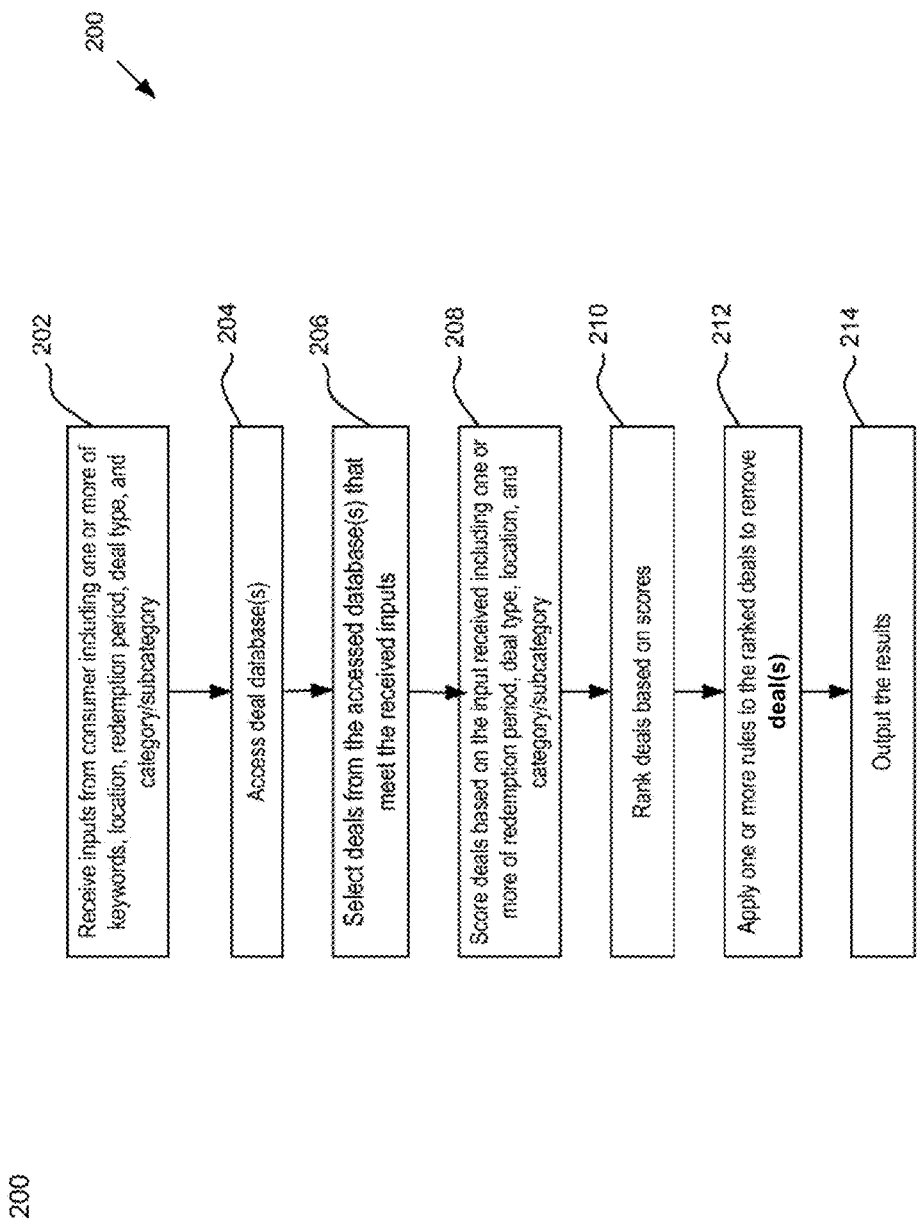
FIG. 2 illustrates a flow chart describing an overview of a process for receiving inputs from a consumer, and outputting search results to the consumer based on the received input.

FIG. 2 illustrates a flow chart describing an overview of a process for receiving inputs from a consumer, and outputting search results to the consumer based on the received input. At 202, the inputs are received including one or more of keywords, location, redemption period, deal type and category/subcategory.

Keywords are significant or descriptive words that the consumer may submit. Examples of keywords include "Italian food", "haircut" or the like. Location may be indicative of a location of the consumer. Locations may be input in one of several ways. One way is to input an address in a field of a webpage, such as illustrated in FIG. 4 ("1 Bay St, Palo Alto, Calif."). Another way for the consumer to input an address is by signing in as a previously registered consumer. The pull-type searching server 102 has previously correlated an address to the registered consumer, such as via a consumer profile correlated to the registered consumer. Still another way is for a consumer's mobile device to identify a location based on conventional techniques (e.g., GPS, cell tower triangulation, local WiFi identification, etc.). In this way, the pull-type searching server 102 is able to access a location for the consumer.

A redemption period may further be input by the consumer. Redemption period is one example of a redemption goal, which relates to any purpose associated with redemption of a deal. The redemption period is indicative of a time period in which a deal is to be redeemed. Different deals may have different redemption periods. For example, a deal may have a redemption period of a few hours or less than 1 day. These type of deals may be considered as having a near real-time redemption period. As another example, a deal may have a redemption period of a few days, 1 week, 1 month, etc. Alternatively, the redemption period may comprise an indication of a time at which the deal is redeemable (e.g., a breakfast meal deal may only be redeemable during breakfast hours). As discussed in more detail below, the ability of the consumer to input a redemption period enables the pull-type searching server 102 to better select deals to present to the consumer.

The consumer may further input a category and/or a subcategory for the deal. The category of the deal is an attribute of the deal, such as a "food & drink", a spa deal, a travel deal, a local deal, etc. The subcategory of the deal is in a hierarchical relationship to the category and further defines the attribute of the deal, such as a Japanese restaurant (in which the category is a "food and drink", see FIG. 4), a Massage deal (in which the category is "beauty"), etc.

The consumer may additionally input a selection of one or more deal types (DTs). Deal types are discussed in U.S. Application No. 61/695,857, entitled "Promotion Offering System" filed on Aug. 31, 2012, hereby incorporated by reference in its entirety. The DTs may be defined in one of several ways. In one embodiment, DTs are defined as a taxonomy different from categories/subcategories. In particular, categories/subcategories are one type of taxonomy or classification, and DTs are another distinct type of taxonomy or classification.

In another embodiment, DTs are defined based on the structure of the taxonomy. For example, categories/subcategories may be defined as a hierarchy with multiple layers. More specifically, in one embodiment, the categories/subcategories include at least two levels, one level defining categories and a sub-level defining the subcategories. An alternate embodiment includes a hierarchy of 3 levels including category, subcategory, and sub-subcategory. One example of the category spa, the subcategory massage, and the sub-subcategory divided into massage types (e.g., Reiki, Back-Neck Massage, Full Body Massage, Foot Massage, and Facial Massage). In contrast, the DTs may be defined as a single layer without multiple levels. More specifically, the DTs may have a horizontal relationship with one another, but not a vertical relationship owing to the single layer hierarchy.

In still another embodiment, the DTs may be defined with respect to, or independent of, categories and/or subcategories. In one aspect, the definition of the DTs may be dependent on a category and/or subcategory. For example, one of the DTs may comprise "adrenaline". The DT for "adrenaline" may be defined based on a look-up table that correlates to particular subcategories, such as the subcategory "hot air balloons", the subcategory "skydiving", the subcategory "scuba diving", etc. In this way, the DTs may be defined based on multiple categories and/or subcategories. In another aspect, the definition of the DTs may be independent of category and/or subcategory. For example, the DTs may be manually assigned. In this way, the assignment of the DTs is not based on a direct correlation with categories or subcategories.

In yet another embodiment, the DTs may be based on one or more aspects of the consumer to which the DT is assigned. For example, one or more DTs may also be suggested to be associated with the consumer based on the consumer's past behavior. In this way, a DT is distinct from any one deal category, and serves to define one or more aspects of the consumer. More particularly, the DT is indicative of one or more aspects of the consumer, whereas the categories/subcategories are indicative of one or more aspects of the merchant. For instance, a DT is indicative of a characteristic of the consumer, such as a description of a personality or trait of the consumer, a description of an interest or pursuit of the consumer, and/or a description of an activity or action of the consumer.

In still another embodiment, both the DTs and the categories/subcategories are defined based on the merchant, but defined based on different aspects of the merchant. As discussed above, for example, the category of the deal may comprise a restaurant deal, a spa deal, a travel deal, a local deal, and the respective sub-category of the deal may comprise a Japanese restaurant, a Massage deal, a Caribbean cruise deal, and a local farmer's market deal. In contrast, the DTs may include "family friendly", which may comprise a "family friendly" restaurant, "family friendly" Japanese restaurant, etc. So that the DTs describe an aspect of the merchant which is separate from the category and/or subcategory description.

In yet another embodiment, the DTs are distinguished from categories/subcategories in their application and/or use. For example, the DTs may be assigned to a deal in a different way from the assigning of the category/subcategory of the deal. As another example, the DTs may be used in a different way from the category/subcategory in determining whether to present the deal to the consumer. More specifically, the category/subcategory may be used in one step (such as the initial estimate of the probability of acceptance of the deal) and the DTs may be used in another step (such as to determine a correction factor), as discussed in more detail below.

A DT may include, for example, a food interest group, outdoors interest group, home improvement interest group, children's related interest group, pampering and leisure interest group, pet enthusiast's interest group, healthy life style interest group, extreme sports interest group, traveling interest group, music and concert interest group and car enthusiast interest group among others. The examples given for DT are merely for illustration purposes. Other DTs are contemplated.

Further, the deal types may depend on the location, and may vary based on geographical location, such as shown in table 1 below.

TABLE 1

Deal types by City

| Chicago | | Seattle | | Ann Arbor |
|---|---|---|---|---|
| 55 | fountain-of-youth | 27 | always-learning | 9 tee-time |
| 53 | pampered | 25 | pampered | 6 Pampered |
| 44 | swimsuit-season | 24 | swimsuit-season | 5 good-for-gifting |
| 37 | girls-night-out | 18 | fountain-of- | 5 sporting-life |
| 30 | new-car-smell | 17 | girls-night-out | 5 Foodie |
| 27 | foodie | 14 | foodie | 5 fresh-air |
| 22 | fresh-air | 13 | kitchen-couture | 5 swimsuit-season |
| 18 | always-learning | 11 | fresh-air | 4 lighter-footprint |
| 18 | tee-time | 9 | simple-pleasures | 4 the-finer-things |
| 16 | simple-pleasures | 8 | new-car-smell | 4 cultural-pursuits |
| 15 | kitchen-couture | 7 | once-in-a- | 4 home-theater |
| 15 | sporting-life | 7 | sporting-life | 4 Beaches |
| 9 | cultural-pursuits | 7 | tee-time | 3 girls-night-out |
| 9 | good-for-gifting | 6 | cultural-pursuits | 3 once-in-a-lifetime |
| 9 | once-in-a-lifetime | 6 | lighter-footprint | 3 do-gooder |

TABLE 1-continued

Deal types by City

| Chicago | | Seattle | | Ann Arbor |
|---|---|---|---|---|
| 8 | photographic | 5 | photographic | 3 fountain-of-youth |
| 6 | just-dance | 5 | do-gooder | 3 b-b |
| 5 | lighter-footprint | 4 | casino-night | 3 romantic-getaway |
| 4 | beaches | 4 | just-dance | 3 simple-pleasures |
| 4 | Comedic | 4 | beaches | 3 small-town-charm |

Still other inputs from the consumer are contemplated including: the amount of discount offered by the deal, a price range that includes the value of a discount offered by the deal, etc.

At 204, one or more deal databases are accessed. In one aspect, deals may be associated with different groupings of deals. For example, deals may be associated with a first grouping indicative of immediate (or near immediate) redemption of deals (such as within a few hours or a single day). As another example, deals may be associated with a second grouping indicative of an advertised type of deal (such as "Daily Deals"). The deals in the different deal groupings may be stored in a single database, or multiple databases. Regardless, in one embodiment, the pull-type searching server 102 is configured, responsive to consumer input, to search for deals in different deal groupings. In an alternate embodiment, the pull-type searching server 102 is configured, responsive to consumer input, to search for deals in only a single deal grouping.

At 206, the deals are selected from the accessed database(s) that meet the consumer input. The consumer input may be used by the pull-type searching system to select deals, match category/subcategory, deal type, redemption period and keywords.

At 208, the selected deals are scored. Deals may be evaluated in one of several ways. One way is to score the deals, such as disclosed in U.S. patent application Ser. No. 13/411,502, incorporated herein by reference in its entirety. In generating the score, one or more of the inputs may be used. The pull-type searching system may use the category/subcategory, deal type and user location information to identify one or more deals for selection.

At 210, the deals are ranked based on the generated scores.

At 212, one or more rules are applied to adjust one or more of the ranked deals, such as: (1) removing the ranked deal(s) in order to prevent presentation to the consumer and/or prevent purchase by the consumer; (2) modifying the terms of the ranked deals (such as the discount offered); (3) adjusting the rank of the deals; and/or (4) proposing an action to the consumer (such as suggesting that the consumer enroll in a rewards program for a merchant that the consumer frequents). The rule may examine the deal itself, the merchant selling the deal, or a combination of both. In this way, the rule may manifest a desire of the merchant to constrain who can see and purchase a deal.

For example, a merchant may wish to restrict a consumer to purchasing a deal only once every N days, where N is configurable on a per deal basis. When a consumer is no longer eligible for a deal, the deal may be filtered out or removed from the consumer's browse results so that the consumer cannot view the deal until after the N day period. The analytical model 104 may thus examine the deal itself by checking one or more databases in order to ensure that the consumer does not violate the rule. In particular, the analytical model 104 may access historical data in database 114 in order to determine whether the particular consumer has purchase the deal within the predetermined period (such as "N" days). Alternatively, or in addition, the analytical model 104 may check whether the same credit card (or other type of account) was used to purchase the deal within the "N" day period. In this event, the analytical model 104 may decline the purchase and output a message of "Sorry, you've already purchased this deal already."

As another example, the rule may examine the consumer's previous relationship (e.g., previous purchases or previous offers offered to the consumer, including unselected and/or accepted previous offers) with the merchant in order to determine whether to modify one or more terms of the deal. In particular, the analytical model 104 may examine whether the consumer has purchased a deal from the merchant (such as within "M" days). In this case, the analytical model 104 may adjust the deal, such as offer a lower discount for the deal under certain circumstances, e.g. when the consumer has purchased a deal at the merchant in the last 6 months. In this way, the merchant's deal is still presented to the consumer rather than being hidden.

The pull-type searching system may thus remove the deal from presentation, or increase or decrease a discount presented to the consumer based on whether the consumer previously interacted with the pull-type searching server 102, including whether the consumer has previously viewed a deal and/or previously selected the deal for purchase. For example, when a user views an offer on a previous day and returns to view the offer on another day, the offered discount may be adjusted based on the pull-type searching server 102 identifying the previous view of the offer (e.g., increasing the offered discount in order to entice the user to select the offer). The adjustment to the discount offered to the user for a deal or removal of the deal from presentation may be based on the elapsed time (e.g., seconds, minutes, hours, days, months, years) between a previous viewing of the offer by the user, in addition to the user's profile.

As still another example, the rule may examine the customer's past purchase history. Under certain circumstances (such as for repeat customers), the analytical model 104 may use this information as a trigger to offer to enroll the customer in the merchant's loyalty program. The offer of enrollment in the loyalty program may be separate from (or in addition to) the variable price for the discount offered, as discussed above.

At 214, the results are output for review by the consumer.

Figure 3:
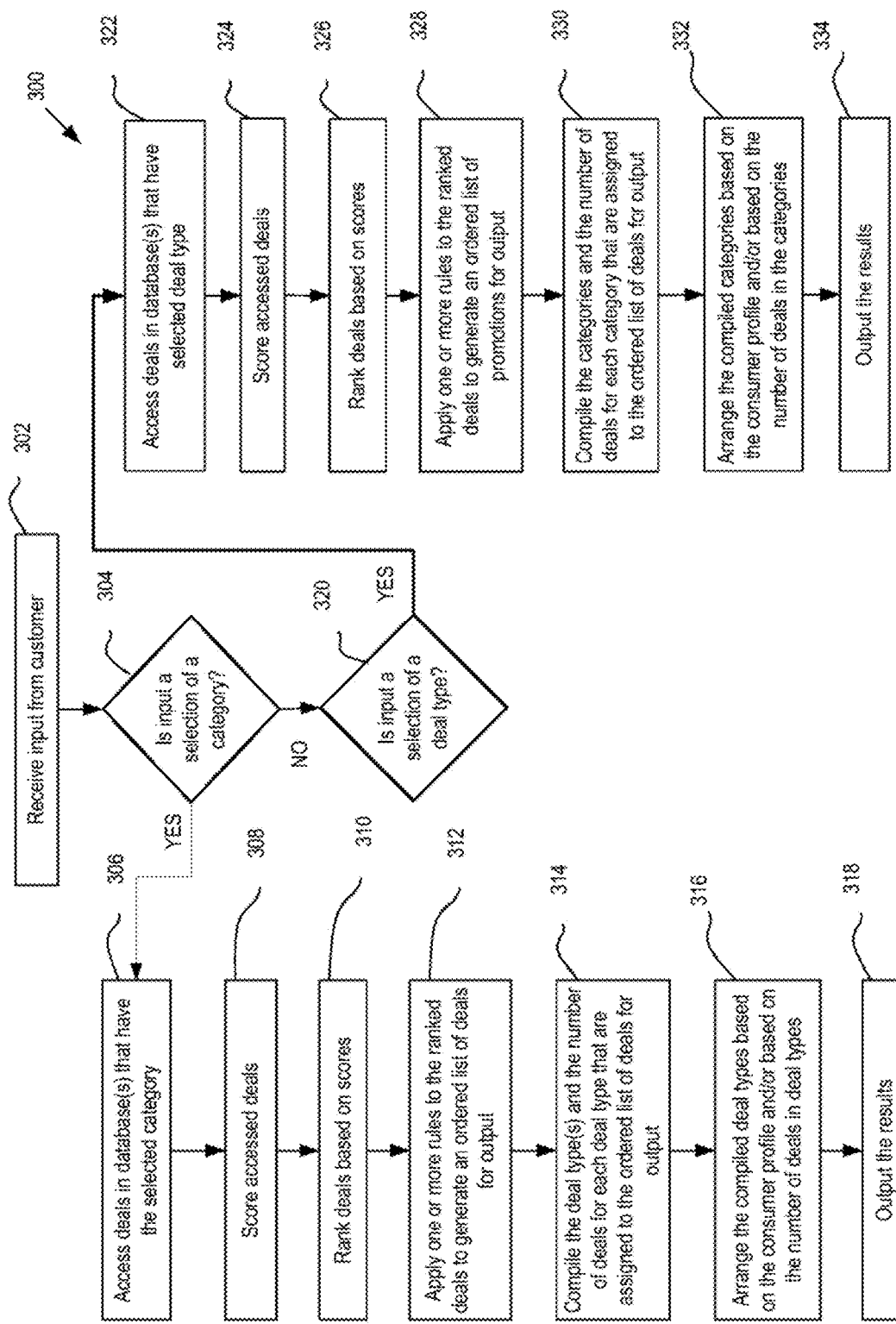
FIG. 3 illustrates a flow chart describing a process for receiving an input from a consumer, determining whether the input is related to one taxonomy (such as categories or deal types) and updating the user interface for the other taxonomy based on the input.

FIG. 3 illustrates a flow chart 300 describing a process for receiving an input from a consumer, determining whether the input is related to one taxonomy (such as categories or deal types) and updating the user interface for the other taxonomy based on the input. As discussed above, deal types relate to a first taxonomy for the deals and categories/subcategories relate to a second taxonomy. In one embodiment, the first taxonomy may be directly related to the second taxonomy. For example, a deal type may be correlated to a plurality of categories and/or subcategories. As discussed above, one example of the deal types is "adrenaline". The "adrenaline" deal type may be defined based on a look-up table that correlates to particular subcategories, such as the subcategory "hot air balloons", the subcategory "skydiving", the subcategory "scuba diving", etc. In this way, there is a direct correlation between a deal type and a plurality of categories or subcategories. As another example, a deal type may be indirectly correlated to a plurality of categories and/or subcategories. A specific deal type may be assigned to one or more deals. The assignment of the deal type may be performed manually or automatically (such as by examining attributes of the deal and automatically assigning the deal type of the deal). Likewise, the category/subcategory may be assigned to one or more deals. And, the assignment of the category/subcategory may be performed manually or automatically (such as by examining attributes of the deal and automatically assigning the category/subcategory of the deal). In this way, there is an indirect correlation between the deal type and the categories/subcategories (through the deals assigned to both). Accordingly, a selection of a category, for example, will affect which deal types are related (either directly or indirectly), and in turn which deal types are displayed in response to the category selection. Likewise, a selection of a deal type will affect which categories or subcategories are related (either directly or indirectly), and in turn which categories are displayed in response to the deal type selection. Thus, in certain embodiments, given the indirect or direct correlation between deal types and categories/subcategories, the analytical model may update one taxonomy based on the selection by the user of a second taxonomy.

At 302, the pull-type searching system receives input from the user (consumer). At 304, the system determines whether the input is a selection of a category or subcategory. If not, then at 320, the system determines whether the input is a selection of a deal type. The input from the consumer may be in response to an initial user interface displayed by the pull-type searching server to the consumer. Alternatively, the input from the consumer may be in response to a subsequent user interface displayed by the pull-type searching server to the consumer.

For example, the pull-type searching server may display an initial user interface to the consumer. The initial user interface may include any combination of the following: categories and/or subcategories; deal types; keyword search field; redemption goal field. The keyword search field enables the consumer to enter one or more keyword search terms. The redemption goal field enables the consumer to enter one or more terms (such as a date) by which to redeem the deal.

For example, in response to the initial user interface, the consumer may enter one or more keywords. In response, the pull-type searching server 102 may select one or more deals associated with the keywords, as discussed above. Further, the pull-type searching server 102 may determine the categories or subcategories of the matched deals and determine the deal types of the matched deals. The pull-type searching server 102 may then display, in a first subsequent user interface, part (or all) of the matched deals, part (or all) of the categories or subcategories of the matched deals, and part (or all) of the deal types of the matched deals. In this way, the pull-type searching server is configured to generate a user interface responsive to the keyword search of the consumer (including sending deals responsive to the keyword search), and is configured to send information using two different taxonomies related to the results of the search (including categories/subcategories and deal types related to the results of the search).

In response to receiving the first subsequent user interface, the consumer may: (1) select a deal from the matched deals; (2) select a category (or subcategory); or (3) select a deal type. The pull-type searching server 102 may then generate a second subsequent user interface depending on the consumer's selection. In particular, if the consumer selects a deal from the matched deals, the pull-type searching server 102 may send a webpage describing the selected deal. If the consumer selects a category (or subcategory), the pull-type searching server may modify the set of matched deals (e.g., to only include the matched deals in the selected category or subcategory) and may modify the deal types of the matched deals (e.g., to only include the deal types that correlate with the selected category or subcategory), as described below. Further, if the consumer selects a deal type, the pull-type searching server may modify the set of matched deals (e.g., to only include the matched deals in the selected deal type) and may modify the categories (or subcategories) of the matched deals (e.g., to only include the categories that correlate with the selected deal type), as described below. The consumer may iterate with subsequent user interfaces (inputting keywords, category selections and/or deal type selections) until the consumer is satisfied with the set of deals presented by the pull-type searching server 102. In this way, the user interfaces present the user with two taxonomies in order to more easily allow the consumer to search for deals offered by the pull-type searching server 102.

At 306, when the input is identified as a selection of a category or subcategory, the pull-type searching system accesses deals in one or more databases with deals in the selected category or subcategory. At 308, the pull-type searching system scores the accessed deals and, at 310, ranks the deals based on the scores. Then, at 312, the pull-type searching system applies one or more rules to the ranked deals in order to generate an ordered list of deals for output. In one embodiment in which the deal types are indirectly correlated to the categories or subcategories, the pull-type searching system is configured to identify the deal types by examining the ordered list of deals. In particular, at 314, the pull-type searching system compiles the one or more deal types and the number of deals for each deal type assigned to the ordered list of deals for output. In an alternate embodiment in which the deal types are directly correlated to the categories or subcategories, the pull-type searching system is configured to identify the deal types by examining the category or subcategory selected, and then, based on the direct correlation, identify the deal types. At 316, the pull-type searching system arranges the one or more deal types based on the consumer profile and/or the number of deals for each deal type and, at 318, outputs the results. As one example, the pull-type searching system arranges the order of the deal types for display based on the number of deals in the ordered list for output are in each respective deal type. As another example, the pull-type searching system may access the consumer profile to determine whether the consumer has previously selected one or more deal types of interest. In the event that the consumer has identified deal types of interest, the pull-type searching system may compare the deal types of interest in the consumer profile with the identified deal types, determine whether there is a match between the deal types of interest in the consumer profile and the identified deal types, and in the event of a match, generate an output that indicates the match (such as a visual indicator that indicates a consumer favorite 422).

When the input is not identified as a category or subcategory, the pull-type searching system identifies, at 320, whether the input is identified as a selection of a deal type. If so, at 322 the pull-type searching system accesses deals in one or more databases with deal in the selected deal types. At 324, the pull-type searching system scores the accessed deals and, at 326, ranks the deals based on the scores. At 328, the pull-type searching system applies one or more rules to the ranked deals in order to generate an ordered list of deals for output. At 330, the pull-type searching system compiles the one or more categories and the number of deals for each category assigned to the ordered list of deals for output. At 332, the pull-type searching system may arrange the one or more categories based on the consumer profile and/or the number of deals in the categories and, at 334, outputs the results. As one example, the pull-type searching system arranges the order of the categories for display based on the number of deals in the ordered list for output are in each respective category.

Figure 4A:
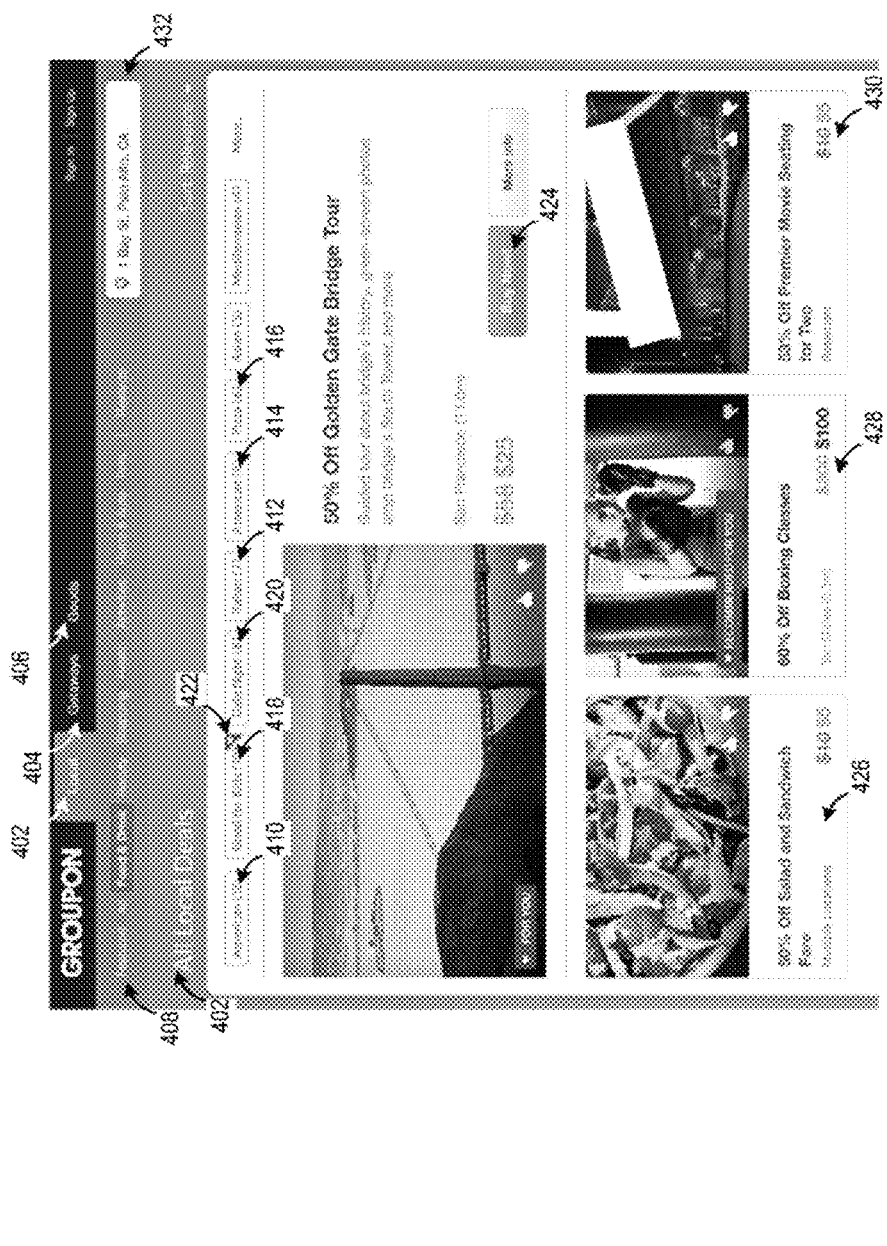
FIGS. 4A and 4B show pull-type searching system user interfaces.

FIG. 4A shows a pull-type searching system user interface 400A. The pull-type searching system user interface 400 may include selectable deal types (e.g., local 402 and getaways 404) and goods 406, and categories 408 that include deals ordered by the number of deals in the categories, subcategories and deal types. When a deal type 402 is selected, the pull-type searching system presents categories, subcategories (410, 412, 414, 416) and deal types for selection (418, 420). As discussed above, the deal type may be directly or indirectly correlated to categories and/or subcategories, so that a selection of a deal type may implicate categories and/or subcategories. The pull-type searching system provides a visual indicator that indicates a consumer favorite 422. The pull-type searching system user interface 400 presents deals (424, 426, 428, 430) for a deal type 402 the pull-type searching system determines most probable for selection based on the user's profile, the deals available for selection and/or user's location 432.

As discussed above, the pull-type searching server 102 may select deals to send to a consumer (for viewing on the consumer's electronic device) based on the consumer's keyword input, based on the consumer's selection of a category/subcategory or deal type, and/or based on the consumer profile. Alternatively (or in addition), the pull-type searching server 102 may configure the user interface based on the deals selected for viewing, based on the consumer's selection of a category/subcategory or deal type, and/or based on the consumer profile, an example of which is illustrated in FIG. 4B, which shows another pull-type searching system user interface 400B.

The pull-type searching system may dynamically change the navigation, as well as the information presented in the user interface, to order, suppress, and/or arrange the categories, subcategories (410, 412, 416, 434) and deal types (420) for selection based on the search results and/or the consumer's profile. For example, a consumer may select a category such as "food and drink" that when selected presents other categories, subcategories (410, 412, 416, 434) and deal types for selection (420), such as "Mediterranean", "Italian", "pizza", "date night", and "American", which may be ordered alphabetically, according to popularity or user profile (e.g., user identified preferences).

As another example, the pull-type searching system may implement dynamic navigation based on the consumer profile associated with the consumer requesting the search. More specifically, a consumer profile may be associated with the consumer requesting the search and may include information regarding past purchases (such as past purchases by the consumer in particular categories or subcategories) or past consumer selections (such as a consumer selection of the "foodie" deal type). The pull-type searching server 102 may arrange the user interface based on the consumer profile and/or based on the results of the search. In one implementation, the pull-type searching server 102 examines the set of deals resulting from the search, such as the categories/subcategories and/or deal types of the deals resulting from the search, and orders the listing of the categories/subcategories and/or deal types in the user interface based on the consumer profile. In the example described above, if the consumer has previously selected the "foodie" deal type as a favorite and if the "foodie" deal type is one of the deal types resulting from the search, the user interface is changed accordingly to highlight the previous selection of the "foodie" deal type (including rearranging the icon associated with the "foodie" deal type on the user interface or maintaining the placement of the icon associated with the "foodie" deal type on the user interface but changing the icon to show the selection, see 422 in FIG. 4A). As another example described above, if the consumer has previously purchased deals in the "Thai restaurant" subcategory and if the "Thai restaurant" subcategory is in the results from the search, the user interface is changed accordingly to highlight the previous purchase of the "Thai restaurant" subcategory (including rearranging the icon associated with the "Thai restaurant" subcategory on the user interface or maintaining the placement of the icon associated with the "Thai restaurant" subcategory on the user interface but changing the icon to show the previous purchase).

Figure 4B:
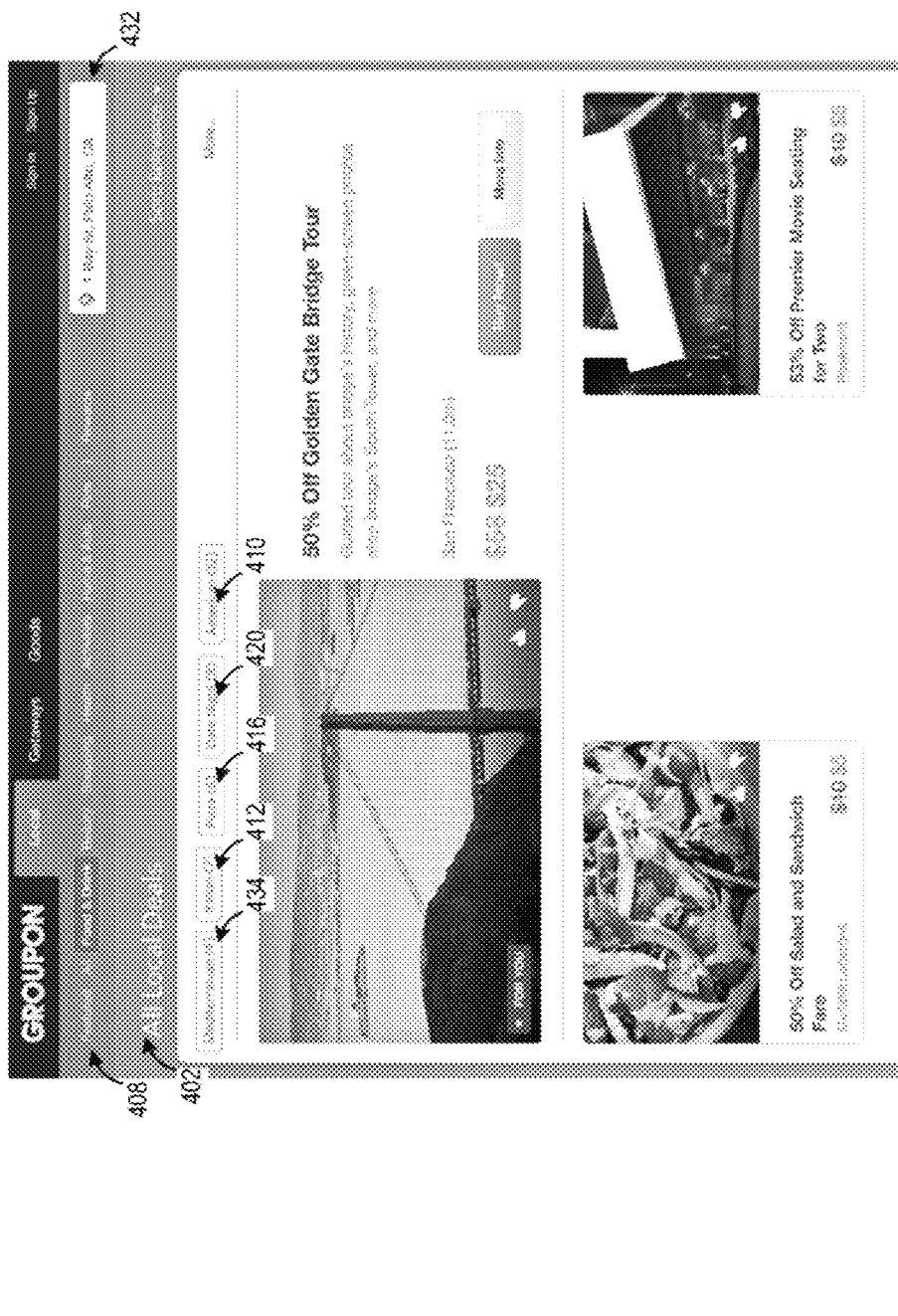

As shown in FIG. 4B, the pull-type searching system may implement dynamic navigation by ordering an item (e.g., the "Mediterranean" 434) first in the list of categories, subcategories (410, 412, 416, 434) and deal types (420) for selection because of a user identified preferences, so that different users may be presented with fewer or more and in various orders of categories, subcategories (410, 412, 416, 434) and deal types (420) for selection.

Thus, the number and order of the categories, subcategories (410, 412, 416, 434) and deal types (420) the pull-type searching system presents may be based on the overall relevance of a category (e.g., more relevant) although one or more of the individual results in the category may be less relevant than one or more of the individual results in another category. For example, the pull-type searching system present the item (e.g., the "Mediterranean" 434) first in the list of categories, subcategories (410, 412, 416, 434) and deal types (420) because the category "Mediterranean" may be more relevant than another category (e.g., "Italian" 412), although the individual results (e.g., 4 selectable deals) for "Mediterranean" are less relevant to the keyword(s), user's profile and/or user input search criteria than one or more of the individual results for "Italian" (e.g., 7 selectable deals one or more of which is more relevant than the category). The number and order of the categories, subcategories (410, 412, 416, 434) and deal types (420) that the pull-type searching system presents is dynamic based on the keyword(s), user's profile (e.g., purchase history and/or offer-deal acceptance history) and/or user input search criteria. The pull-type searching system is trained to present the number and order of the categories, subcategories (410, 412, 416, 434) and deal types (420) based on analyzing historical and real-time data, and the rate of user selection (e.g., statistics for individual users and multiple users) of the categories, subcategories (410, 412, 416, 434) and deal types (420), the keyword(s), user's profile (e.g., purchase history and/or offer-deal acceptance history) and/or user input search criteria.

In determining whether to present deals to the consumer in response to a search request, the pull-type searching server may evaluate deals on an individual basis, and/or on a collection basis. As discussed in U.S. Provisional Application No. 61/663,508, hereby incorporated by reference in its entirety, a collection or grouping of deals may be analyzed to determine whether to present the collection or grouping to the consumer. More specifically, the pull-type searching server may evaluate the collection or grouping (which may include a plurality of deals). Examples of groupings of deals include, without limitation, deals in a specific category, deals in a specific subcategory, deals in a specific deal type, local deals, short term exclusive deals, travel themed deals and holiday themed deals. The pull-type searching server 102 may select the deal collections based on the search terms provided by the consumer and/or based on the consumer profile. For example, if the consumer has indicated interest in a particular collection of deals (such as travel deals), the pull-type searching server may evaluate the particular collection of deals in response to the search terms input.

In one embodiment, the pull-type searching server may evaluate one or more deal collections in order to determine which deal collections to present and/or to determine how to arrange the deal collections for presentation. In an alternate embodiment, the pull-type searching server may evaluate deals individually and deals collectively. More specifically, the pull-type searching server may score deals individually and deals collectively in order to determine whether to present the deals or the deal collections and/or how to arrange the deals or the deal collections. For example, if only one deal in a first category is responsive to the search terms, and a collection of deals in a second category is responsive to the search terms, the pull-type searching server may evaluate the scores of the one deal in the first category versus the score for the collection of deals in the second category. Therefore, even if the score for the one deal in the first category is higher than the score for the collection of deals in the second category (meaning that the pull-type searching server estimates that the consumer will be more interested in the one deal in the first category), if the difference in scores is less than a predetermined amount, the pull-type searching server 102 may select the collection of deals in the second category for presentation based on the strength of the collection of deals as a whole. The pull-type searching system may merge categories together (e.g., by identifying the best deals from the correlated categories and putting the best deals together for presentation to the user).

The pull-type searching system is designed to provide one or more interfaces (such as the initial interface) in order for consumers to purchase goods or services (such as local goods or services). Whether the consumer merely seeks information regarding what deals are available (such as which deals are locally available), makes a purchase (such as placing a reservation), or places an order (such as submitting an order for takeout), the pull-type searching system enables the consumer to complete more transaction types from a single location (e.g., interface). Currently, consumers visit a number of content websites (e.g., Yelp®, OpenTable, Eat24, Living Social®, and Groupon®) to satisfy all of the consumer's requests.

Traditionally, some deal systems may curate a list of merchants who are offering some deal on services and goods rather than maintaining a comprehensive list of merchants. As a result, merchants lose out on the default behavior of many consumers (e.g., finding the best merchant to satisfy a particular consumer need) and sacrifice future consumer loyalty.

To use a real world example, if a consumer is planning a romantic date with another person, the consumer is more likely to search for the best date night restaurants in the area rather than looking for what restaurants are offering a deal. In these cases, the consumer may attempt to use search sites that connect people with great local businesses to find reviews, events, lists and to talk with other site consumers (e.g., Yelp®) rather than merely use a deal site (e.g., Groupon®). Once a consumer uses one or more particular search/content sites after so many times with positive results, a behavior is established, and the consumer is more likely to return to those providers (e.g., search/content sites) that helped the consumer in the past rather than visiting the right provider for a given need.

The pull-type searching system addresses the needs of consumers and provides a one-stop shop. The pull-type searching system offers consumers the ability to find high quality merchants in a specific area regardless of whether that merchant is actively offering a deal or not. The pull-type searching system provides and maintains (semi) comprehensive merchant listings.

While the pull-type searching system may not selectively remove negative reviews to promote a merchant, the system may delist an underperforming merchant from search results. As discussed above, one or more rules may be implemented in order to remove a deal from a ranked listing (see 212 in FIG. 2). In this way, a rule may be implemented in which a rating for a merchant that is below a predetermined amount results in removal of a deal that is sourced by the merchant.

There may be a number of merchants that the pull-type searching system has done business with before but that are fantastic merchants in an area. The pull-type searching system may list these fantastic merchants in search results. The pull-type searching system may receive reviews but not expose these reviews to the consumers.

Traditionally, the consumer performed research on a merchant before making purchases. Some consumers purchase immediately because the consumers either have previous knowledge about a merchant or the idea that the system is listing the merchant at a discount is enough. However, other consumers need more convincing so that the consumers either visit a content site (e.g., Yelp) to read more before returning the system to make a purchase or the consumers simply fail to make the purchase because the consumers do not have sufficient information about the merchant.

In one embodiment, the pull-type searching system is merchant focused, rather than deal focused. Currently, many deals systems are architected around deals rather than merchants. The pull-type searching system may list merchants based on whether the merchants are offering a deal or not. As such, consumers may have the ability to use the pull-type searching system for free in order to find a local merchant without purchasing a deal. However, the pull-type searching system and/or pull-type searching system interface may be used as a platform to launch other services (e.g., deals, reservations, takeout options, etc.). For example, both reservations and takeout/delivery orders may be launched on the pull-type searching system platform.

Currently, users of deals systems may be given rudimentary browse ability and basic search ability. For consumers that are looking for a specific type of item (e.g., pizza deals in Chicago), deal systems may offer the specific type of item in different repositories of deals, such as the specific type of item in daily deals, in NOW, etc. The pull-type searching system provides a way for the consumer to search for the specific type of item across multiple repositories of deals. In this way, the pull-type searching system is able to review deals from multiple sources, thereby providing a wide pool of deals from which to present. However, the abundance of deals may overwhelm the consumer if the list is merely regurgitated to the consumer. Therefore, the pull-type searching system, responsive to input from the consumer and/or responsive to internal analysis, is configured to reduce the number of deals presented to the consumer and/or arrange the deals presented to the consumer, thereby providing the consumers the tools to narrow in on the deals that the consumer may want to see.

Figure 5:
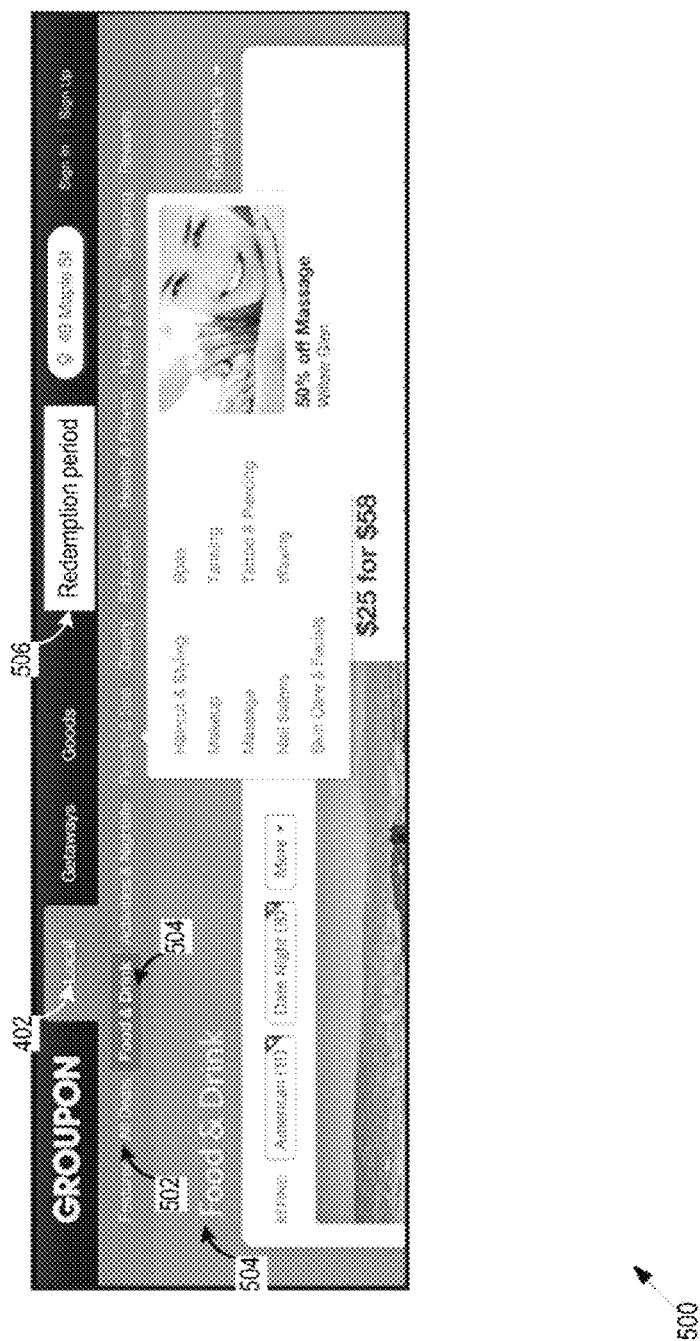
FIG. 5 shows another pull-type searching system user interface.

FIG. 5 shows another pull-type searching system user interface 500. The pull-type searching system is configured to create an interface with an integrated view of deals so that consumers do not have to go to "All Deals" 502 and "NOW" deals in order to see all Food & Drink 504 deals. Instead, the pull-type searching system allows consumers to review the entire inventory through a single view. The pull-type searching system further integrates the second repository of deals, from which the pull-type searching system offers deals to consumers based on identifying consumers probably interested in the deal. The pull-type searching system provides consumers the ability to review the entire inventory of deals and decide whether or not to purchase the deal. The pull-type searching system makes finding deals easy. The pull-type searching system allows consumers to look through a configurable number of deals (e.g., nearly 1,000 deals in the case of Chicago) by giving the consumers an easy-to-use interface. The pull-type searching system provides consumers the ability to parse deals to find something of interest to the consumer. The pull-type searching system provides consumers the ability to input a redemption period 506 (e.g., days, hours, minutes when the consumer plans to redeem a deal) that enables the pull-type searching server 102 to better select deals to present to the consumer.

Merchants may be wary of overexposure and reticent to sell deals to consumers who are already customers of the merchants. As discussed above, the pull-type searching system provides checks (e.g., monitors) to protect merchants (such as in the form of one or more rules).

The pull-type searching system is configured to respond to a variety of consumer requests, including consumer requests for a specific deal (e.g., a request with the name of the merchant) to consumer requests of a more general nature. With regard to specific requests, such as requests with a named merchant, the pull-type searching system is configured to vary the response to named-merchant requests based on one or more factors. For example, if the consumer is a first-time purchaser for this merchant on the pull-type searching system, then the pull-type searching system may offer the consumer the full discount deal. However, for repeat purchasers, the pull-type searching system may use the interaction to change the response in at least one aspect. For example, the pull-type searching system may send a response to the request by engaging the consumer in the merchant's loyalty program, as retention is actually the goal from the merchant's point of view.

The pull-type searching system may also optionally send as part of the response a reduced discount deal. More specifically, the merchant may generally offer a deal with a discount. The pull-type searching system, in response to determining that the consumer subject to the request has purchased from this merchant previously, may reduce the discount. The reduction in the discount may be made either independently of or dependent on the consumer. For example, the pull-type searching system may reduce the discount offered by a pre-determined percentage. Thus, for example, if the discount offered is $20, the pull-type searching system may reduce the discount by 25%, so that the reduced discount is $15. As another example, the pull-type searching system may reduce the discount based on analysis of the consumer. More specifically, if the consumer previously received a previous discount (as evidenced in the consumer profile database 112 or the historical data database 114), the pull-type searching system may reduce the discount to be less than the previous discount offered. In one instance, if the previous discount offered the consumer was $20 and the current discount offered is $20, the pull-type searching system may select the reduced discount to be less than the previous discount, such as $15. In another instance, if the previous discount offered the consumer was $20 and the current discount offered is $25, the pull-type searching system may select the reduced discount to be the same as the previous discount, or $20. In this way, the pull-type searching system may configure the response to the consumer's inquiry depending on the status of the consumer, such as whether the consumer is a previous purchaser from this merchant.

The pull-type searching system may provide consumers the ability to see all deals, including both the second repository of deals and one or more first repositories of deals. Currently, different search indexes may be used for the second repository of deals, daily deals and NOW local deals, which create a fragmented experience for consumers. When a consumer clicks on "All Local Deals" the consumer receive a list of all local deals from different repositories, including daily deals and NOW.

Figure 6:
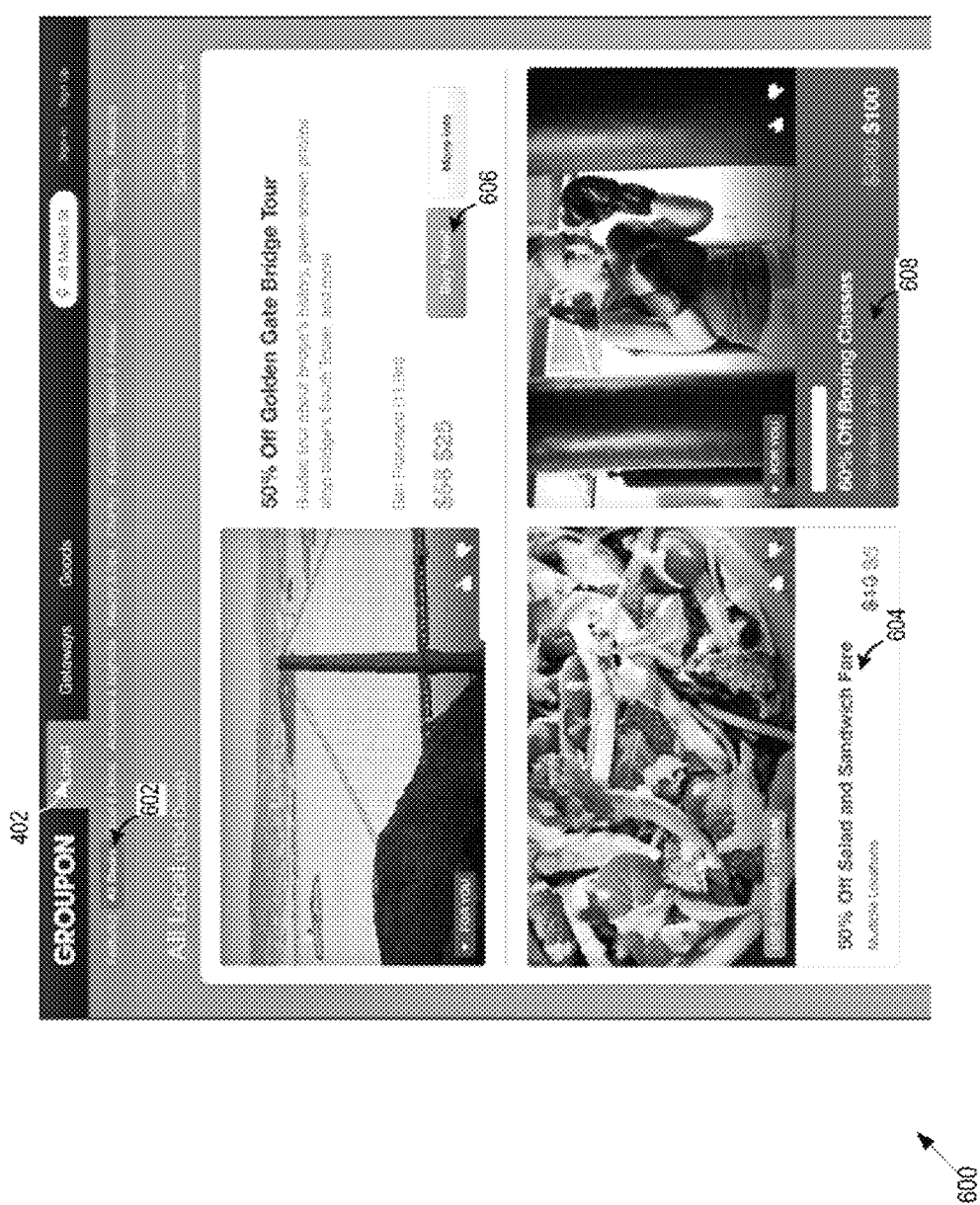
FIG. 6 shows another pull-type searching system user interface.

FIG. 6 shows another pull-type searching system user interface 600. When the consumer selects a deal type (e.g., local deal type 402) the pull-type searching system presents categories (602), subcategories and deal types. When the consumer selects a category (602), the pull-type searching system presents deals (604, 606, 608) for the category for consumer selection.

The pull-type searching system provides consumers the ability to see a map of merchants and the merchant's locations, and zoom in and out of the map, and so that the search results change depending on the map boundary. The pull-type searching system may provide lists, and free-text search, and gather data on what people are searching for. Based on the search results, the pull-type searching system refines the search suggestions and synonyms. As discussed above, the pull-type searching system provides consumers deals abstracted at a higher level, and options to filter the categories of deal types and deal types that the pull-type searching system identifies for which the consumers may be interested in receiving results.

The pull-type searching system provides a browse structure usable by e-commerce merchants. By way of example, consumers may be able to see categories like Restaurants & Bars, Health & Fitness, Beauty & Spa. Consumers may then be able to click on Restaurants & Bars and see categories/subcategories like Dessert, Italian Food, and Indian Food. As discussed above, deals are placed in various categories and subcategories. In one embodiment, in response to the consumer selecting a category (or subcategory), the pull-type searching system presents only a subset of deals from the selected category. More specifically, the pull-type searching system is configured to select the deals from the selected category that match the consumer's interests and location using deal types and the consumer's address.

Figure 7:
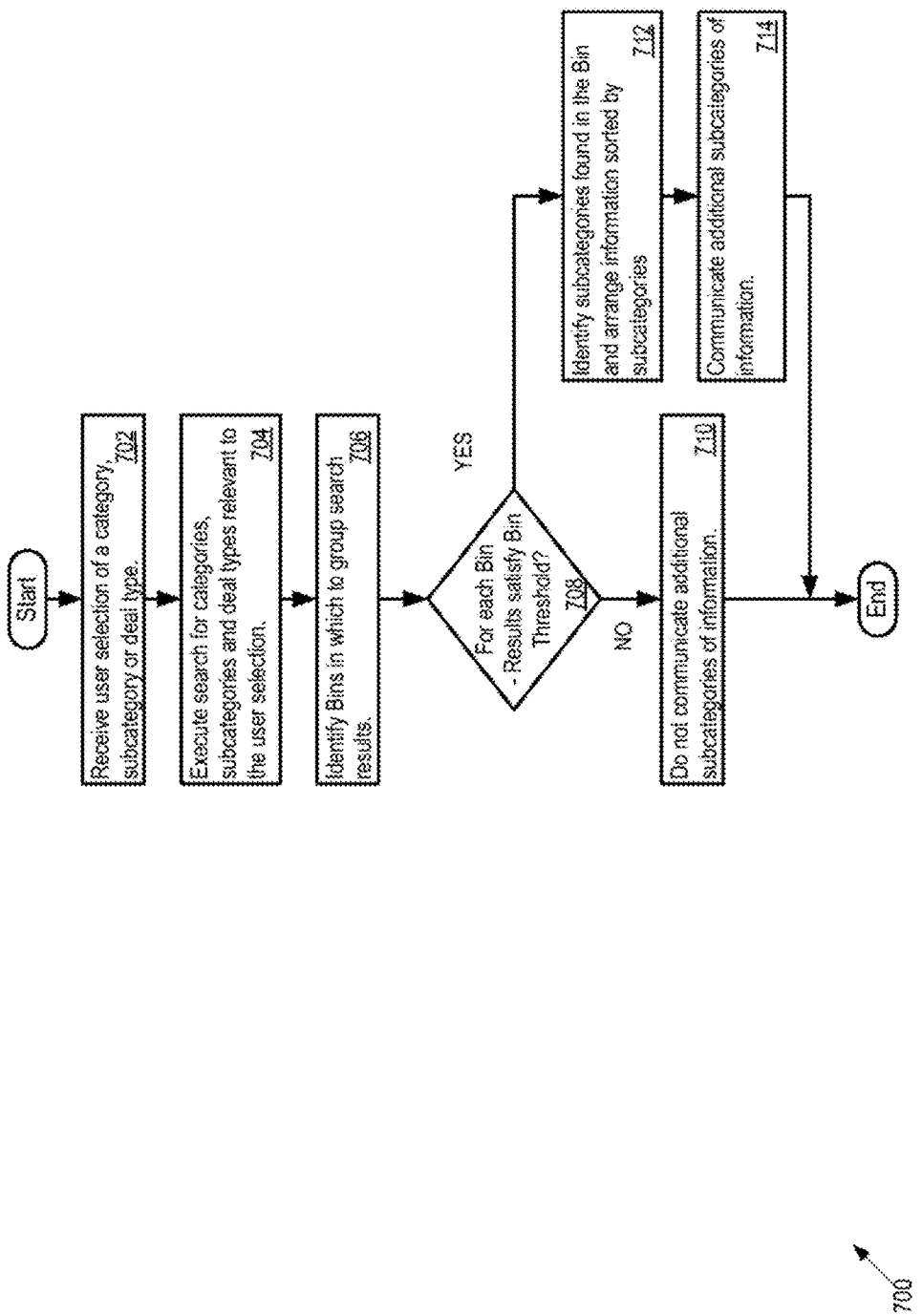
FIG. 7 shows a flow diagram of logic the pull-type searching system may use to perform Dynamic Binning.

FIG. 7 shows a flow diagram of logic 700 the pull-type searching system may use to perform Dynamic Binning. The pull-type searching system may use search capabilities that include a feature called "Dynamic Binning", wherein the pull-type searching system modifies the presentation of categories and/or subcategories to a consumer dependent on the number of deals within the category or subcategory that match to the consumer. For example, if the pull-type searching system determines that if the number of deals within a category is less than a predetermined amount, the pull-type searching system does not show additional subcategory information to the consumer. In contrast, if the number of matched deals is greater than the predetermined amount, the pull-type searching system may divide the information (including the number of deals within a category or subcategory) further to show additional subcategory information. For instance, if the pull-type searching system determines that there are 5 matched deals for a specific category, and that there are 0 or 1 matched deals for each subcategory within the specific category, the pull-type searching system is configured to present the matched deals to the consumer at the category level without sub-dividing and presenting the matched deals at the subcategory level. In another instance, if the pull-type searching system determines that there are 10 matched deals for a specific category, and that there are 2 or more matched deals for each subcategory within the specific category, the pull-type searching system is configured to present the matched deals to the consumer at the category level and the subcategory level.

At 702, the pull-type searching system receives a consumer selection of a category, subcategory or deal type, and, at 704, executes a search for categories, subcategories and deal types relevant to the consumer selection. At 706, the pull-type searching system identifies bins (e.g., dynamic results bins, which may comprise a category or subcategory) in which to group search results. At 708, the pull-type searching system determines whether a bin has a number of matched deals that is less than a configurable bin threshold. If so, then, at 710, the pull-type searching system does not communicate additional subcategories of information. However, when a bin includes a number of results that is greater than or equal to the bin threshold, then, at 712, the pull-type searching system identifies the subcategories in the bin and, at 714, arranges the information in the bin by subcategories, and communicates the subcategories of information to the consumer for presentation.

The pull-type searching system may use multiple different deal types (e.g., daily deals, NOW) in order to offer the deal in a variety of situations. The pull-type searching system may serve as the marketing partner for merchants on an ongoing basis. The pull-type searching system may promote merchants constantly via one or more sales channels (e.g., email, site, mobile, search engine marketing, affiliates, and any other new channels that emerge). Simultaneously, the pull-type searching system improves the product offering so that the pull-type searching system may constantly assist more merchants in achieving their business goals. The pull-type searching system may tailor the presentation of a deal depending on the end user, such as by targeting different variants of the same deal (e.g., different discount amounts or different redemption times) depending on whether the end user is a new customer or a repeat customer. For example, the pull-type searching system may reduce the amount of the discount offered if the consumer is a repeat customer as opposed to a new customer. In doing so, the pull-type searching system may increase available inventory, units sold, and overall revenue (even though some revenue may come at a lower per unit margin).

Because the pull-type searching system tailors the offer of a deal to the particular consumer (including matching prices to individual demand curves rather than the market demand curve), the pull-type searching system may more precisely price a merchant's services/goods while minimizing cannibalization and maximizing the system's profit.

In this way, the pull-type searching system, with its ability to tailor the offer of deals, provides increased flexibility with merchants to allow changes down the road. In particular, the merchants may provide input as to the conditions to offer a deal, such as the attributes of the consumers targeted and the variations of the deal to offer to the targeted consumers. Responsive to the input, the pull-type searching system promotes the merchant's deals in order to better serve the merchant's business. Thus, the pull-type searching system provides a way to establish an ongoing relationship with the merchant to allow the pull-type searching system to change deals down the road as the pull-type searching system learns how to better serve the merchants.

In order to create a great search/browse experience for real-time local consumption, the pull-type searching system includes a significant density of options even if some deals offer lesser discounts than others. To include significant density of options, the pull-type searching system offers merchants the ability to target the presentation of the deal to a consumer with particular attributes, and or vary the deal terms to the targeted consumers, as discussed above. For example, the pull-type searching system may remove, based on the consumer's purchase history, the deal from the list of deals for presentation to the consumer, in effect hiding the merchant's deal from a consumer. For example, the pull-type searching system may automatically hide all of a merchant's deals if: (1) the consumer has already received X impressions (or presentations) of the merchant's deals within Y weeks; and/or (2) the consumer has already purchased the merchant's deal within Z weeks.

The pull-type searching system further provides same-day recurring deals that allow the pull-type searching system to deploy the frontend experience to as many markets as possible with as much inventory as possible, even though such actions may be deprecating same-day recurring deals longer term. The pull-type searching system is configured to be flexible by restructuring deals and workflows to support single campaigns with multiple options. The pull-type searching system is configured to vary the redemption period, such as based on input from the merchant. In this way, the pull-type searching system can provide same-day redemption for all deals (i.e., redemption on the same day as purchase) so that consumers can find and buy a deal to use right away. the pull-type searching system can further implement one or more rules in order to better focus the deal offers, including limiting the number of deals to purchase as gifts for others, and setting per person limits on deals in order to avoid consumers circumventing the "1 per person" limitation by purchasing multiple gifts for other people and using the deal themselves.

As discussed above, the pull-type searching system is configured to receive merchant input in order to tailor the consumers targeted for the merchant's deals and/or the offer terms of the merchant's deals. Moreover, apart from input to target consumers, the pull-type searching system enables the merchant to provide more general input as to the offering of the merchant's deals. For example, the merchant may vary (e.g., raise or lower) the monthly targets of the deals for purchase. The analytical model 104 may use the monthly targets in order to determine whether to offer a deal to a consumer of the pull-type searching system. In particular, if the merchant wishes to reduce the number of deals purchased in a specific month, the analytical model 104 may reduce the number of times the deal is offered. In this way, even in a pull-type environment, the merchants may control their own deals. Further, the pull-type searching system may implement a sales model that enables variable pricing by allowing merchants to specify the face value and dollar value the merchants are willing to pay for new versus repeat business and the pull-type searching system optimizes its display on behalf of the merchants, as discussed above.

The pull-type searching system may integrate rewards and payments with the targeting of deals in order to give merchants a strong incentive to use the pull-type searching system as an aggregate deals system offering. The pull-type searching system may deploy daily impression throttling based on target monthly units sold in order to limit exposure for merchants automatically and smooth redemption. The pull-type searching system may provide a merchant center and mobile merchant application that allows merchants to see and adjust their monthly customer "targets" and see how the adjustment impacts the level of exposure of the merchant's deals.

The pull-type searching system may include a search box that may be available on all pages. The search box initiates searches of all merchants and all channels (e.g., daily deals, Goods, Now, Getaways). The search results focus on merchants and by clicking on each result leads the consumer to a merchant page.

The pull-type searching system allows consumers to search based on a variety of criteria, such as searching from a list of merchants. The list of merchants includes merchants that are currently running deals, merchants that have run a deal in the past, and/or merchants that have never run a deal. Depending on the rules in the analytical model 104, the pull-type searching system may parse or remove merchants from being presented to the consumer, such as by removing merchants who have never (or are not currently) run a deal through the pull-type searching system. The information on merchant history may be stored in historical data database 114.

The pull-type searching system provides various deals types, and one or more filters selectable by consumers, including a filter to locate merchants with deals. The pull-type searching system provides consumers the option to view a map of merchants and the store locations of the merchants. Additionally, consumers may zoom in and out of the map and the search results may change depending on the map boundary.

Figure 8:
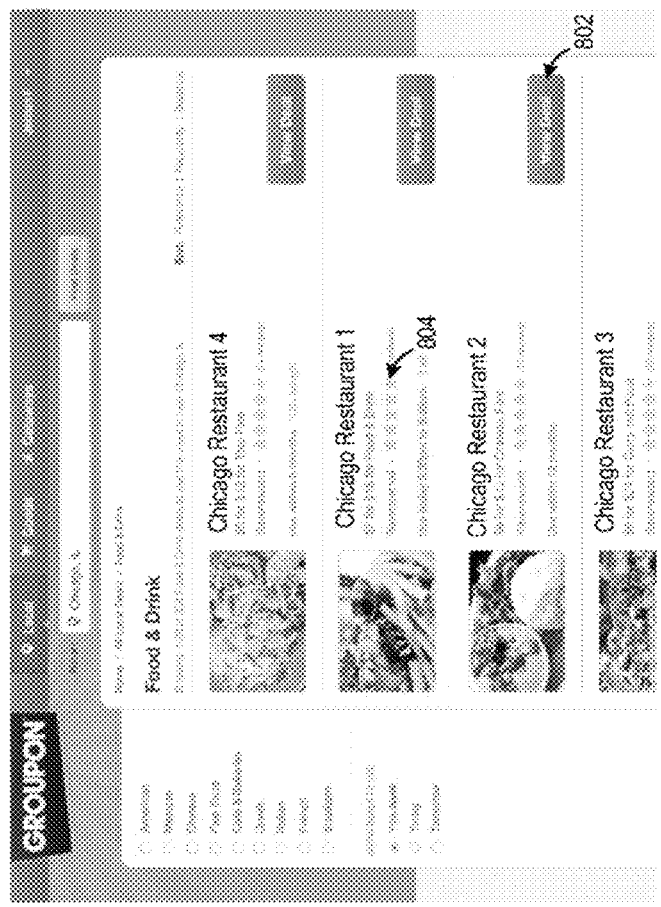
FIG. 8 shows one other pull-type searching system user interface.

FIG. 8 shows another pull-type searching system user interface 800. As shown in FIG. 8, links to additional information on the deals and links to reviews of the deal are provided. Accordingly, the pull-type searching system provides the consumer the ability to click on a link associated with the search results in order to view a merchant detail webpage 802. The merchant detail webpage includes information the consumer seeks about the merchant. The pull-type searching system provides the consumer the ability to click on a search result and view both the star ratings 804 and reviews for that particular merchant. Consumers are able to write reviews about a merchant even if the consumer has not purchased a deal. For each deal, a section on the detail page "about the merchant" includes the merchant's average star rating and reviews about the merchant. The pull-type searching system provides merged search indexes for various deal channels (e.g., daily deals, Local, Getaways, Goods deals). When a consumer initiates a search, the pull-type searching system may search multiple channels (such as all channels) simultaneously and return results of the search of the channels on one single webpage.

The pull-type searching system provides consumers a site experience that provides a local search experience. The pull-type searching system provides a location map so that consumers are able to see where their listings are in a map. Consumers can double click to zoom into a specific neighborhood. As the consumer zooms into the map, the consumer's search results update. The pull-type searching system provides location suggestions so that customers are able to specify the location that they would like to search. In response, the pull-type searching system suggests a number of location suggestions to the consumer as the consumer types. The pull-type searching system includes a personalize feature that identifies the location of the consumer's IP address and then ranks cities based on the city's distance to the consumer as well as the popularity of the city. In this way, "Santa Clara" would appear high up for consumers near San Francisco but "Santa Monica" would appear high for consumers near Los Angeles. Thus, the pull-type searching system may combine the tools of providing tailored and focused searching (using the analytical model 104) and the visual tools to create a local searching experience for the consumer.

The pull-type searching system interface is configured to prompt the consumer with specific keyword terms that might match the consumer's search query. Keyword suggestions may assist the consumer because the prompt allows the consumer to avoid typing long phrases. In addition, keyword suggestions assist the pull-type searching system to address zero search results (discussed below) because such a prompt allows the pull-type searching system to guide consumers to terms for which the pull-type searching system has results.

The pull-type searching system may place both keyword suggestions and location suggestions into a single text box. Because of limited deal inventory, consumers may find no deals in the consumer's search results. Instead of responding to the consumer that the search resulted in no deals, the pull-type searching system may transfer the consumer to another term where the pull-type searching system has inventory.

Figure 9:
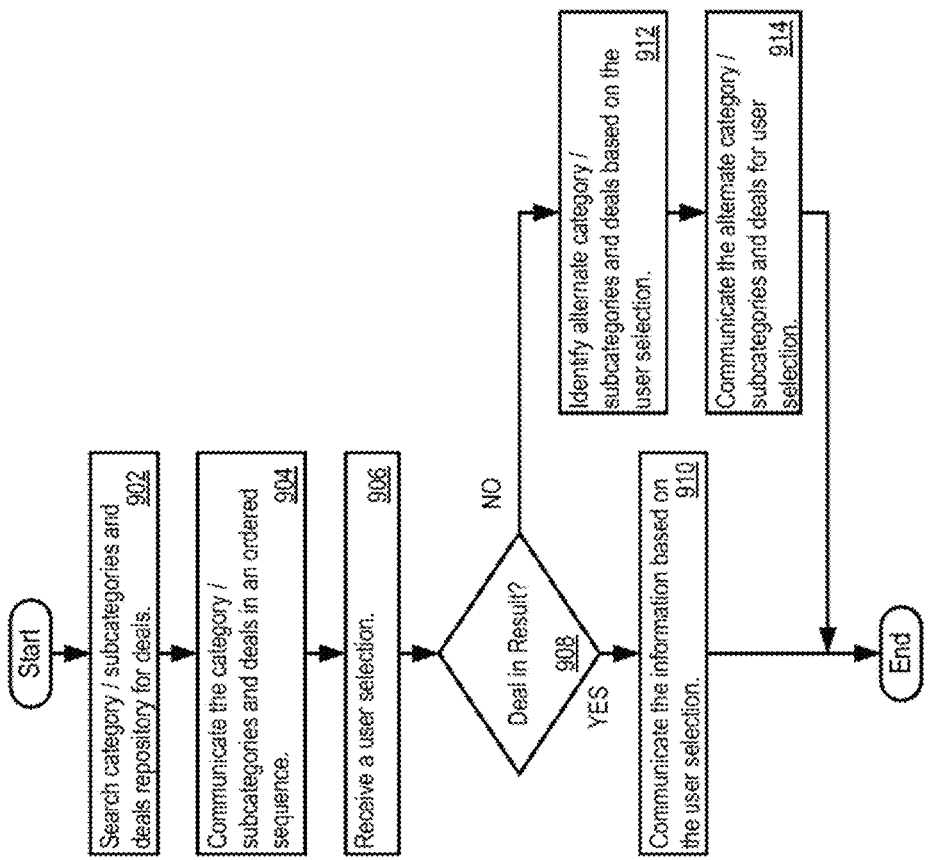
FIG. 9 shows a flow diagram of logic the pull-type searching system may use to communicate alternative categories/subcategories and deal types.

FIG. 9 shows a flow diagram 900 of logic the pull-type searching system may use to communicate alternative categories/subcategories and/or deal types. At 902, the pull-type searching system searches one or more databases for categories, subcategories and deal types based on the consumer profile, and/or consumer selections to generate a set of deals. The pull-type searching system applies one or more rules to the set of deals in order to generate an ordered list of categories/subcategories and deal types for output. The pull-type searching system compiles the one or more deal types and the number of deals for each deal type assigned to the ordered list of deals for output. At 904, the pull-type searching system arranges the one or more deal types based on the consumer profile and/or the number of deals for each deal type and outputs the results. For example, in the event that the consumer profile includes a specific deal type of interest to the consumer, the analytical model 104 may select a subset of deals, taken from the set of deals, with each of the deals in the subset being assigned the specific deal type for presentation to the consumer. As another example, the analytical model 104 may arrange the set of deals into buckets, each bucket comprising a different subset of deals associated with a particular deal type. The buckets may be ranked based on the number of deals assigned to each bucket for presentation to the consumer.

At 906, the pull-type searching system receives a consumer selection, and at 908, the pull-type searching system determines whether the search results identify a deal satisfying the consumer selection. When the search results identify deal(s) satisfying the consumer selection, at 910, the pull-type searching system communicates the information (e.g., the one or more deals) for selection. When the search results fail to identify a deal satisfying the consumer selections, at 912, the pull-type searching system identifies alternate categories/subcategories and/or deal types to present to the consumer for selection, and at 914 presents alternate categories/subcategories and deal types to the consumer for selection.

In one embodiment, the pull-type searching system may implement multiple features to address a "null" result (e.g., zero results, undesired results and/or too few results) of a search. In one aspect, the analytical model 104 may use similar terms to search the deal inventory database 110. For example, the search term "Thai food" may yield zero results in Seattle, Wash. However, there may be 3 results for the terms "Asian cuisine". The pull-type searching system may return these results with the message "There are 3 results for Asian cuisine that you might be interested in instead." The pull-type searching system may use keyword-to-keyword collaborative filtering to generate the list of similar keyword phrases. Alternatively, the pull-type searching system may map keywords into a fallback hierarchy (e.g. Pizza→Italian Food). The pull-type searching system may use the results of the users' selections of alternative deals to train and/or refine the alternate suggestions (such as the keyword-to-keyword collaborative filtering or alternative category/subcategories). For example, the pull-type searching system may test an alternative suggestion by determining whether the consumer, when presented with the alternative suggestion, selects a deal for purchase. The testing may be constantly performed in order to determine whether the alternative suggestions should be maintained, or should be changed.

A "null" result of a search may include zero results, undesired results, and/or too few results (e.g., if only 1 deal is selected in response to the search. In response to determining a null result, the pull-type searching server 102 may use one or more features in which to select alternate deals to present to the user (in the case of zero results or undesired results), or to select additional deals to present to the user (in the case of too few results).

In one embodiment, the pull-type searching server 102 may select alternate keywords in order to execute a second search in response to the first search resulting in a null result. For example, the pull-type searching server may use collaborative filtering. The collaborative filtering may be implemented independent of or based on the profile of the consumer requesting the search. In one aspect, the pull-type searching server 102 may use the consumer profile in order to make an automatic prediction about the interests in submitting the keyword search based on the consumer profile. In another aspect, the pull-type searching server 102 may find relationships between terms in order to select an alternative keyword to search. As another example, the pull-type searching server 102 may use hard-coded mapping to correlate between a keyword that is entered by the consumer and an alternate keyword selected in response to a null result.

In an alternate embodiment, the pull-type searching server 102 may select an alternative category or subcategory in response to a null result. In particular, the keywords entered by the consumer may be analyzed and determined to correspond to a category and/or subcategory. In response to the null result, the pull-type searching server 102 may select an alternate category or subcategory. In one aspect, the pull-type searching server 102 may use an abstract level match (e.g., a search for sushi may return Asian food results which may be the category including and/or assigned the keyword sushi). Undesired results may include search results that the pull-type searching system determines do not satisfy a configurable user selection threshold (e.g., a probability the result will be selected). Alternatively, the pull-type searching system may use a horizontal (e.g., peer) level match (e.g., a search for sushi may return Thai food results which may be in and/or assigned the category "Asian" food including and/or assigned the keyword sushi).

Alternatively, the pull-type searching system may add or remove words from the search criteria used to search for alternative results (e.g., alternative deals) calculated to be selected by the user (e.g., calculated to satisfy the configurable user selection threshold). For example, the pull-type searching system may add or remove words from the search criteria in order to identify alternative deals calculated to have predicted probability (e.g., an 80% probability) of user selection where the configurable user selection threshold is set to 0.80.

In another aspect, the analytical model 104 may select a similar merchant. In particular, a consumer may submit a search request with a particular merchant. The analytical model 104 may identify a similar merchant, and execute a search of the deal inventory database 110 to find a deal from the similar merchant. For example, the consumer may search for Merchant "X", which may not be running a deal with the pull-type search server 102 at the time of search. In response to a null result (i.e., no deals from Merchant "X"), the pull-type searching system may give the consumer reasonable alternatives. For example, if the consumer searches for Merchant "X", the pull-type searching system may recognize that this is the name of a local Mexican food restaurant. In turn, the pull-type searching system may look up the type of restaurant, and find an alternative to present to the consumer (such as a deal from another local Mexican restaurant).

In another embodiment, the pull-type searching system is configured to receive one or more search terms from a consumer and perform the search at predetermined times (such as once per day). This allows consumers to sign up to receive notifications for new deals that match the consumer's search criteria. For example, once per day, the pull-type searching system emails consumers the consumer's notification results when new items arrive into the deal catalog. Even if a consumer does not sign up for the notification, the pull-type searching system can use this information to customize deals of the day (DoD) emails to the consumer.

The pull-type searching system may employ relevancy because consumers frequently search for a very generic term (e.g., "pizza") which returns hundreds of results. Often, consumers don't even proceed past the first page of results. There may be two factors that contribute to whether a merchant ranks highly in search results, including (1) the number of ratings that a merchant has; and (2) the quality of the rating (e.g., 5 star or not). In one embodiment, the pull-type searching system analyzes the multiple factors (including the number and quality of the ratings) in order to determine the ranking of the merchant. For example, the analytical model 104 includes one or more calculations to determine a value representative of the number of ratings and the quality of the ratings. The lower confidence interval of a series of ratings is to prevent, for example, a merchant with a single 5-star review from being ranked above a merchant that has nine 5-star reviews and one 4-star review. Thus, the pull-type searching system incorporates both the quality of reviews as well as number of reviews.

Table 2 shows an equation that maybe used to calculate merchant rankings.

TABLE 2

Merchant Rankings equation $$\mu - \sqrt{\frac{1}{N}\sum_i (x_i - \mu)^2 + k}$$

\mu - \sqrt{\frac{1}{N}\sum_i(x_i - \mu)^2 + k}

In addition, the pull-type searching system may provide a bonus to merchants that run a deal offered by the pull-type searching system. At a high level, consumers may want to receive the best value or (Quality)/(Dollar Spent). The pull-type searching system may calculate the percentage discount a merchant is offering, and incorporate the percentage discount into the denominator as follows: Lower Bound of Average Rating/(10+5*(1−percentage discount)). In this way, merchants who run a deal from the pull-type searching system receive a small bonus depending on the size of the merchant's discount. For example, a 4 Star restaurant may be featured over a 5 Star restaurant if the 4 Star restaurant is running a deal for 80% off, but will not be featured above the 5 Star merchant if the 4 Star restaurant is running a deal for 50% off.

Currently, one way to engage a consumer with a deals system is to send a daily deal email. However, consumers may grow tired of the frequency of the daily deal email. In order to combat consumer ennui, the pull-type searching system provides demand fulfillment to ensure a world-class pull experience for consumers. Demand fulfillment provides consumers the ability to find deals the consumers want. The pull-type searching system provides a simple search/navigation experience that pulls from all of the various channels (e.g., daily deals, Now). If the consumer can visit the pull-type searching server 102 and search "I want [MEXICAN or MASSAGE or HAIR CUT or FLOOR CLEANING] near [60654 or PALO ALTO or RIVER NORTH]", people may use the pull-type searching system in an entirely new way (e.g., an e-commerce marketplace for local, with great prices and a wide selection across many geographic areas and categories).

Online Reservation

FIGS. 10-17w and the associated descriptions below illustrate embodiments of the pull-type searching system that enable consumers to make online reservations at merchant establishments and concurrently acquire deals for the reservations.

Figure 10:
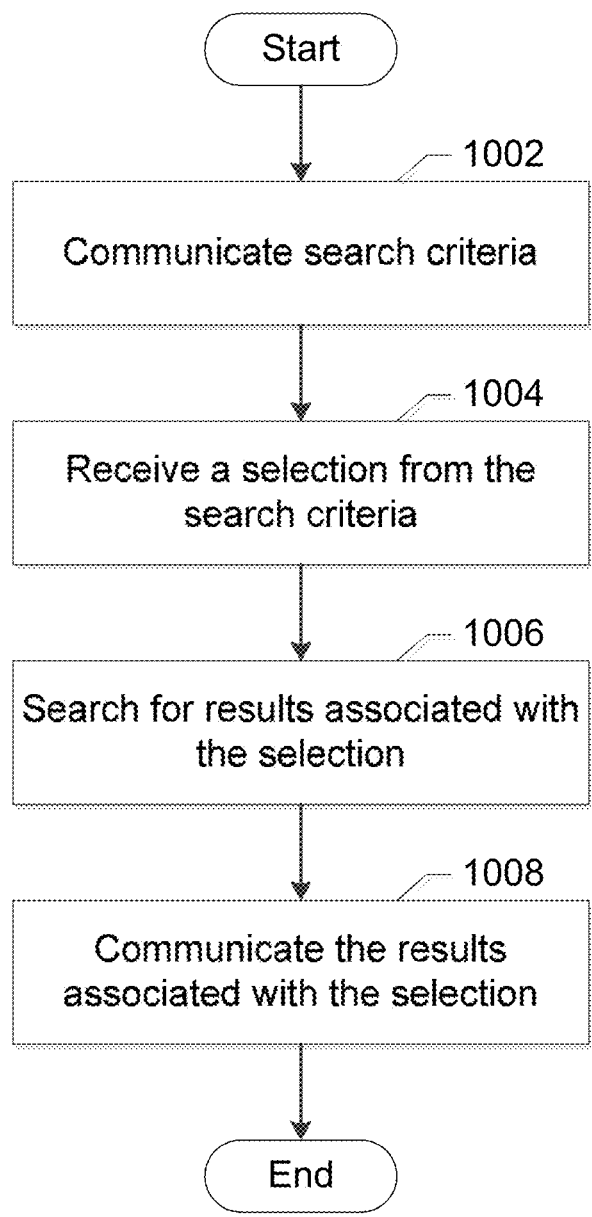
FIG. 10 shows example operations using the pull-type searching system in accordance with several embodiments.

FIG. 10 describes an embodiment of the pull-type searching system that can be used, for example, to receive user input to filter and identify reservation deals at relevant merchants. In this regard, the pull-type searching system searches one or more databases (e.g., deal inventory 110 or the like) to acquire categories and merchants based on the consumer profile. At 1002, the pull-type searching system communicates ordered selectable search criteria to a consumer, the search criteria including one or more locations, one or more dates, one or more categories, one or more names, one or more deal terms, and one or more times. The one or more names may correspond, for example, to the names of merchants associated with deals that the consumer may be interested in. The deal terms corresponding to each merchant are terms taken from specific deals found by searching deal inventory 110. Notably, in various embodiments, the pull-type searching system may access reservation time information stored in the deal inventory 110 for presentation among the search results as discussed in greater detail below.

Figure 11:
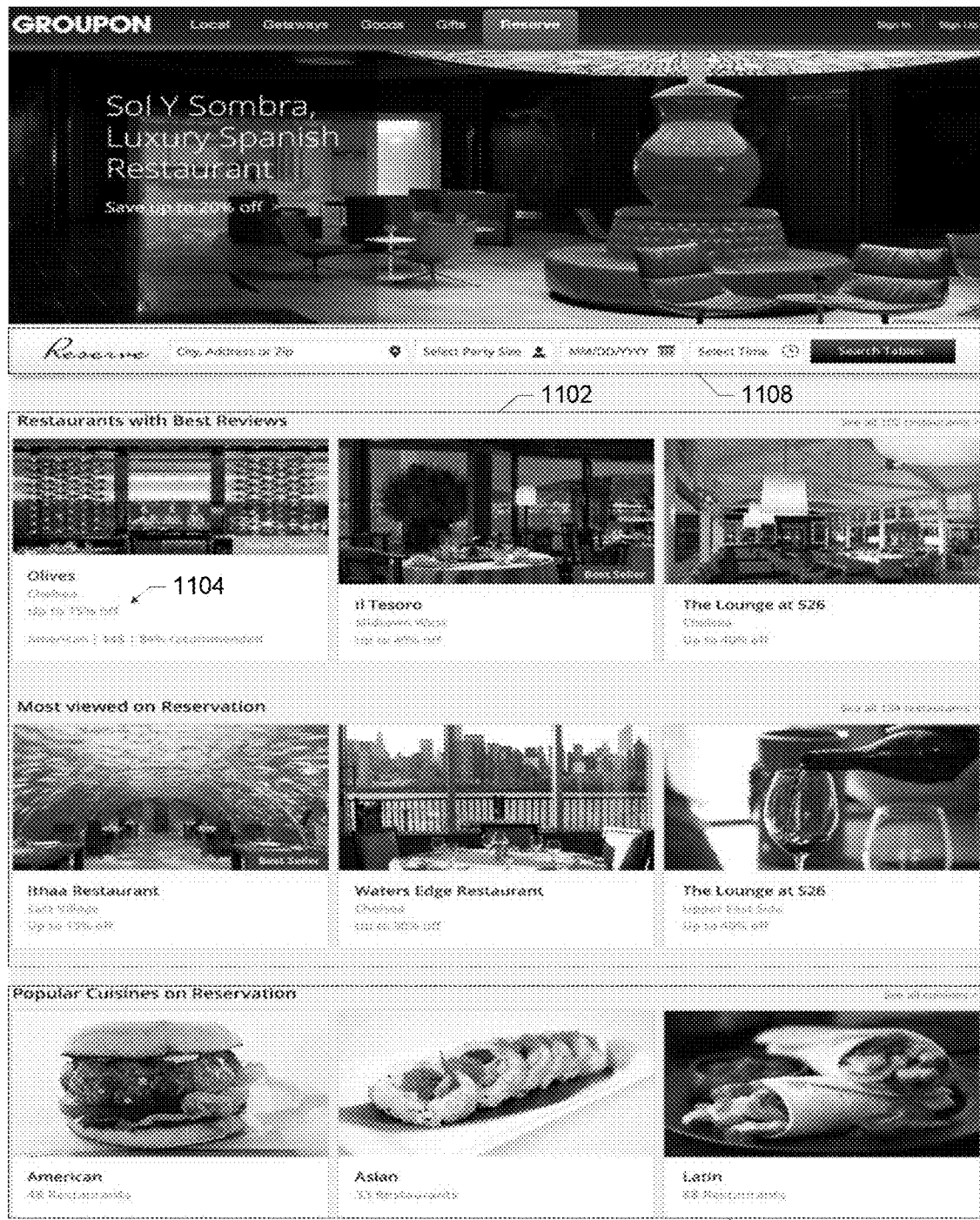
FIG. 11 shows a pull-type searching system landing page.

As one example, consider FIG. 11, in which the merchants may be restaurants. However, as will be apparent to one of ordinary skill in the art, the inventive concepts herein described readily apply to other reservation or time-slot based merchants or service providers including without limitation massage parlors, hair salons, contractors, movie theaters, tour guides, and the like.

Returning to the restaurant example of FIG. 11, for illustration purposes only, the pull-type searching system is able to generate, based on a consumer profile, search criteria including a set of restaurant names 1102 for presentation to the consumer. For each restaurant named, the pull-type searching system may determine and display one or more deal terms 1104 that are available at that restaurant. The one or more deal terms 1104 may be determined by searching deal inventory 110. In addition, the search criteria further includes categories 1106 (e.g., American, Asian, Latin, etc.) that may be of interest to the consumer. Finally, the search criteria presented to the consumer includes reservation search fields 1108. In some embodiments, the search criteria may additionally include a keyword field and/or a view field for toggling between a map view (1208) and a list view.

Returning to FIG. 10, at 1004, the pull-type searching system receives a selection from the search criteria. In one embodiment, the pull-type searching system may additionally receive merchant capacity information comprising one or more available time slots. The merchant capacity information may be received from and/or stored within the deal inventory 110 (and may correspond to the number of deals available within the one or more times, received above at 1002. Alternatively, the merchant capacity information may comprise substantially real-time information received from the merchant regarding the availability of reservations during the one or more times. In yet another alternative, the merchant capacity information may comprise information received from a database storing availability information (such as historical data database 114 or the like). Then, at 1006, the pull-type searching system searches one or more databases (e.g., deal inventory 110) for results associated with the selection. In this regard, in an embodiment in which merchant capacity information is received, the results are based on the search input, a user profile, and on the merchant capacity information, and the search results comprise at least one deal correlated to at least one of the one or more available time slots. Finally, at 1008, the pull-type searching system presents the consumer with an updated interface based on the results associated with the selection. An example of such an interface is presented in FIG. 13, which illustrates an interface having one or more names 1302, one or more reservation search fields 1304, filter fields 1306, and a view field for toggling between a map view (1208) and a list view. The filter fields may include a variety of categories that can be used to further narrow the search results, such as specific subcategories of food, price levels, deal types (occasions), or distinct parts of town (neighborhoods). Accordingly, using the operations described in FIG. 10, the pull-type searching system enables a consumer to search for reservations using a variety of different selection criteria.

Figure 10A:
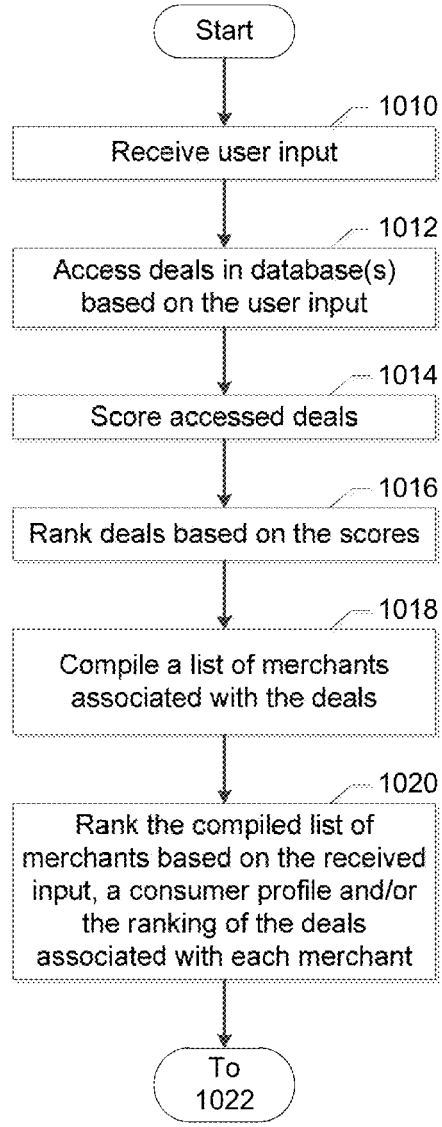
FIG. 10*a* shows example operations using the pull-type searching system to generate a filtered and ranked list of merchants offering reservation deals, in accordance with several embodiments.

FIG. 10a illustrates a flow chart describing a process by which the pull-type searching system generates, based on user input (such as that received during the operations described with respect to FIG. 10), a filtered and ranked list of merchants offering reservation deals corresponding to the user input. At 1010, the pull-type searching system receives user input including at least one or more locations, one or more dates, and one or more times from the user. The user input may additionally comprise a merchant category, a price level, or a party size. The user input may be received in response to a single initial user interface displayed by the pull-type searching server to the consumer. Alternatively, the input from the consumer may be received based on a series of user interfaces displayed by the pull-type searching system to the consumer. Receiving the user input will be discussed in greater detail in conjunction with FIGS. 12 and 12a below.

Returning to FIG. 10a, at 1012, the pull-type searching system accesses deals in one or more databases based on the user input. For instance, the system may access deal inventory 110 to retrieve all deals associated with the user input. In this regard, the identified reservation deals may include deals correlated to the one or more locations, one or more dates, and one or more times. At 1014, the pull-type searching system scores the accessed deals. Deals may be scored in one of several ways. One such example method is disclosed in U.S. patent application Ser. No. 13/411,502, as previously described above with respect to FIG. 2. To generate the score, the pull-type searching system may use one or more of the user inputs. At 1016, the pull-type searching system ranks the deals based on the scores.

Then, at 1018, the pull-type searching system compiles a list of merchants associated with the deals. In this regard, the pull-type searching system identifies the merchant offering each scored deal and adds the merchant to the list of merchants. Of course, the pull-type searching system further ensures that no merchant is included multiple times in the list.

At 1020, the pull-type searching system ranks the compiled list of merchants. In one embodiment, this ranking is based on the scored deals associated with each merchant. For instance, the merchant listed first is the merchant offering the deal with the highest score. Alternatively, the merchant listed first may be the merchant with the highest average deal score. Other methods of using the deal scores to rank the merchants are also contemplated. In another embodiment, the ranking of the list of merchants is based on the user input received at 1010. For instance, when the user input includes a location, the list of merchants may be ranked based on the inputted location. Similarly, when the user input includes a time, the list of merchants may be ranked based on the availability of reservations at or near the inputted time. Of course, in some embodiments, the list of merchants may be ranked according to the consumer profile associated with the consumer providing the user input. The procedure thereafter continues to the operations described in connection with FIG. 10b.

Figure 10B:
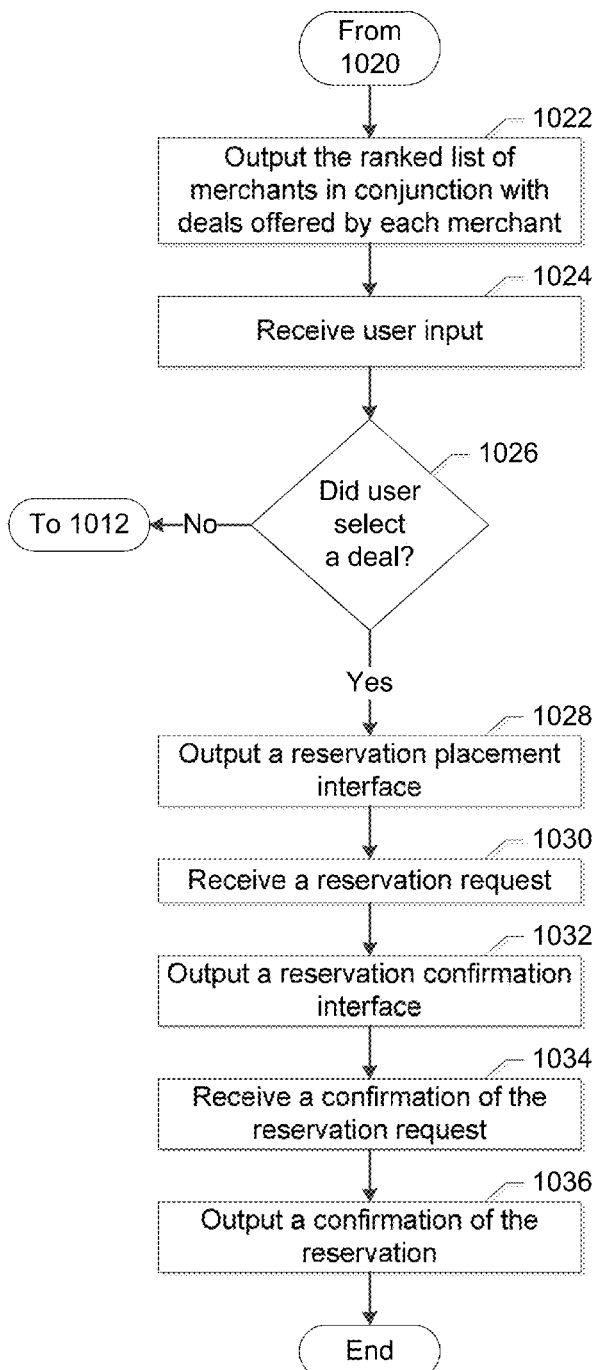
FIG. 10*b* shows example operations using which a consumer may place and confirm a reservation at a merchant, in accordance with several embodiments.

FIG. 10b discloses operations using which a consumer may place and confirm a reservation at a merchant. At 1022, the pull-type searching system outputs the list of merchants ranked in operation 1020 in conjunction with deals offered by each merchant. The ranked list may be presented to the user via a search results page 1216 (an example of which is the name or keyword page shown in FIG. 16b) or a search results with reservation details page 1212 (examples of which are shown in the search results page in FIGS. 16e and 16g and in FIG. 17h and which are described in greater detail below), both of which are shown in FIGS. 12 and 12a.

At 1024, the pull-type searching system receives additional user input. At 1026, the pull-type searching system determines whether the additional user input comprises selection of a deal. In an instance in which the additional user input is not selection of a deal, the pull-type searching system proceeds to operation 1012, to filter the ranked list of merchants in accordance with the additionally received user input. However, in an instance in which the additional user input comprises selection of a deal, at step 1028 the pull-type searching system outputs a reservation placement interface. The reservation placement interface may be presented to the user via a detail page with reservation page 1220, as shown in FIGS. 12 and 12*a*. Examples of such a user interface include the details page shown in FIG. 14, the venue page shown in FIG. 16*j*, and the details page shown in FIG. 17*k*, which are described in greater detail below.

Figure 17A:
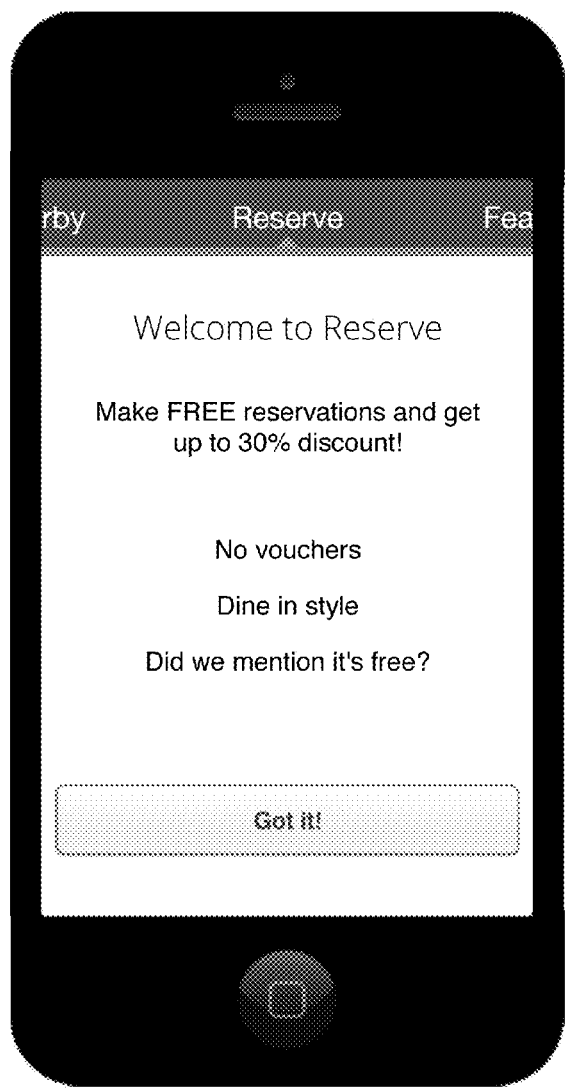
FIGS. 17a-17w show additional example user interfaces for mobile devices corresponding to the use of the pull-type searching system for placing reservations.
Figure 17B:
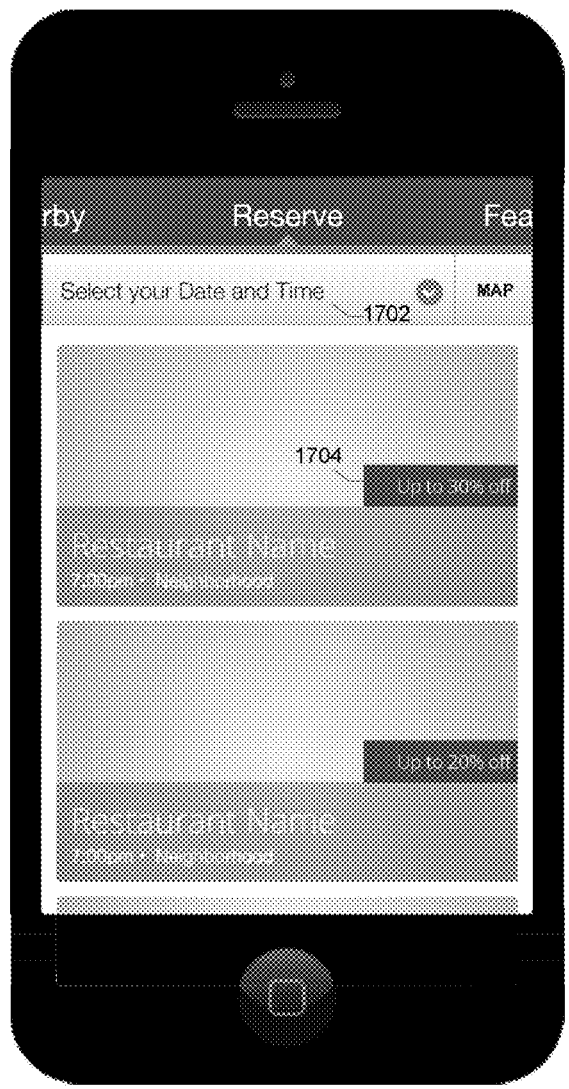
Figure 17C:
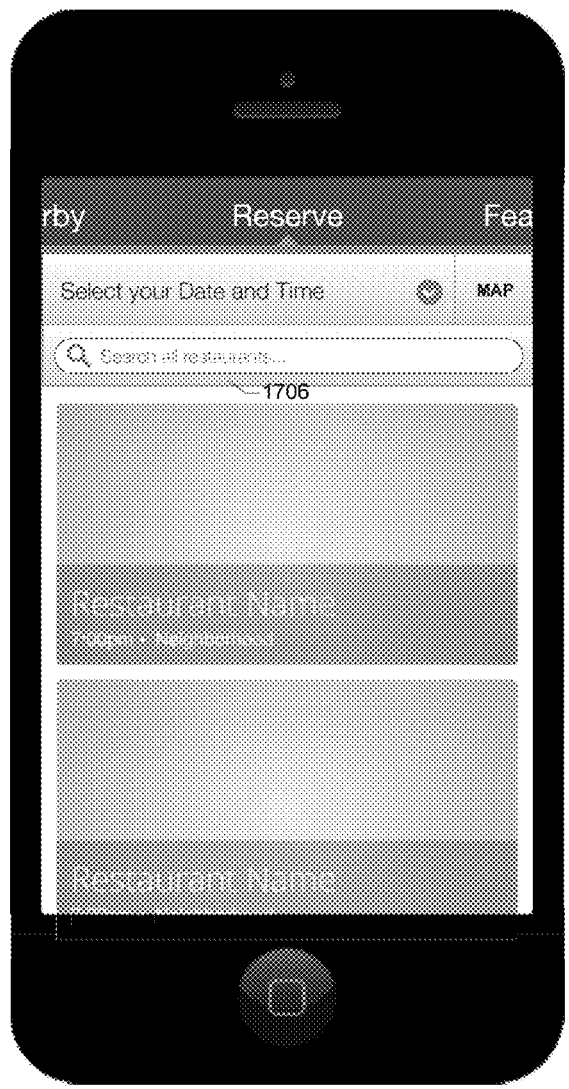
Figure 17D:
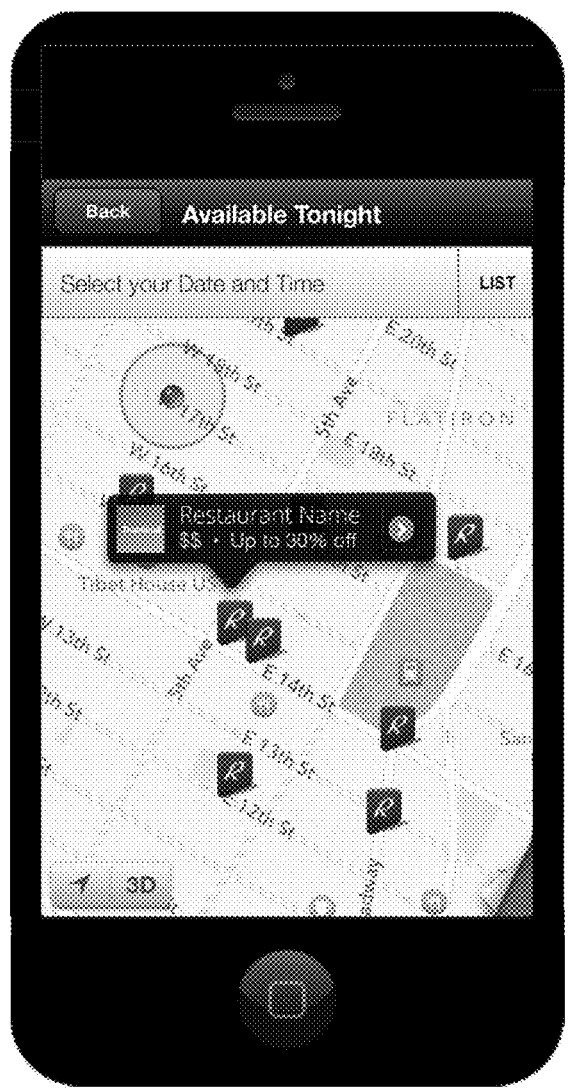
Figure 17E:
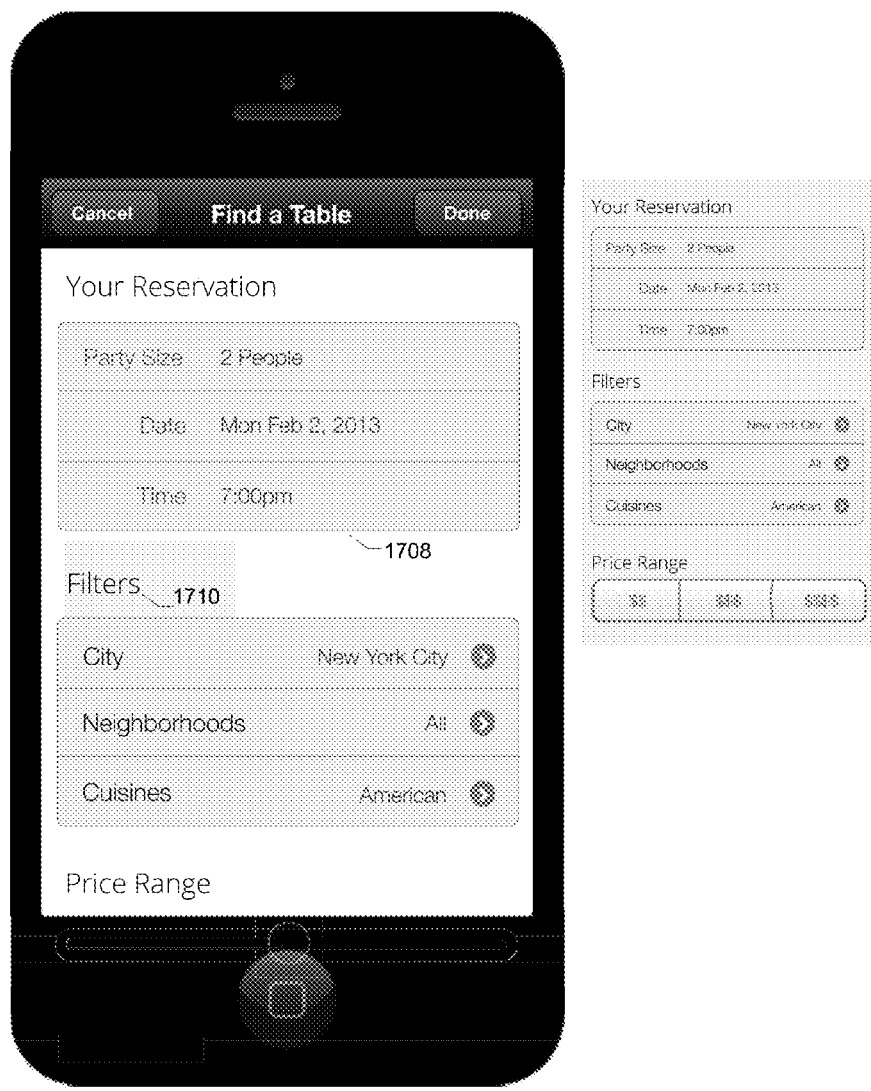
Figure 17F:
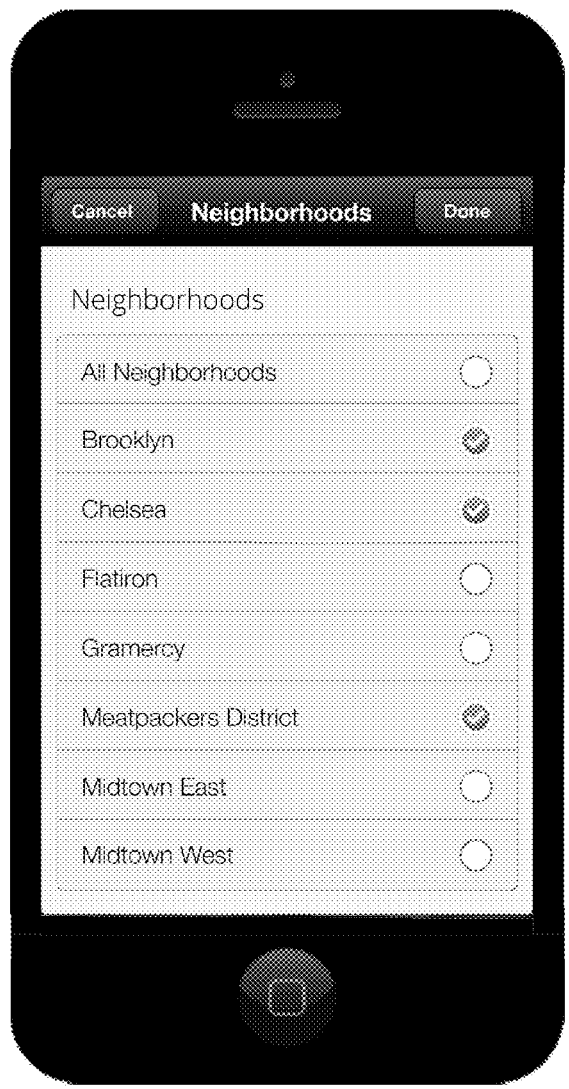
Figure 17G:
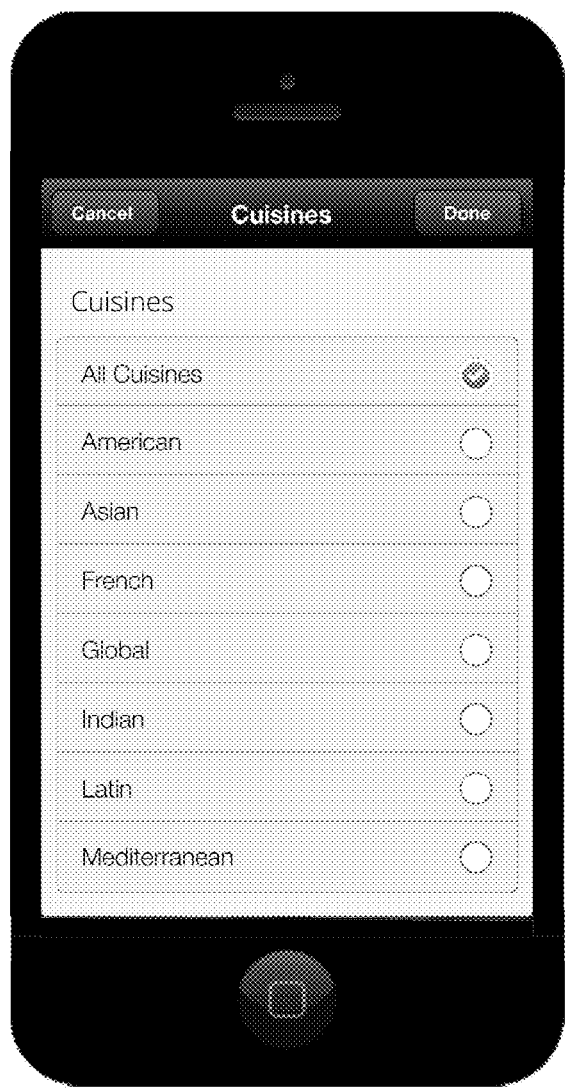
Figure 17H:
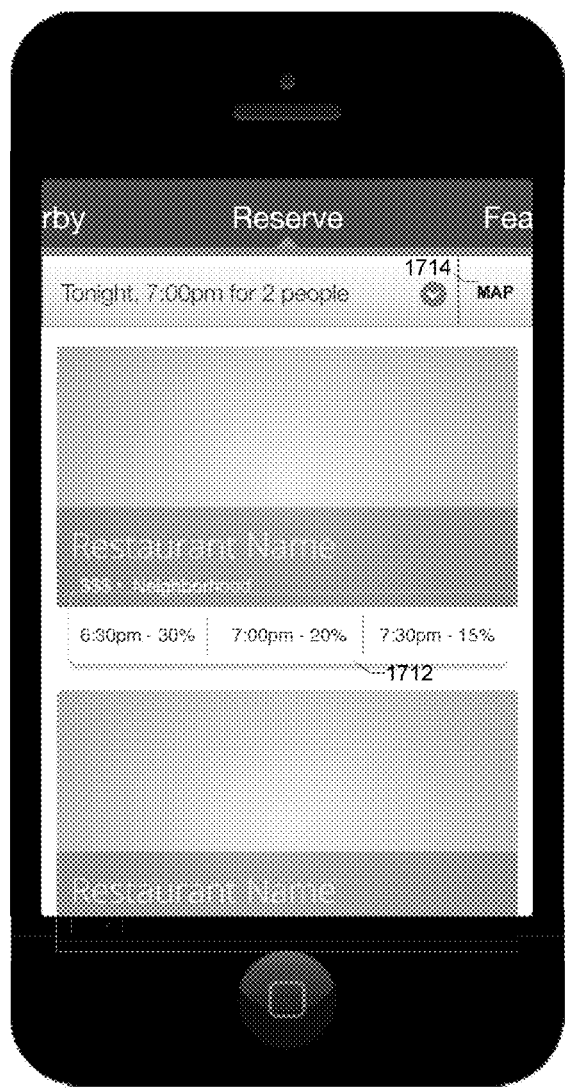
Figure 17I:
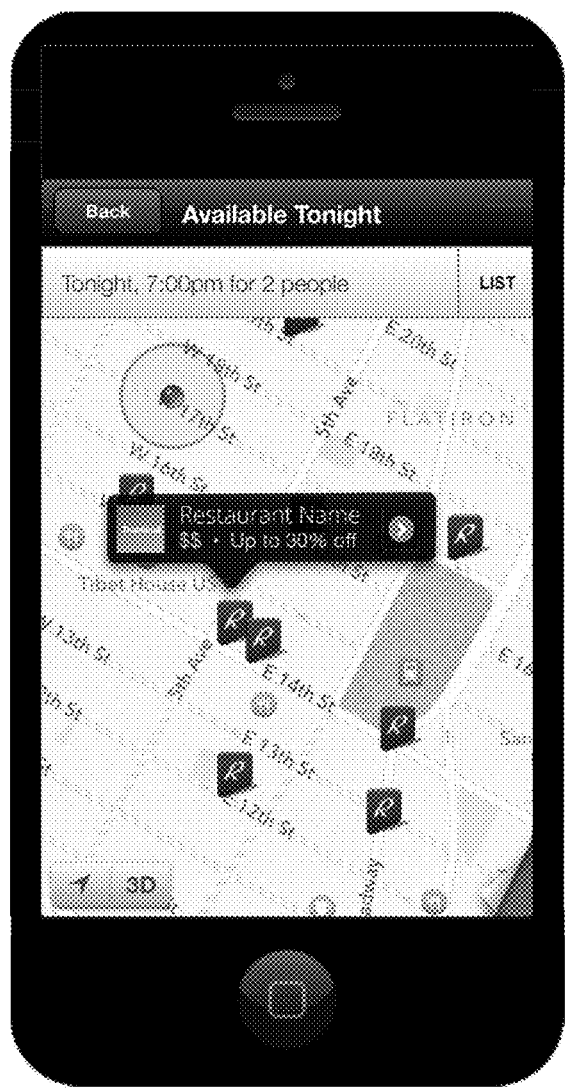
Figure 17J:
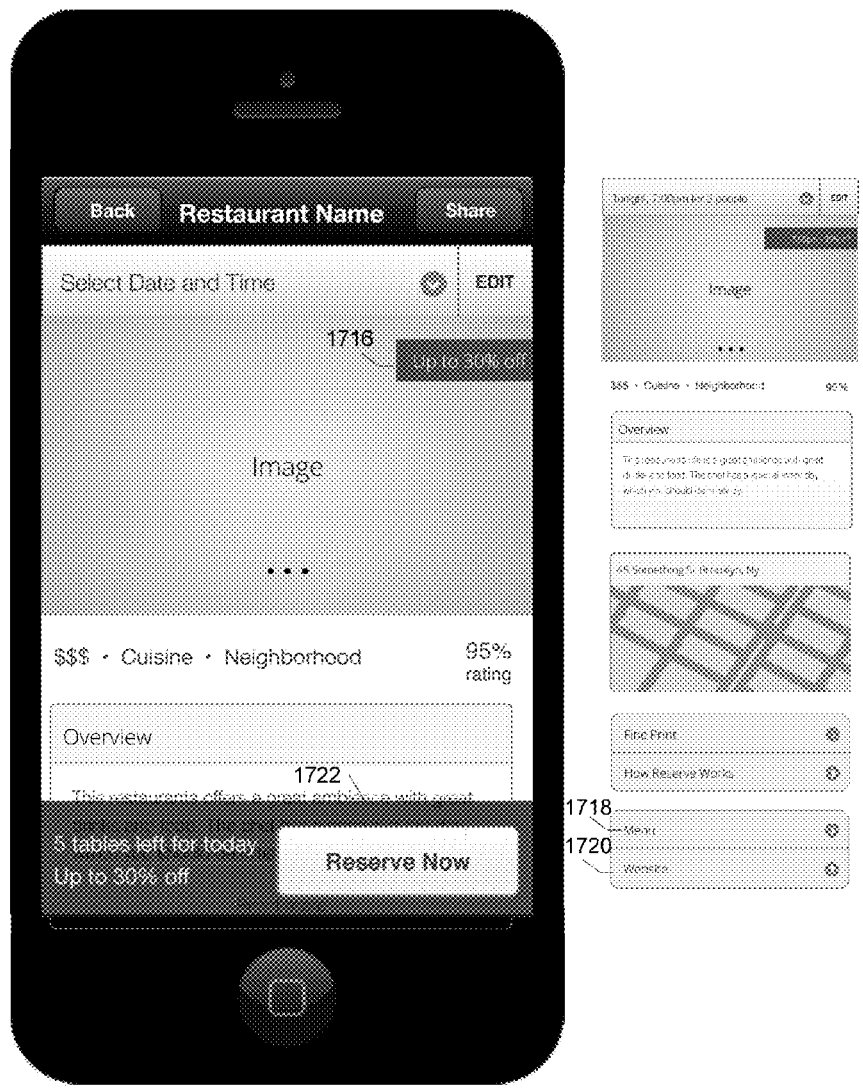

At 1030, the pull-type searching system receives a reservation request. Optionally, at 1032, the pull-type searching system may output a reservation confirmation interface, and at 1034 may receive user confirmation of the reservation. The review page shown in FIG. 16*k* provides an example of a reservation confirmation page. Finally, at 1036, the pull-type searching system outputs a confirmation of the reservation, such as confirmation page 1222, shown in FIGS. 12 and 12*a*. Examples of such a confirmation page are shown in FIG. 16*l* and FIG. 17*o*, and are described in greater detail below.

Figure 12:
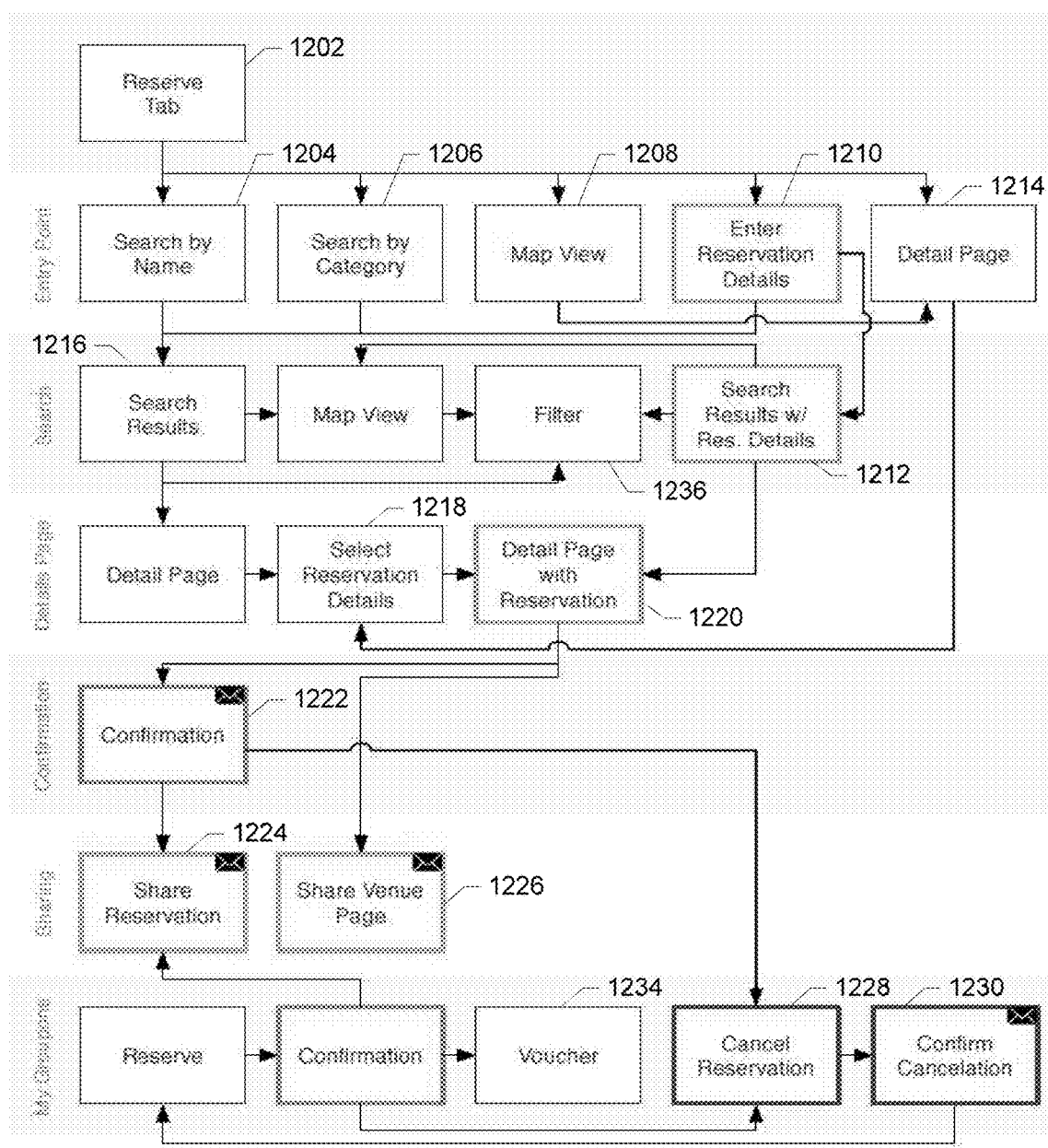
FIG. 12 shows a flowchart of example operations using the pull-type searching system for placing online reservations with merchants.
Figure 12A:
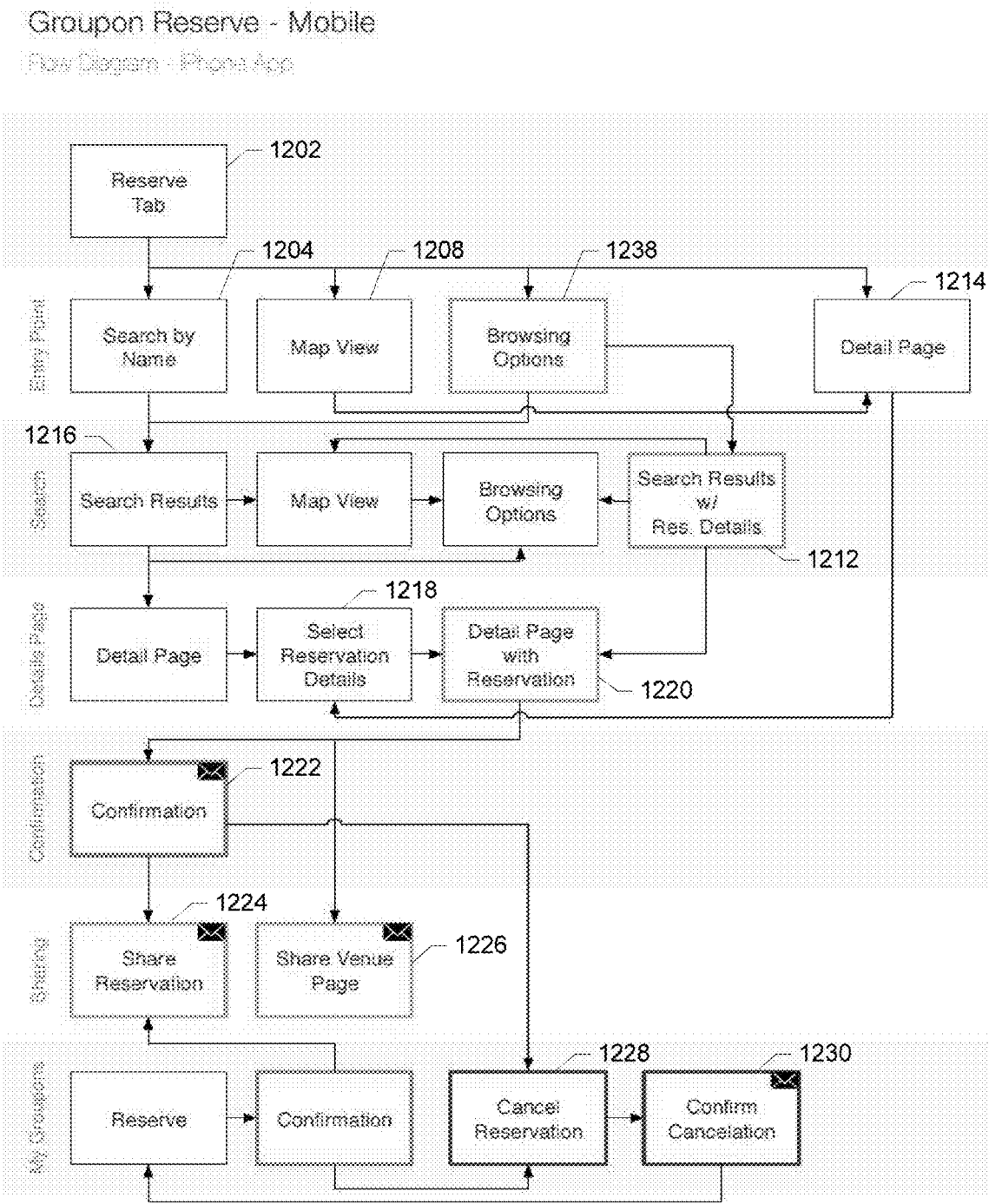
FIG. 12*a* shows another flowchart of example operations using the pull-type searching system for placing online reservations with merchants.
Figure 13:
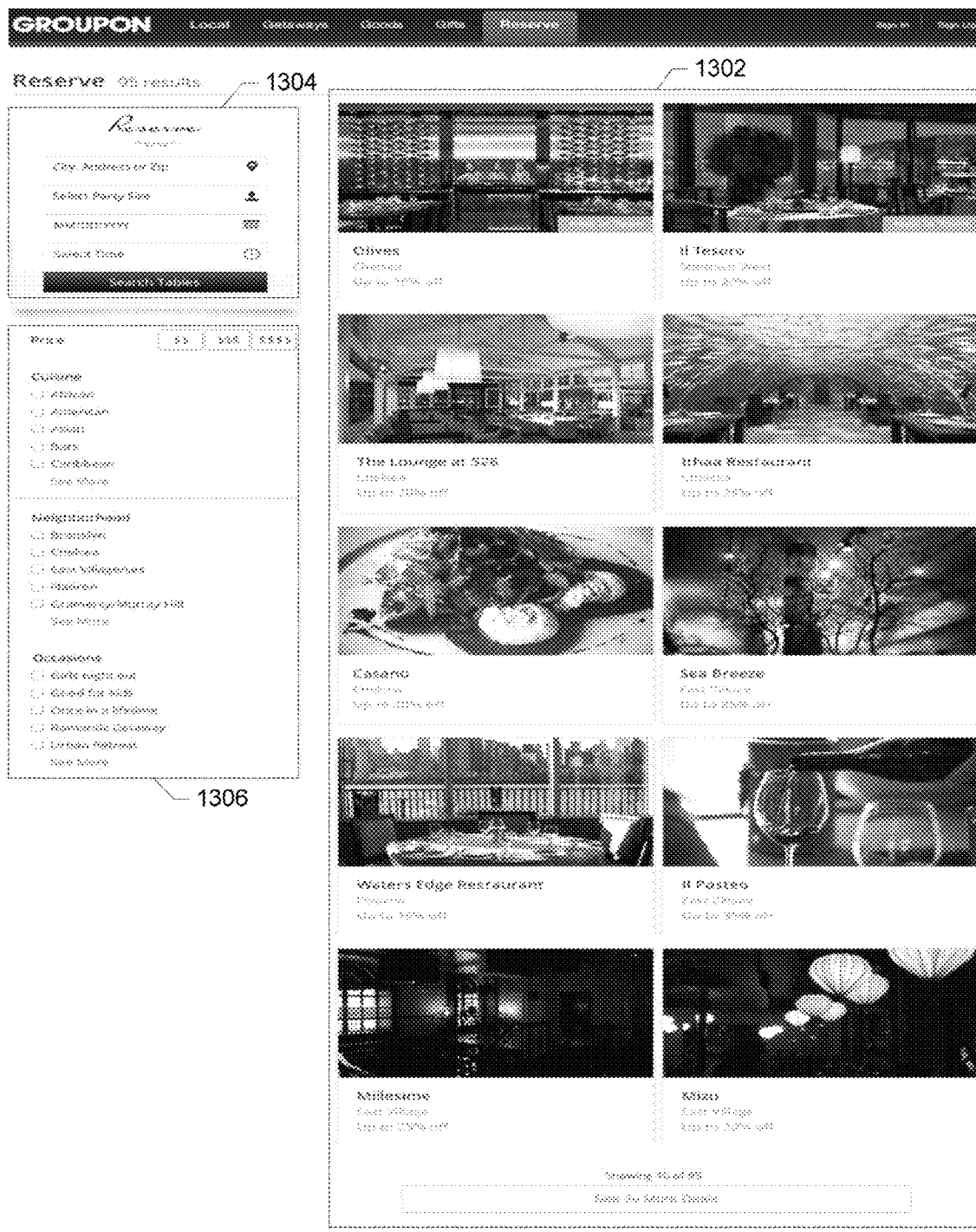
FIG. 13 shows an example search results page for use in accordance with example embodiments.

FIGS. 12 and 12*a* disclose various interfaces that the pull-type searching system may present to the consumer to enable consumers to make online reservations at merchant establishments and concurrently acquire deals for the reservations. The landing page interface communicated to the consumer at 1002 above (an example of which is shown in FIG. 11) is presented upon selection, by the user, of the reserve tab 1202. Similarly, the interface communicated to the consumer at 1008 is presented in response to receiving the selection, and may comprise the search by name page 1204, the search by category page 1206, the map view 1208, the search results with results details page 1212, or the detail page 1214. As shown in FIGS. 12 and 12*a*, from the landing page shown in FIG. 11, the user may select criteria using which the pull-type searching system displays search results.

Navigation Based on Restaurant Selection

When the user selects one of the presented merchant names, the consumer is presented with detail page 1214 regarding the selected merchant (an example of which is provided in FIG. 17*j*, described in greater detail below). From detail page 1214, the user may select one or more reservation search fields, which may include one or more associated deals. In this regard, the one or more associated deals may, for example, be selected from deal inventory 110 and may be correlated to, for example, one or more available reservation times (e.g., time slots) as discussed previously. The pull-type searching system may receive, from the user, an additional selection of reservation entry details (shown as item 1218), search the database for updated results associated with the merchant name and the reservation entry details, and communicate detail page with reservation 1220 to the user.

Figure 14:
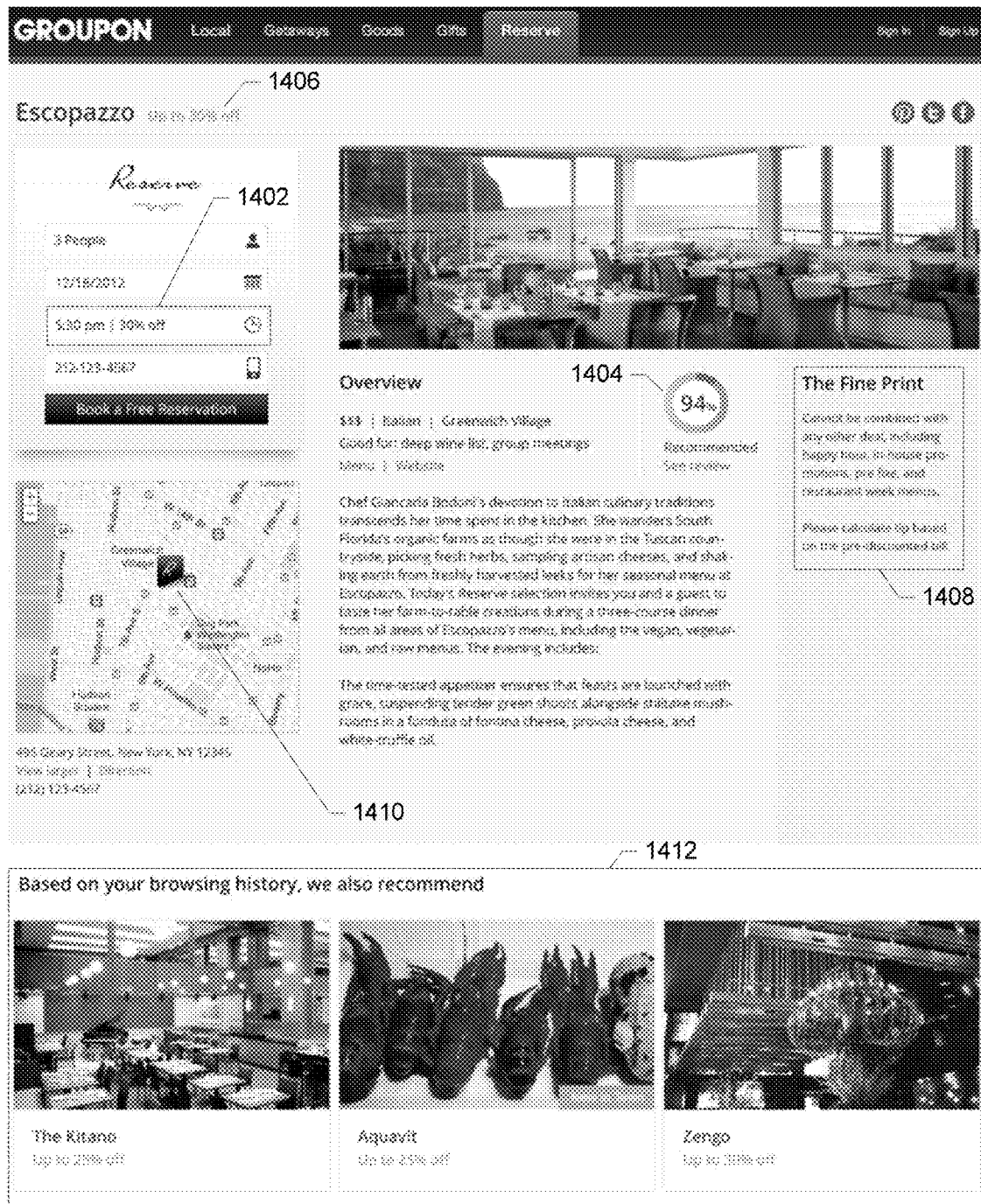
FIG. 14 shows an example detail page for use in accordance with example embodiments.
Figure 17K:
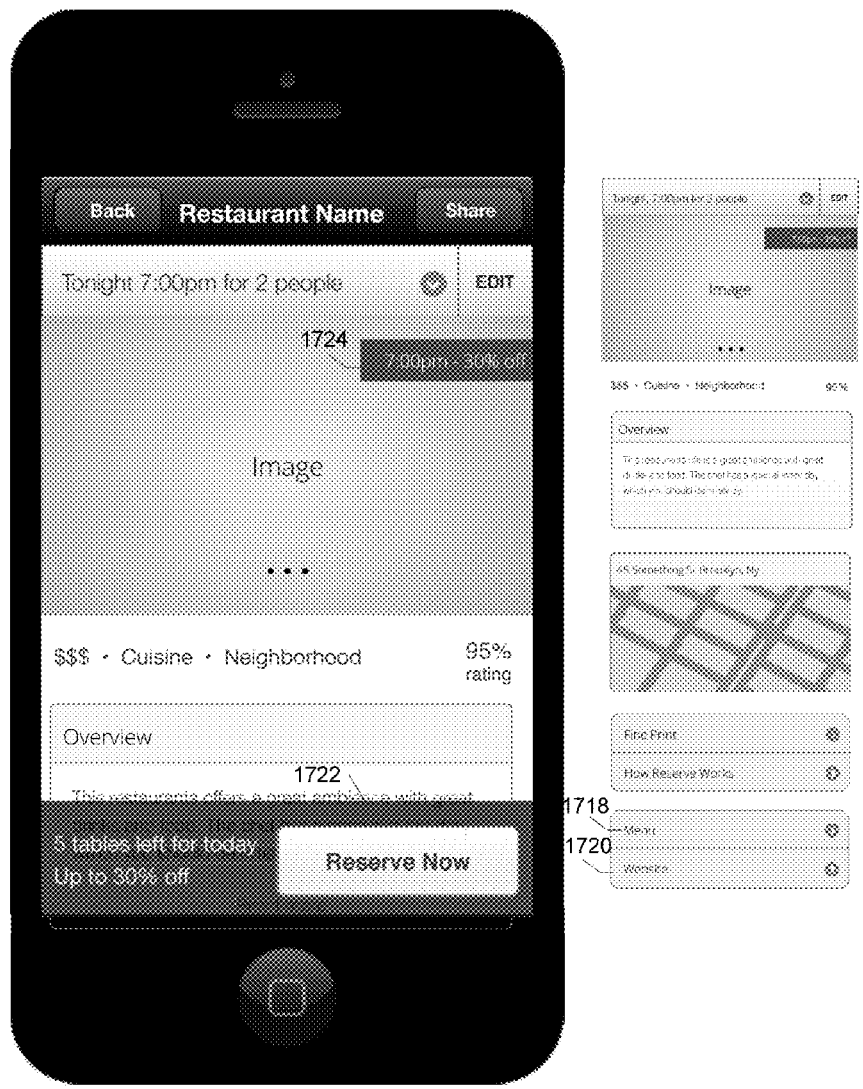
Figure 17I:
Figure 17M:
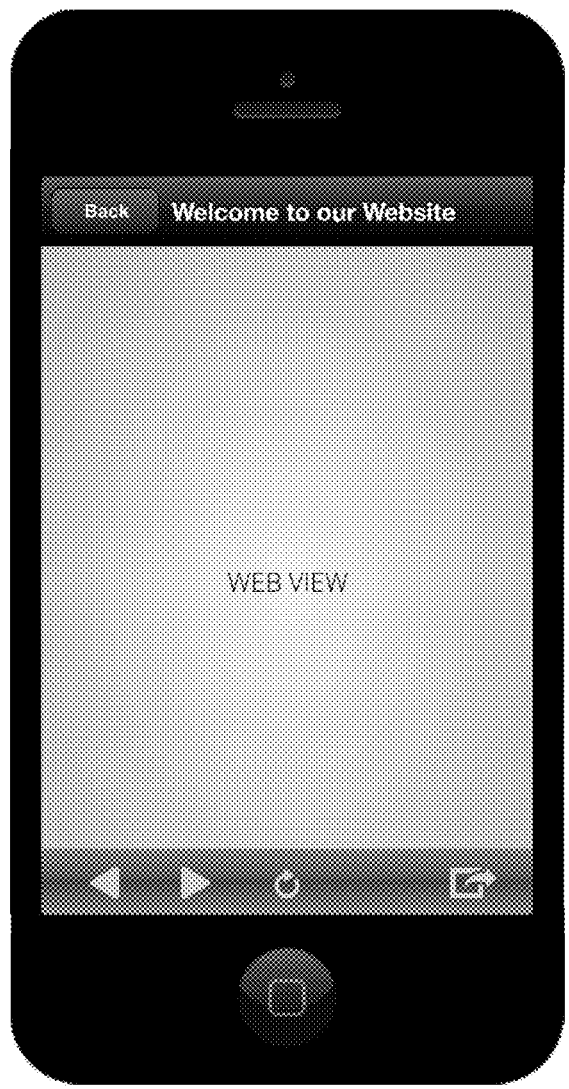

FIG. 14 discloses one such example detail page with reservation 1220 (the venue page shown in FIG. 16*j*, and the details page shown in FIG. 17*k*, are other examples, and are described in greater detail below). As shown in FIG. 14, the detail page with reservation 1220 includes reservation details and an associated deal 1402. In addition, the page may include a recommendation score 1404 that displays a rating for the merchant. In addition, the page may present deal terms 1406 and fine print 1408, describing the nature of deals associated with the merchant. The page may additionally display a map view presenting the location of the merchant 1410 and the surrounding neighborhood. In some embodiments, the detail page with reservation 1220 may also display one or more additional names of recommended merchants 1412, based on the consumer profile.

Returning to FIGS. 12 and 12*a*, when receiving a reservation request from the detail page with reservation 1220, the pull-type searching system may present the user with a confirmation page 1222, including the reservation entry details, the name, and a deal associated with the confirmation. Examples of confirmation pages are the confirmation page shown in FIG. 16*l* and the confirmation page shown in FIG. 17*o*, described in greater detail below). The deal associated with the confirmation may be specifically correlated to the reservation time (e.g., time slot). Accordingly, different deals may be available based on the variations in reservation entry details (such as for different party sizes and/or different dates). In this fashion, the pull-type searching system enables users to navigate using merchant names to quickly make online reservations.

Navigation Based on Keyword, Category, or Reservation Details

In embodiments where the landing page shown in FIG. 11 includes a keyword entry field, the selection received from the consumer may include text, with which the pull-type searching system performs the search in step 1006 for merchant names associated with the selection (see, e.g., search by name 1204). As the consumer inputs text, the pull-type searching system presents and updates search results page 1216 based on the text. Similarly, when the selection received from the user is a category or includes reservation details, the pull-type searching system presents search results page 1216 (an example of which is the name or keyword page shown in FIG. 16*b*) based on the category, or search results with reservation details page 1212 (examples of which are shown in search results page of FIG. 16*e* and 16*g* and in FIG. 17*h*, both of which are described in greater detail below), based on the reservation details, respectively.

Each such field includes filter fields having additional categories and/or subcategories, selectable price levels, deal types (occasions), or locations (e.g., neighborhoods zip codes, etc.). Upon selection by the user of a filter, the pull-type searching system further narrows the search results displayed and may display additional filter fields based on the selection. The search results include one or more merchant names and one or more deals associated with each merchant name. When the pull-type searching system eventually receives a selection of one of the merchant names, the system present the consumer with detail page 1214 based on the selected merchant name, from where user navigation to complete a reservation is similar to that described above. In this fashion, the pull-type searching system enables users to navigate using keywords, category selections, or reservation details to quickly make online reservations.

The pull-type searching system also enables consumers to share reservations and venues. From the detail page with reservation 1220, the user may be presented with selection criteria to share the venue (see element 1226), upon which the pull-type searching system may present a sharing details page, as shown in FIG. 17*p*. On the sharing details page, the pull-type searching system present the user with a variety of sharing options by which information about the venue can be shared (e.g., links that enable sharing the venue using one of a variety of social networking application). In a similar fashion, the confirmation page 1222 may enable the consumer to share information regarding the specific reservation (see element 1224). Examples of this feature may be found in the confirmation page shown in FIG. 16*l*, and the confirmation page shown in FIG. 17*o*, both of which include a "Share Details with your Party" selectable criterion.

In addition, after confirmation of the reservation, the user's plans may change and the user may wish to cancel the reservation. Accordingly, the pull-type searching system enables selection of cancelation criteria 1228, which cancels the confirmed reservation (examples are provided in FIGS. 17*s* and 17*t*, which include a "Cancel Reservation" selectable criterion). In some embodiments, rather than immediately canceling the reservation, the pull-type searching system may communicate a confirm cancellation page 1230 to the consumer to ensure that the cancelation was intended and not merely mistakenly selected (an example of which is provided in FIG. 17*u*), and a cancelation confirmation page (FIG. 17*v*). Other selection criteria may also be presented to the consumer via the confirmation page 1222, such as voucher selection criteria, which, if selected, causes the pull-type searching system to communicate a voucher 1234 to the consumer, for printing and/or presentation to the merchant at which the reservation has been confirmed. In some embodiments, however, a voucher is not necessary to redeem the promotion associated with a reservation.

FIG. 15 shows an example email message that the pull-type searching system may send to a potential consumer. The pull-type searching system is able to generate a set of merchant names for presentation to the consumer. For each restaurant named, the pull-type searching system may determine and display one or more deal terms 1502 that are available at that restaurant. In some embodiments, the set of merchant names may be determined based on a consumer profile, and therefore specifically tailored to the consumer receiving the email message. In other embodiments, the set of merchant names may be determined based on the value proposition of the one or more deal terms associated with the merchant. The email message may also include a hyperlink titled, for example, "Browse all reservations," that, when clicked on by the user, opens a web browsing window displaying, for example, the landing page shown in FIG. 11.

FIGS. 16*a-l* and 18*a-w* show user interfaces for mobile devices that the pull-type searching system may present to enable consumers to make online reservations. Such example mobile interfaces enable greater ease-of-use of the pull-type searching system to reach a wider base of potential customers.

FIGS. 16*a-c* shows a set of user interfaces for mobile devices that provide the functionality of the reserve tab 1202 landing page. The start page shown in FIGS. 16*a* and 16*d* shows the reservation search fields 1602, and selectable criteria to search by name 1604 and by category 1606. Name or keyword page of FIG. 16*b* (which corresponds to the search results page 1216) shows keyword entry field 1608, and merchant names 1610. In addition, the categories page of FIG. 16*c* enables the user to select a category type 1612, and to thereafter select a category from the category type with which to filter the search results.

FIGS. 16*e* and 16*g* show a search results page that corresponds to search results with reservation details page 1212, in which available reservation times and associated deals are displayed in conjunction with each restaurant name. As shown in item 1614, the deals associated with a merchant name are selectable, and are further associated with a reservation time (e.g., time slot) shown based on the selections for searching made by the user. The search results page of FIGS. 16*e* and 16*g* further show a view field "List|Map" that enables the user to toggle between list and map displays. When the map view is selected, the map page of FIG. 16*f* (which corresponds to map view 1208) is shown and displays the same set of search results over a map.

FIG. 16*h* shows a filter page and FIG. 16*i* shows a category filter page. The Filter page of FIG. 16*h* enables the user to filter based on a price level 1616, based on a distance from a location 1618, or based on category type (such as neighborhood (or cuisine). The category filter page of FIG. 16*i* enables the user to select specific categories from within a particular category type. The functionality of the filter page and the category filter page together correspond to the filter features described above in connection with search results page 1216.

FIG. 16*j* shows a venue page, which corresponds to the detail page with reservation 1220 described above. FIG. 16*k* shows a review page, and FIG. 16*l* shows a confirmation page, with corresponds to confirmation page 1222. The venue page of FIG. 16*j* shows a selection of reservation details 1638, and enables a user to request a reservation 1620 with the merchant based on the reservation details 1638. The review page of FIG. 16*k* displays to the user the merchant name 1622, the reservation details 1624, the deal corresponding to the selected reservation 1626, and any fine print governing the reservation 1628. The Review page of FIG. 16*k* further enables the user to confirm the reservation 1630. The confirmation page of FIG. 16*l* displays the merchant name 1622, the reservation details 1624, the deal corresponding to the selected reservation 1626, and any fine print governing the reservation 1628. The confirmation page of FIG. 16*l* further enables the user to share the details of the reservation with others 1632.

FIG. 17*a* discloses a welcome interface that presents the customer with an introductory message regarding the online reservation capabilities of the pull-type searching system.

FIGS. 17*b* and 17*c* show user interfaces that provide the functionality of the reserve tab 1202 landing page (previously shown in FIG. 11). FIG. 17*b* shows a user interface corresponding to a truncated version of the reserve tab 1202. In this respect, FIG. 17*b* presents one or more selectable names of merchants and deal terms 1704 associated with each merchant. FIG. 17*b* further enables a user to select criteria 1702 to transition to a reservation entry page (shown in FIG. 17*e*), where specific reservation information may be entered or to a map view page (shown in FIG. 17*d*, which is similar to the map page shown in FIG. 16*f* and corresponds to map view 1208).

FIG. 17*c* presents a similar interface as FIG. 17*b*, but includes a keyword entry feature 1706 and is therefore similar to name or keyword page of FIG. 16*b*.

As noted previously, FIG. 17*d* presents an additional map view, similar to the map page shown in FIG. 16*f* and corresponding to map view 1208. In this map view, merchants with time slots available for reservation within a particular time period (e.g., tonight) may be displayed.

As noted previously, FIG. 17*e* presents a select date and time interface, which includes several features of the search results page 1216, including reservation search fields (1708), and the ability to select filters 1710 to apply, such as neighborhood, cuisine (merchant category), and price level.

Upon selection of one of the filters 1306, the pull-type searching system may present the user with interfaces shown FIG. 17*f* or FIG. 17*g*, which the user may use to select categories based on the category type (in these examples, neighborhoods and cuisine types, respectively).

FIG. 17*h* presents an interface corresponding to the search results with reservation page 1212, and presents the user with names of merchants associated with selected reservation details, and additionally presents available reservation times and deals 1712 associated with each available reservation time at each of the named merchants. FIG. 17h also includes a view field 1714 that may be toggled by the user to present the list view shown in FIG. 17h or a map view (corresponding to map view 1208), as shown in FIG. 17i. The map view presented in FIG. 17i shows, on an overlay over a map, the locations of merchants with availability matching the selected reservation entry details shown in FIG. 17h.

FIG. 17j presents an interface corresponding to the detail page 1214 and plays deal terms 1716 associated with an available reservation. Similarly, FIG. 17k presents an interface corresponding to the detail page with reservation 1220 and displays deal terms 1724 associated with the selected reservation. From either of the interfaces displayed by FIGS. 17j and 17k, the pull-type searching system, in response to user selection of the menu field 1718, may present the user with FIG. 17l, which displays a menu associated with a specific merchant. Similarly, selection of the website field 1720 from either of displays of FIGS. 17j and 17k causes presentation to the user of the merchant's proprietary website, shown in FIG. 17m. Also, from either of displays of FIGS. 17j and 17k, the "Reserve Now" stripe 1722 displays a number of remaining available reservations having associated deals. Selection of stripe 1722 corresponds to a request for a reservation, as discussed previously.

Figure 17N:
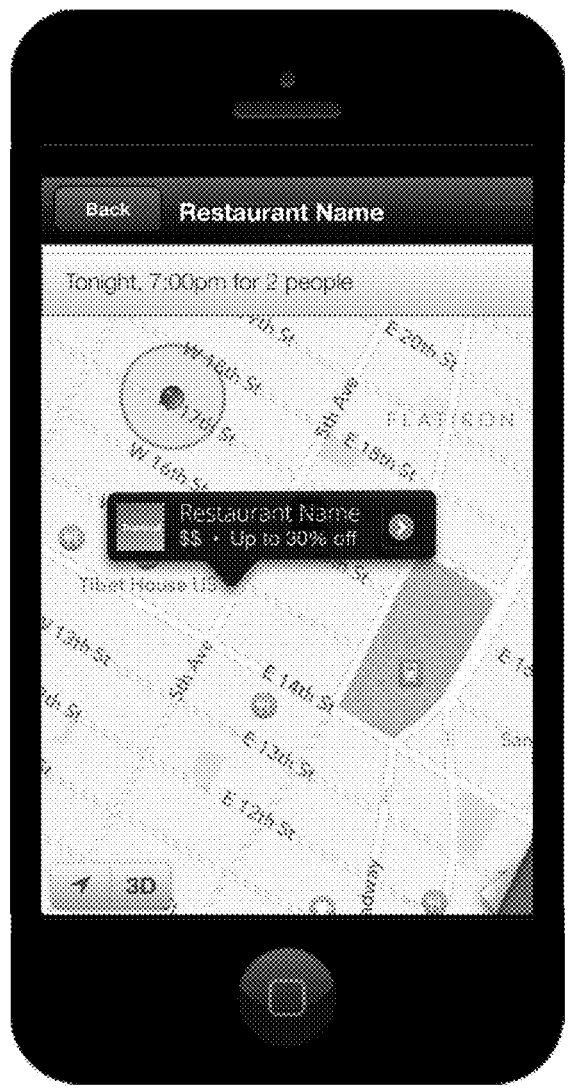
Figure 17O:
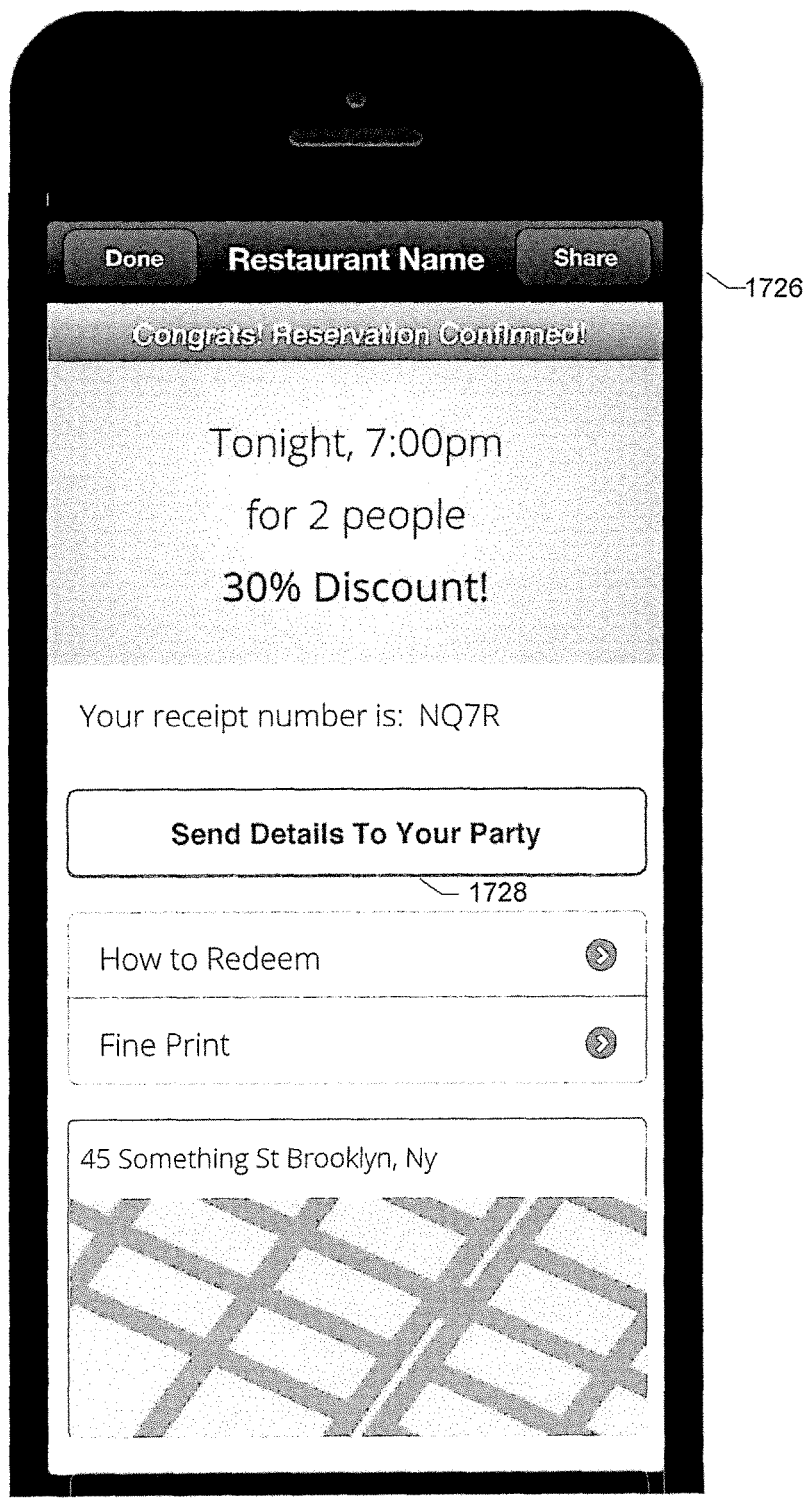
Figure 17P:
Figure 17Q:
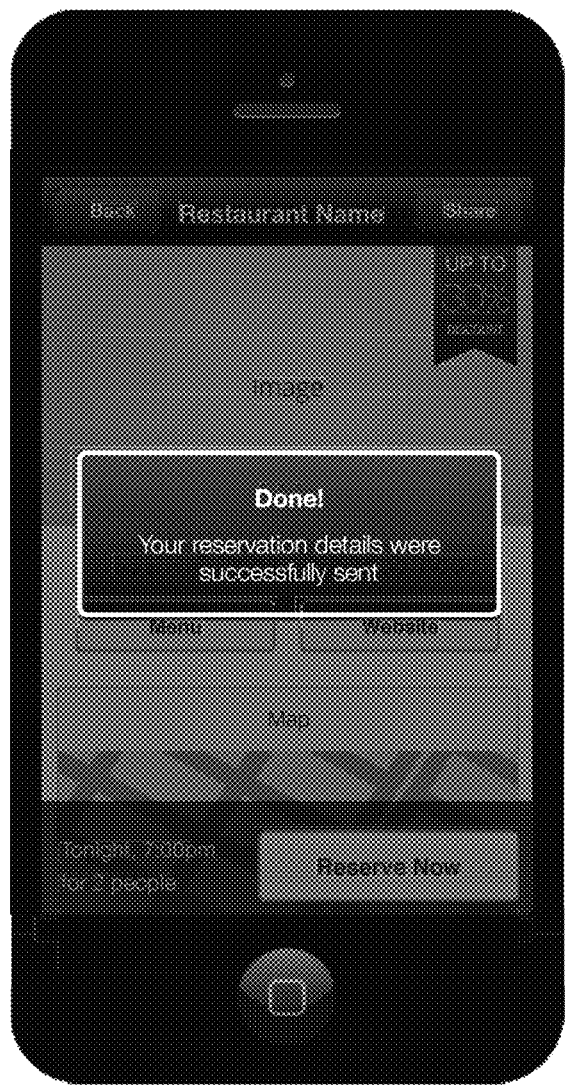

FIG. 17n displays another map view interface corresponding to map view 1208 that shows the specific location of a selected merchant.

FIG. 17o displays an example confirmation interface, corresponding to confirmation page 1222 (in FIGS. 12 and 12a), and the confirmation page shown in FIG. 16l. FIG. 17o displays the merchant name, the reservation detail, the deal corresponding to the selected reservation, and any fine print governing the reservation 1648. FIG. 17o further enables the user to share the details of the reservation with others, using the "Share" icon 1726 located in the top right corner of the display, or the "Send Details To Your Party" icon 1728, both of which lead to the sharing details page in FIG. 17p.

FIG. 17p displays a sharing details page, corresponding to share venue page 1226. Similarly, FIG. 17q displays a sharing confirmed page, confirming that the details have been shared.

Figure 17R:
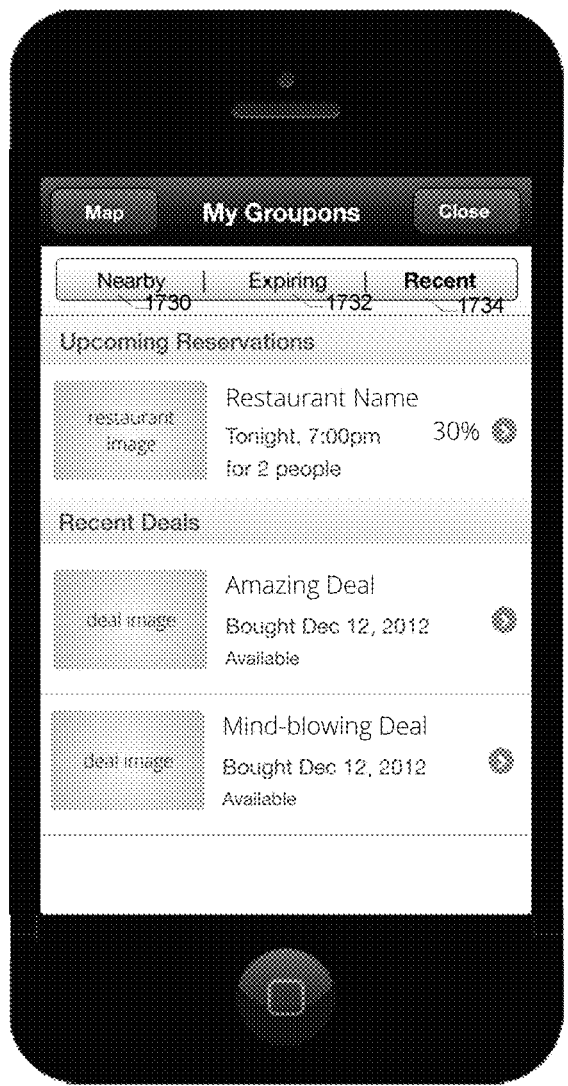

FIG. 17r displays a list of nearby 1730, expiring 1732, and recent 1734 deals purchased by the user. Similarly, FIG. 17w displays a list of recently purchased deals, and includes a selectable field that enables a user to make a new reservation.

Figure 17S:
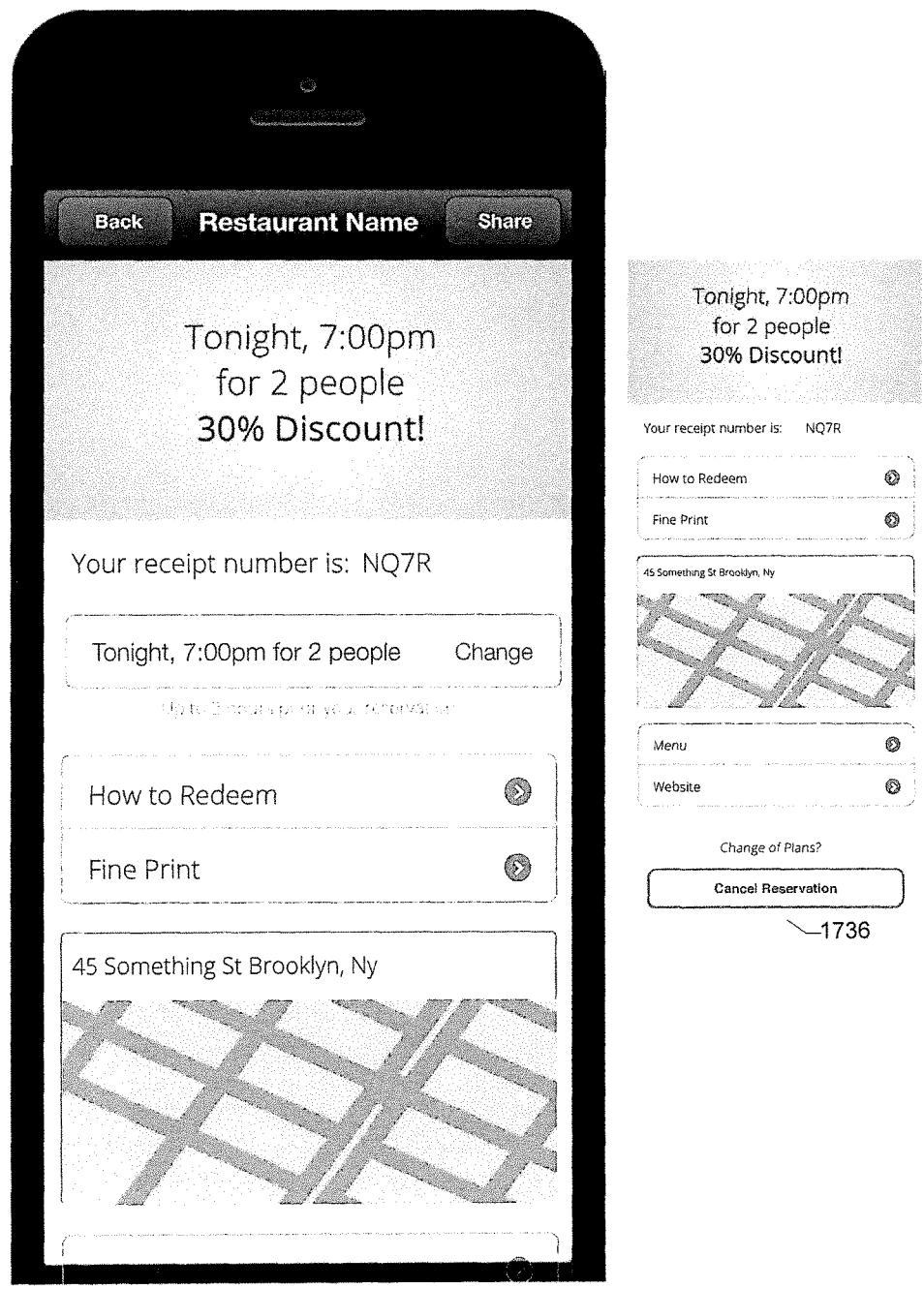
Figure 17T:
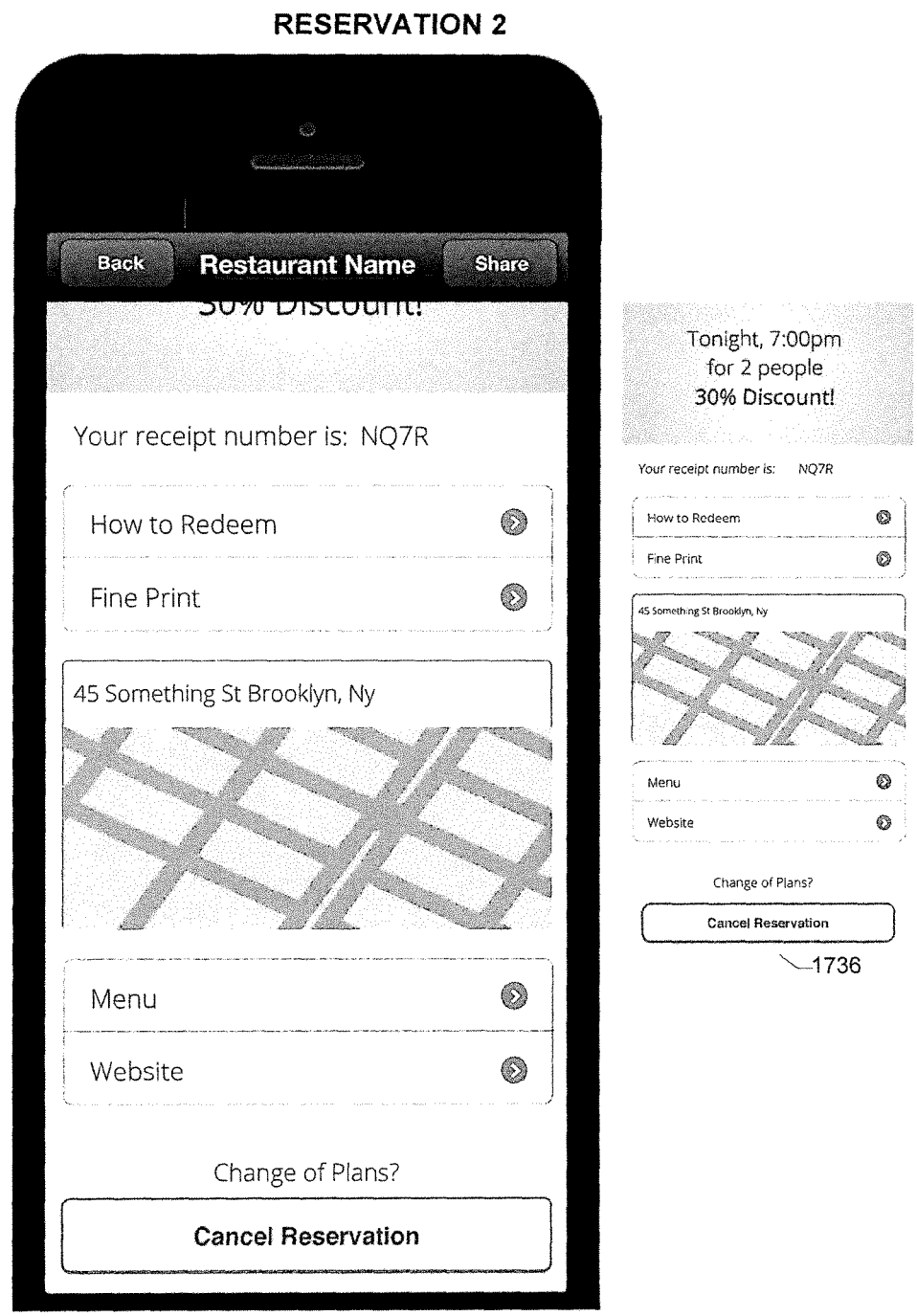
Figure 17U:
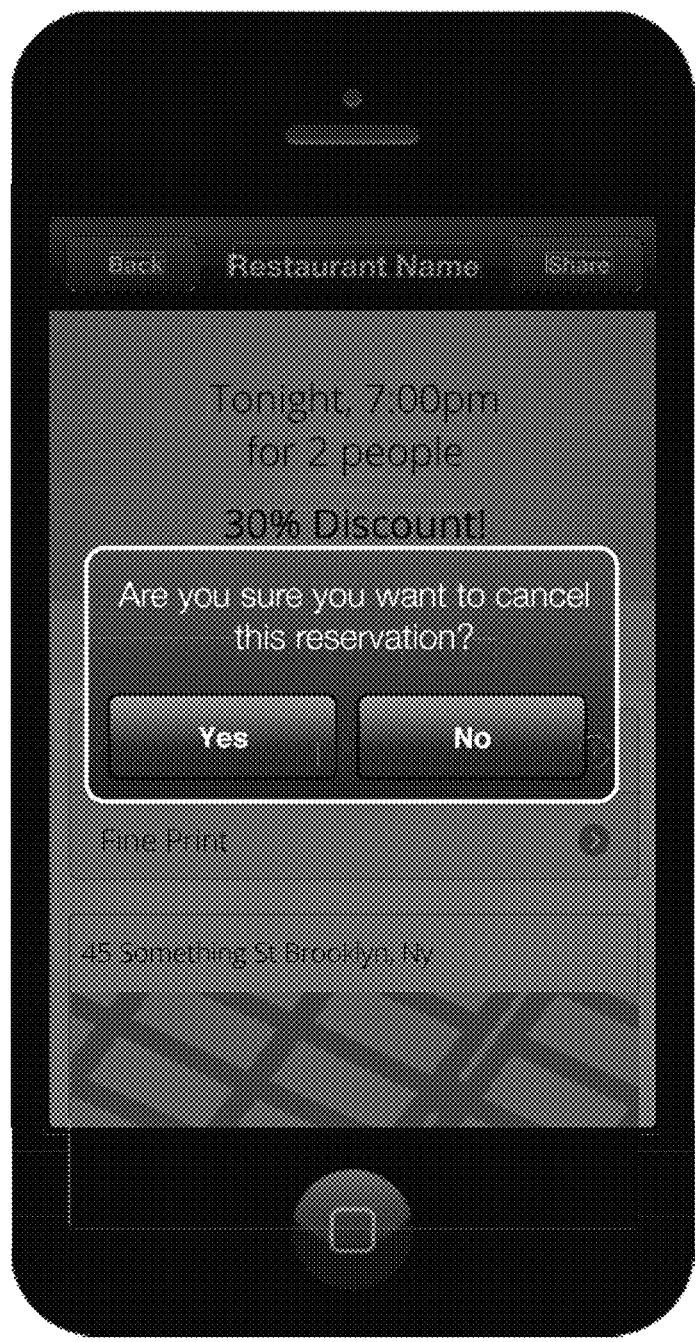
Figure 17V:
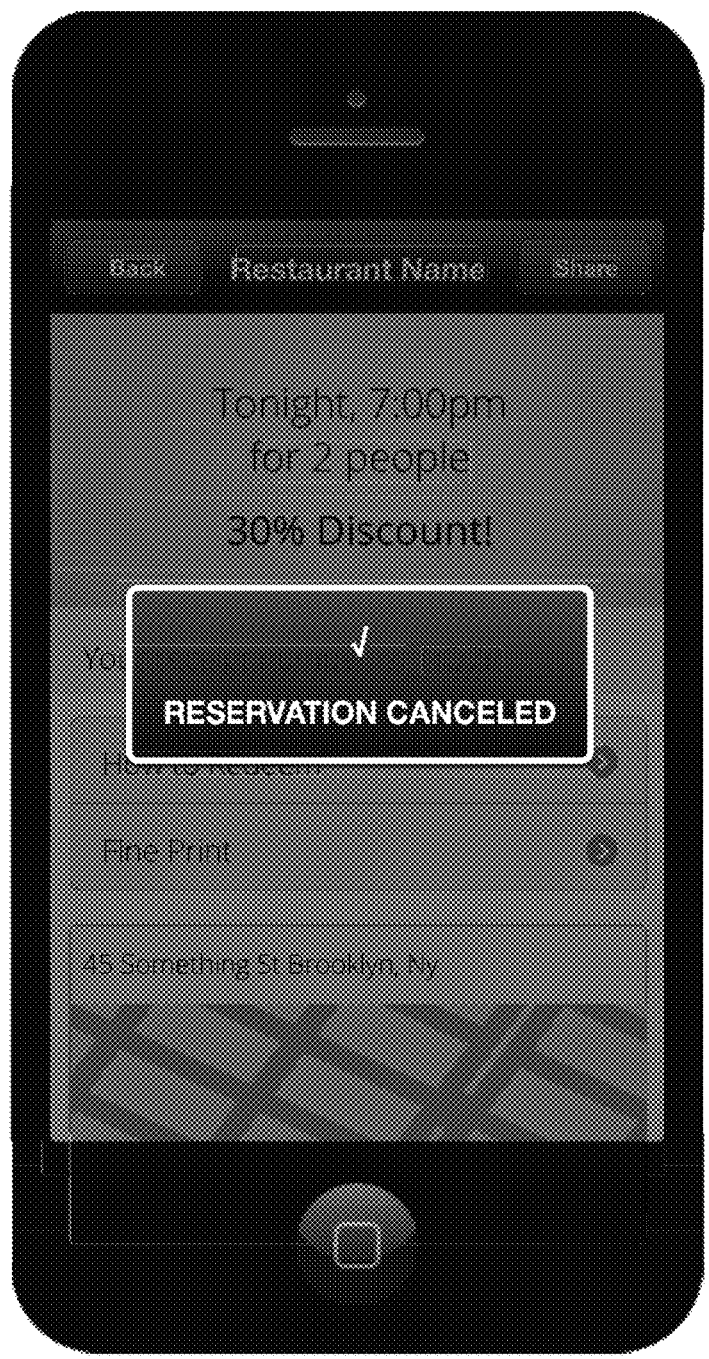
Figure 17W:
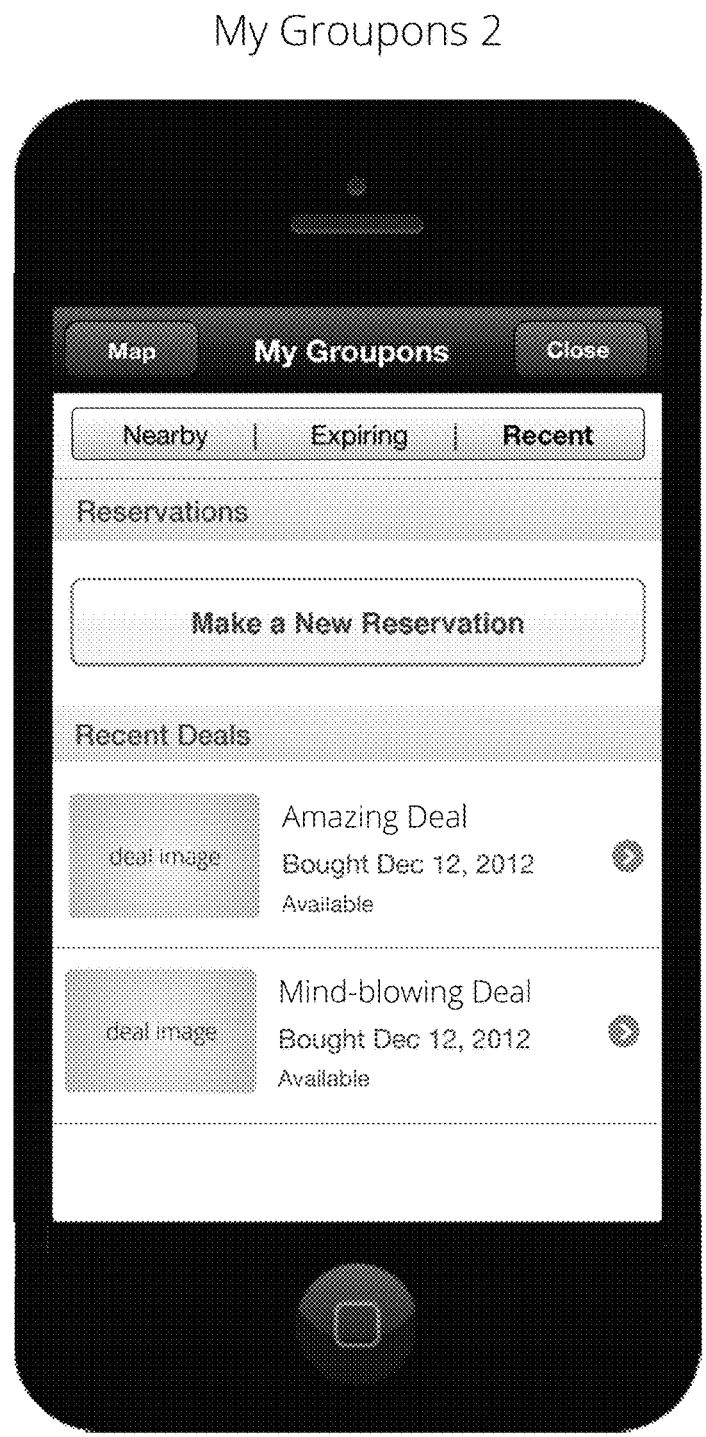

FIGS. 17s and 17t display another confirmation interface, corresponding to confirmation page 1222. From the interface displayed in FIGS. 17s and 17t, the user may attempt to cancel the reservation 1736, upon which the pull-type searching system may display FIG. 17u, showing a cancel option interface, corresponding to cancel reservation page 1228. From the cancel option interface, the user may be presented with FIG. 17v, which shows a cancelation confirmation interface, corresponding to confirm cancelation page 1230.

Exemplary System Architecture

FIG. 18 shows configuration 1800 of a general purpose electronic device 1002. The general purpose electronic device 1802 may be deployed as a general computer system used in a networked deployment. The general purpose electronic device 1802 may represent a remote server or local mobile device of the consumer. In particular, one, some or all of the elements in FIG. 1 may be represented by general purpose electronic device 1802, such as pull-type searching server 102, consumer 1 (124), or consumer N (126). Further, the logic described in the text or in flow charts in FIGS. 2, 3, 7 and 9 may be executed by one or more processors locally or remotely located. The computer system may operate in the capacity of a server or as a client user computer in a server-client user network environment, or as a peer computer system in a peer-to-peer (or distributed) network environment. The computer system may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1810 (sequential or otherwise) that specify actions to be taken by that machine. In a particular embodiment, the computer system may be implemented using electronic devices that provide voice, video or data communication. Further, while a single computer system may be illustrated, the term "general purpose electronic device" shall also be taken to include any collection of systems or sub-systems that individually or jointly execute a set, or multiple sets, of instructions to perform one or more computer functions.

The general purpose electronic device may include a processor 1703, such as, a central processing unit (CPU), a graphics processing unit (GPU), or both. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processors 1803 and memories 1804 discussed herein, as well as the claims below, may be embodied in and implemented in one or multiple physical chips or circuit combinations. The processor 1703 may execute a software program 1810, such as code generated manually (i.e., programmed).

The general purpose electronic device 1802 may include a memory 1804 that can communicate via a bus. The memory 1804 may be a main memory, a static memory, or a dynamic memory. The memory 1804 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 1804 may include a cache or random access memory for the processor. Alternatively or in addition, the memory 1804 may be separate from the processor, such as a cache memory of a processor, the memory, or other memory. The memory 1804 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1804 may be operable to store instructions executable by the processor. The functions, acts or tasks illustrated in the figures, such as FIGS. 2, 3, 7, 9, 10, and 12 or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system may further include a display 1812, such as a liquid crystal display (LCD), an organic light emitting diode (OLED), a flat panel display, a solid state display, a cathode ray tube (CRT), a projector, a printer or other now known or later developed display device for outputting determined information. The display 1812 may act as an interface for the user to see the functioning of the processor, or specifically as an interface with the software stored in the memory or in the drive unit.

Additionally, the computer system may include an input device 1814 configured to allow a user to interact with any of the components of system. The input device may be a number pad, a keyboard, or a cursor control device, such as a mouse, or a joystick, touch screen display, remote control or any other device operative to interact with the system.

The computer system may also include a disk or optical drive unit. The disk drive unit 1808 may include a computer-readable medium 1806 in which one or more sets of instructions, e.g. software, can be embedded. Further, the instructions may perform one or more of the methods or logic as described herein. The instructions may reside completely, or at least partially, within the memory 1804 and/or within the processor during execution by the computer system. The memory 1804 and the processor also may include computer-readable media as discussed above.

The present disclosure contemplates a computer-readable medium 1806 that includes instructions or receives and executes instructions responsive to a propagated signal, so that a device connected to a network 122 may communicate voice, video, audio, images or any other data over the network 122. Further, the instructions may be transmitted or received over the network 122 via a communication interface 1816. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. Likewise, the additional connections with other components of the general purpose electronic device 1002 may be physical connections or may be established wirelessly. In the case of a service provider server, the service provider server may communicate with consumers through the communication interface.

The computer-readable medium 1806 may be a single medium, or the computer-readable medium 1806 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1806 may include a solid-state memory such as a memory card or other package that houses one or more non-volatile read-only memories. The computer-readable medium 1806 also may be a random access memory or other volatile re-writable memory. Additionally, the computer-readable medium 1806 may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium 1806 may comprise a tangible storage medium. In some embodiments, the computer-readable medium 1806 may comprise a non-transitory medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. An apparatus comprising at least one processor and at least one memory including computer program code, the at least one memory and the computer program code configured to, with the at least one processor, cause the apparatus to:
   electronically communicate, by an analytical model of a promotion searching server, ordered selectable search criteria, the search criteria including categories of deals relating to a first taxonomy for classifying deals, deal types relating to a second taxonomy for classifying deals that is different from the first taxonomy, and a keyword field;
   receive, by the analytical model from a user device over a network, a selection from the search criteria;
   search, by the analytical model, a deals database for deals associated with the selection;
   in an instance in which the selection includes one or more selected category of deals,
      indirectly identify, by the analytical model, additional deal types based on the deals associated with the selection,
      arrange, by the analytical model, the additional deal types based on a user profile associated with the user device, and
      electronically communicate, by the analytical model, the arranged additional deal types and the deals associated with the selection; and
   in an instance in which the selection includes one or more selected deal type,
      indirectly identify, by the analytical model, additional categories of deals based on the deals associated with the selection,
      arrange, by the analytical model, the additional categories of deals based on the user profile associated with the user device, and
      electronically communicate, by the analytical model, the arranged additional categories of deals and the deals associated with the selection.

2. The apparatus of claim 1, wherein the at least one memory and the computer program code are further configured to, with the at least one processor, cause the apparatus to arrange, by the analytical model, the additional categories of deals is-further based on the deals associated with the selection.

3. The apparatus of claim 1, wherein the at least one memory and the computer program code are further configured to, with the at least one processor, cause the apparatus to perform, by the analytical model, dynamic binning to determine the ordered selectable search criteria to communicate.

4. The apparatus of claim 1, wherein the selection includes one or more keywords and one or more non-keywords, and wherein the at least one memory and the computer program code are further configured to, with the at least one processor, cause the apparatus to search, by the analytical model, the deals database for deals associated with the selection by:
   distinguishing, by the analytical model, between the one or more keywords and the one or more non-keywords, wherein the non-keywords include adjectives used to described the keywords; and
   searching, by the analytical model, the deals database using the one or more keywords.

5. The apparatus of claim 1, wherein the search criteria further includes one or more redemption goals, wherein a redemption goal comprises a time for redemption of a deal.

6. A computer-implemented method comprising:
   electronically communicating, by an analytical model of a promotion searching server, ordered selectable search criteria, the search criteria including categories of deals relating to a first taxonomy for classifying deals, deal types relating to a second taxonomy for classifying deals based on a description of a personality of a consumer, and a keyword field;
   receiving, by the analytical model from a user device over a network, a selection from the search criteria;
   searching, by the analytical model, a deals database for deals associated with the selection;
   in an instance in which the selection includes one or more selected category of deals,
      indirectly identifying, by the analytical model, additional deal types based on the deals associated with the selection,
      arranging, by the analytical model, the additional deal types based on a user profile associated with the user device, and
      electronically communicating, by the analytical model, the arranged additional deal types and the deals associated with the selection; and
   in an instance in which the selection includes one or more selected deal type,
      indirectly identifying, by the analytical model, additional categories of deals based on the deals associated with the selection,
      arranging, by the analytical model, the additional categories of deals based on the user profile associated with the user device, and
      electronically communicating, by the analytical model, the arranged additional categories of deals and the deals associated with the selection.

7. The computer-implemented method of claim 6, wherein, in an instance in which categories of deals and deal types are directly correlated, the arranging the additional categories of deals comprises arranging, by the analytical model, the additional categories of deals further based on the one or more selected deal type.

8. The computer-implemented method of claim 6, wherein, in an instance in which categories of deals and deal types are indirectly correlated, the arranging the additional categories of deals comprises arranging, by the analytical model, the additional categories of deals further based on the deals associated with the selection.

9. The computer-implemented method of claim 6, further comprising:
   performing, by the analytical model, dynamic binning to determine the ordered selectable search criteria to communicate.

10. The computer-implemented method of claim 6, wherein the selection includes one or more keywords and one or more non-keywords, and wherein the searching, by the analytical model, the deals database for deals associated with the selection includes:
  distinguishing, by the analytical model, between the one or more keywords and the one or more non-keywords, wherein the non-keywords include adjectives used to described the keywords; and
  searching, by the analytical model, the deals database using the one or more keywords.

11. The computer-implemented method of claim 6, wherein the search criteria further includes one or more redemption goals, wherein a redemption goal comprises a time for redemption of a deal.

12. The computer-implemented method of claim 6, wherein the arranging the additional deal types comprises arranging, by the analytical model, the additional deal types further based on the deals associated with the selection.

13. A non-transitory computer-readable medium storing a set of instructions that, when executed by a computer system, causes the computer system to:
  electronically communicate, by an analytical model of a promotion searching server, ordered selectable search criteria, the search criteria including categories of deals relating to a first taxonomy for classifying deals, deal types relating to a second taxonomy for classifying deals based on a description of a personality of a consumer, and a keyword field;
  receive, by the analytical model from a user device over a network, a selection from the search criteria;
  search, by the analytical model, a deals database for deals associated with the selection;
  in an instance in which the selection includes one or more selected category of deals,
    indirectly identify, by the analytical model, additional deal types based on the deals associated with the selection,
    arrange, by the analytical model, the additional deal types based on a user profile associated with the user device, and
    electronically communicate, by the analytical model, the arranged additional deal types and the deals associated with the selection; and
  in an instance in which the selection includes one or more selected deal type,
    indirectly identify, by the analytical model, additional categories of deals based on the deals associated with the selection,
    arrange, by the analytical model, the additional categories of deals based on the user profile associated with the user device, and
    electronically communicate, by the analytical model, the arranged additional categories of deals and the deals associated with the selection.

14. The non-transitory computer-readable medium of claim 13, wherein, in an instance in which categories of deals and deal types are directly correlated, the set of instructions, when executed by the computer system, further cause the computer system to arrange, by the analytical model, the additional categories of deals based on the one or more selected deal type.

15. The non-transitory computer-readable medium of claim 13, wherein, in an instance in which categories of deals and deal types are indirectly correlated, the set of instructions, when executed by the computer system, further cause the computer system to arrange, by the analytical model, the additional categories of deals based on the deals associated with the selection.

16. The non-transitory computer-readable medium of claim 13, wherein the set of instructions, when executed by the computer system, further causes the computer system to perform, by the analytical model, dynamic binning to determine the ordered selectable search criteria to communicate.

17. The non-transitory computer-readable medium of claim 13, wherein the selection includes one or more keywords and one or more non-keywords, and wherein the set of instructions, when executed by the computer system, further causes the computer system to search, by the analytical model, the deals database for deals associated with the selection by:
  distinguishing, by the analytical model, between the one or more keywords and the one or more non-keywords, wherein the non-keywords include adjectives used to described the keywords; and
  searching, by the analytical model, the deals database using the one or more keywords.

18. The non-transitory computer-readable medium of claim 13, wherein arranging the additional deal types is based on the deals associated with the selection.

* * * * *

UNITED STATES PATENT AND TRADEMARK OFFICE
CERTIFICATE OF CORRECTION

PATENT NO. : 10,395,276 B1
APPLICATION NO. : 13/842379
DATED : August 27, 2019
INVENTOR(S) : Jordan Fulghum et al.

Page 1 of 1

It is certified that error appears in the above-identified patent and that said Letters Patent is hereby corrected as shown below:

In the Claims

Claim 2, at Column 35, Line 56: "is-further" should be -- further --

Signed and Sealed this
Tenth Day of December, 2019

Andrei Iancu
*Director of the United States Patent and Trademark Office*